(12) United States Patent
Rogers et al.

(10) Patent No.: US 12,454,408 B2
(45) Date of Patent: Oct. 28, 2025

(54) APPARATUS FOR PROCESSING ORGANIC MATTER HAVING LID AND AIR TREATMENT SYSTEM PROMOTING PLEASANT USER EXPERIENCE

(71) Applicant: Chewie Labs LLC, San Bruno, CA (US)

(72) Inventors: Matthew Lee Rogers, San Francisco, CA (US); Harry E. Tannenbaum, San Francisco, CA (US); Adam Mittleman, Redwood City, CA (US); Emma Elizabeth Feshbach Bright, Palo Alto, CA (US); Tom Ayotte, Hayward, CA (US); Jaideep Singh Chavan, Mountain View, CA (US); Geoffrey Becker Hill, Seattle, WA (US); Benjamin Joseph Chia, Sunnyvale, CA (US); Pinida Jan Moolsintong, San Francisco, CA (US); Rochus Emanuel Jacob, San Francisco, CA (US); Donald Ripatti, Pacifica, CA (US)

(73) Assignee: Chewie Labs LLC, San Bruno, CA (US)

( * ) Notice: Subject to any disclaimer, the term of this patent is extended or adjusted under 35 U.S.C. 154(b) by 671 days.

(21) Appl. No.: 17/897,515

(22) Filed: Aug. 29, 2022

(65) Prior Publication Data
US 2023/0081656 A1 Mar. 16, 2023

Related U.S. Application Data

(60) Provisional application No. 63/392,339, filed on Jul. 26, 2022, provisional application No. 63/239,852, filed on Sep. 1, 2021.

(51) Int. Cl.
*B65F 1/16* (2006.01)
*B01D 53/00* (2006.01)
(Continued)

(52) U.S. Cl.
CPC .......... *B65F 1/1646* (2013.01); *B01D 53/005* (2013.01); *B01D 53/0446* (2013.01);
(Continued)

(58) Field of Classification Search
CPC .... B01D 53/005; B01D 53/007; B01D 53/04; B01D 53/0407; B01D 53/0454;
(Continued)

(56) References Cited

U.S. PATENT DOCUMENTS 5,340,536 A 8/1994 Datar et al.
5,634,600 A 6/1997 Kubota et al.
(Continued)

FOREIGN PATENT DOCUMENTS

DE 4105778 A1 * 8/1992 ............ C05F 17/914
EP 0791568 8/1997
(Continued)

OTHER PUBLICATIONS

Jayalakshmi et al., "Waste to Wealth—A Novel Approach for Food Waste Management"; published in: 2017 IEEE International Conference on Electrical, Instrumentation and Communication Engineering (ICEICE); Date of Conference: Apr. 27-28, 2017.
(Continued)

*Primary Examiner* — Michael L Hobbs
(74) *Attorney, Agent, or Firm* — Van Court & Aldridge LLP

(57) ABSTRACT

Embodiments disclosed herein provide an organic matter processing apparatus and method for the use thereof to convert organic matter into a ground and desiccated product. The organic matter processing apparatus includes a lid assembly that is positioned at the top or head of the processing apparatus and an air treatment system. The lid assembly is operative to open to allow a user to deposit organic matter into the processing apparatus or to remove a
(Continued)

removable bucket contained therein. The lid assembly is operative to close and provide an odor containing seal that prevents or substantially mitigates escape of odor. The air treatment system uniformly distributes untreated air through an air treatment chamber to convert the untreated air to treated air, which is exhausted out of the processing apparatus.

26 Claims, 49 Drawing Sheets

(51) Int. Cl.
- *B01D 53/04* (2006.01)
- *B01D 53/26* (2006.01)
- *B01D 53/30* (2006.01)
- *B09B 3/40* (2022.01)
- *F26B 3/04* (2006.01)
- *F26B 23/06* (2006.01)
- *B09B 3/35* (2022.01)
- *B09B 101/70* (2022.01)

(52) U.S. Cl.
CPC ......... *B01D 53/0454* (2013.01); *B01D 53/26* (2013.01); *B01D 53/30* (2013.01); *B09B 3/40* (2022.01); *B65F 1/1615* (2013.01); *B65F 1/1638* (2013.01); *F26B 3/04* (2013.01); *F26B 23/06* (2013.01); *B01D 53/007* (2013.01); *B01D 53/0407* (2013.01); *B01D 2253/102* (2013.01); *B01D 2257/708* (2013.01); *B01D 2257/90* (2013.01); *B01D 2259/45* (2013.01); *B01D 2259/804* (2013.01); *B09B 3/35* (2022.01); *B09B 2101/70* (2022.01); *B65F 2001/1676* (2013.01); *B65F 2210/128* (2013.01); *B65F 2210/137* (2013.01); *B65F 2210/165* (2013.01); *B65F 2210/168* (2013.01)

(58) Field of Classification Search
CPC .. B01D 53/26; B01D 53/30; B01D 2253/102; B01D 2257/708; B01D 2257/90; B01D 2259/45; B01D 2259/804; B09B 3/35; B09B 3/40; B09B 2101/70; B65F 1/08; B65F 1/1615; B65F 1/1638; B65F 1/1646; B65F 2001/1489; B65F 2001/1676; B65F 2210/12; B65F 2210/128; B65F 2210/129; B65F 2210/137; B65F 2210/148; B65F 2210/165; B65F 2210/168; B65F 2210/184; F26B 1/005; F26B 3/04; F26B 9/082; F26B 23/069; F26B 25/006; F26B 2200/02; F26B 2200/04; C05F 17/979; C05F 17/964; C05F 17/971; C05F 17/00
USPC ............................................. 435/290.1–290.4
See application file for complete search history.

(56) References Cited

U.S. PATENT DOCUMENTS

| | | | |
|---|---|---|---|
| 6,150,939 A | 11/2000 | Lin | |
| 7,240,865 B2 | 7/2007 | Choi | |
| 9,308,535 B2 | 4/2016 | Delgado et al. | |
| 9,597,620 B2 | 3/2017 | Verdegan et al. | |
| 9,895,726 B1 | 2/2018 | Atkinson et al. | |
| 10,065,196 B1 | 9/2018 | Tran et al. | |
| 10,906,046 B2 | 2/2021 | Crepeau et al. | |
| 11,241,694 B2 | 2/2022 | Crepeau et al. | |
| 11,278,908 B2 | 3/2022 | Crepeau et al. | |
| 11,389,804 B2 | 7/2022 | Hayman et al. | |
| 11,541,397 B2 | 1/2023 | Crepeau et al. | |
| 2003/0155228 A1 | 8/2003 | Mills | |
| 2004/0175303 A1 | 9/2004 | Lin | |
| 2004/0251339 A1 | 12/2004 | Strutz | |
| 2004/0265197 A1 | 12/2004 | Lin | |
| 2007/0190212 A1 | 8/2007 | Lee | |
| 2008/0067270 A1 | 3/2008 | Strutz | |
| 2009/0113791 A1 | 5/2009 | Bertin et al. | |
| 2009/0200180 A1 | 8/2009 | Capote | |
| 2010/0140248 A1 | 6/2010 | Yi et al. | |
| 2011/0020184 A1 | 1/2011 | Sun | |
| 2011/0062259 A1 | 3/2011 | Gregoire | |
| 2011/0151553 A1 | 6/2011 | Cruson et al. | |
| 2012/0021504 A1 | 1/2012 | Bradlee | |
| 2012/0034350 A1 | 2/2012 | Gard et al. | |
| 2012/0298658 A1 | 11/2012 | Bosetti et al. | |
| 2013/0217111 A1 | 8/2013 | Chang | |
| 2013/0263786 A1 | 10/2013 | Meisel, III et al. | |
| 2014/0117126 A1 | 5/2014 | Ceru et al. | |
| 2015/0196920 A1 | 7/2015 | Celli et al. | |
| 2015/0376882 A1 | 12/2015 | Park | |
| 2016/0022112 A1 | 1/2016 | Davenport | |
| 2016/0207845 A1 | 7/2016 | Delgado et al. | |
| 2016/0295906 A1 | 10/2016 | Jacobsen et al. | |
| 2017/0197857 A1 | 7/2017 | Whitener et al. | |
| 2017/0226466 A1 | 8/2017 | Grillo et al. | |
| 2017/0260111 A1 | 9/2017 | Maghas et al. | |
| 2017/0349501 A1 | 12/2017 | Buzruk | |
| 2018/0093814 A1 | 4/2018 | Espinosa | |
| 2018/0148391 A1 | 5/2018 | Ashbee et al. | |
| 2019/0030544 A1 | 1/2019 | Kratzer, III et al. | |
| 2019/0083989 A1 | 3/2019 | Tran et al. | |
| 2019/0152698 A1 | 5/2019 | Zhao | |
| 2020/0001389 A1 | 1/2020 | Maxwell et al. | |
| 2020/0147617 A1 | 5/2020 | Atkinson et al. | |
| 2020/0148604 A1 | 5/2020 | Atkinson et al. | |
| 2020/0353473 A1 | 11/2020 | Hayman et al. | |
| 2020/0353474 A1 | 11/2020 | Crepeau et al. | |
| 2021/0154676 A1 | 5/2021 | Crepeau et al. | |
| 2022/0242799 A1 | 8/2022 | Ying et al. | |
| 2022/0347693 A1 | 11/2022 | Hayman et al. | |
| 2023/0142555 A1 | 5/2023 | Hotte et al. | |
| 2023/0149939 A1 | 5/2023 | Crepeau et al. | |

FOREIGN PATENT DOCUMENTS

| | | |
|---|---|---|
| JP | 2002-001262 | 1/2002 |
| JP | 2004-216253 | 12/2004 |
| JP | 2006255592 | 9/2006 |
| KR | 19980047631 | 9/1998 |
| KR | 100692243 | 3/2007 |
| KR | 100694645 B1 | 3/2007 |
| KR | 100694646 B1 | 3/2007 |
| KR | 20090123375 | 12/2009 |
| KR | 101017615 B1 | 2/2011 |
| KR | 101017616 B1 | 2/2011 |
| KR | 101053035 B1 | 8/2011 |
| KR | 101187381 | 10/2012 |
| KR | 101332453 | 11/2013 |
| KR | 101461608 | 12/2014 |
| KR | 20150112689 | 10/2015 |
| KR | 102474495 B1 | 4/2016 |
| KR | 20160044110 | 4/2016 |
| KR | 101866863 | 6/2018 |
| KR | 300966490 S | 7/2018 |
| KR | 101882829 B1 | 8/2018 |
| KR | 101884662 B1 | 8/2018 |
| KR | 101921624 B1 | 11/2018 |
| KR | 101941620 | 1/2019 |
| KR | 301095230 S | 2/2021 |
| KR | 301109396 S | 5/2021 |
| KR | 301109397 S | 5/2021 |
| KR | 301109403 S | 5/2021 |
| KR | 301109404 S | 5/2021 |
| KR | 301154947 S | 3/2022 |
| KR | 301140601 S | 12/2022 |
| KR | 301202238 S | 2/2023 |
| KR | 1020230060939 A | 5/2023 |
| KR | 301223966 S | 11/2023 |
| WO | WO2008030997 | 3/2008 |

(56) References Cited

FOREIGN PATENT DOCUMENTS

| WO | WO2009157744 | 12/2009 |
|----|--------------|---------|
| WO | WO2015182929 | 3/2015  |
| WO | WO2016060290 | 4/2016  |
| WO | WO2016102947 | 6/2016  |
| WO | WO2017083944 | 5/2017  |
| WO | WO2022055212 A1 | 3/2022 |

OTHER PUBLICATIONS

Zhu, "Food Waste Drum Sieve Design"; Mar. 26, 2015; Technology, Communication and Transport; Sovonia University of Applied Sciences.

* cited by examiner

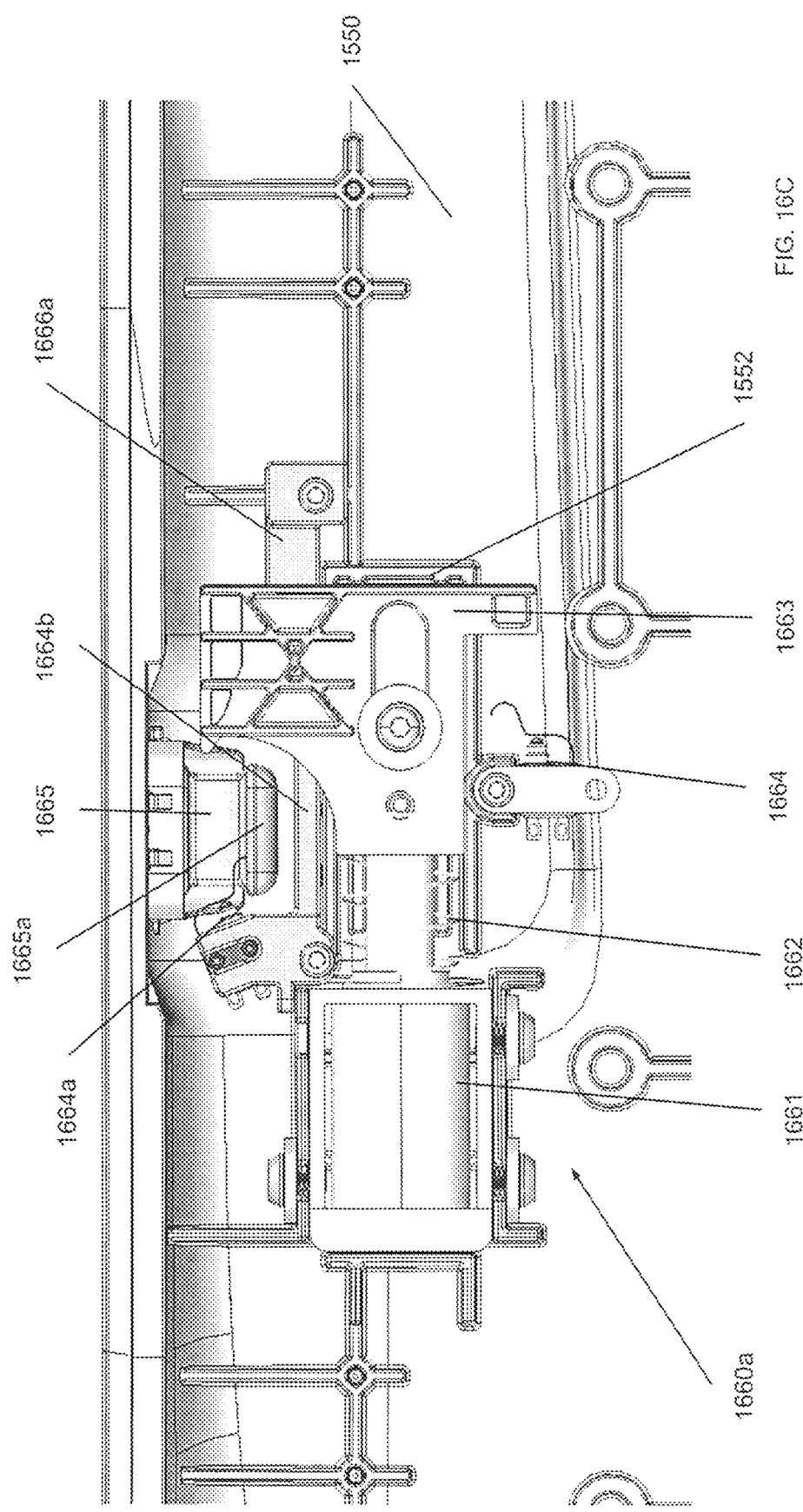

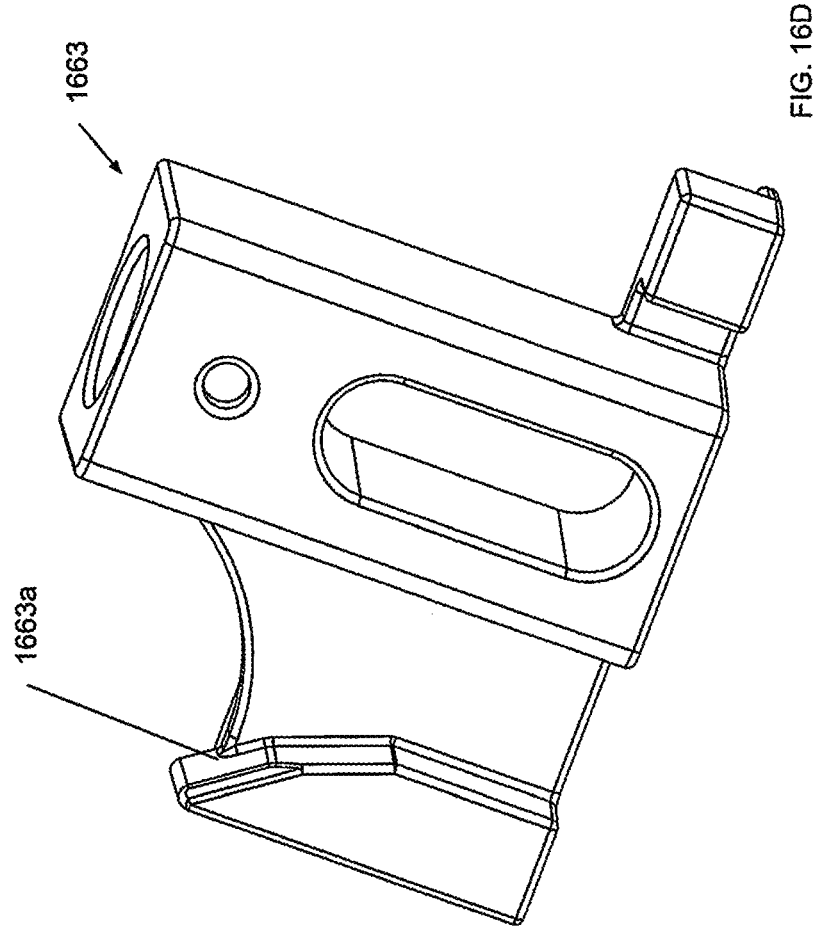

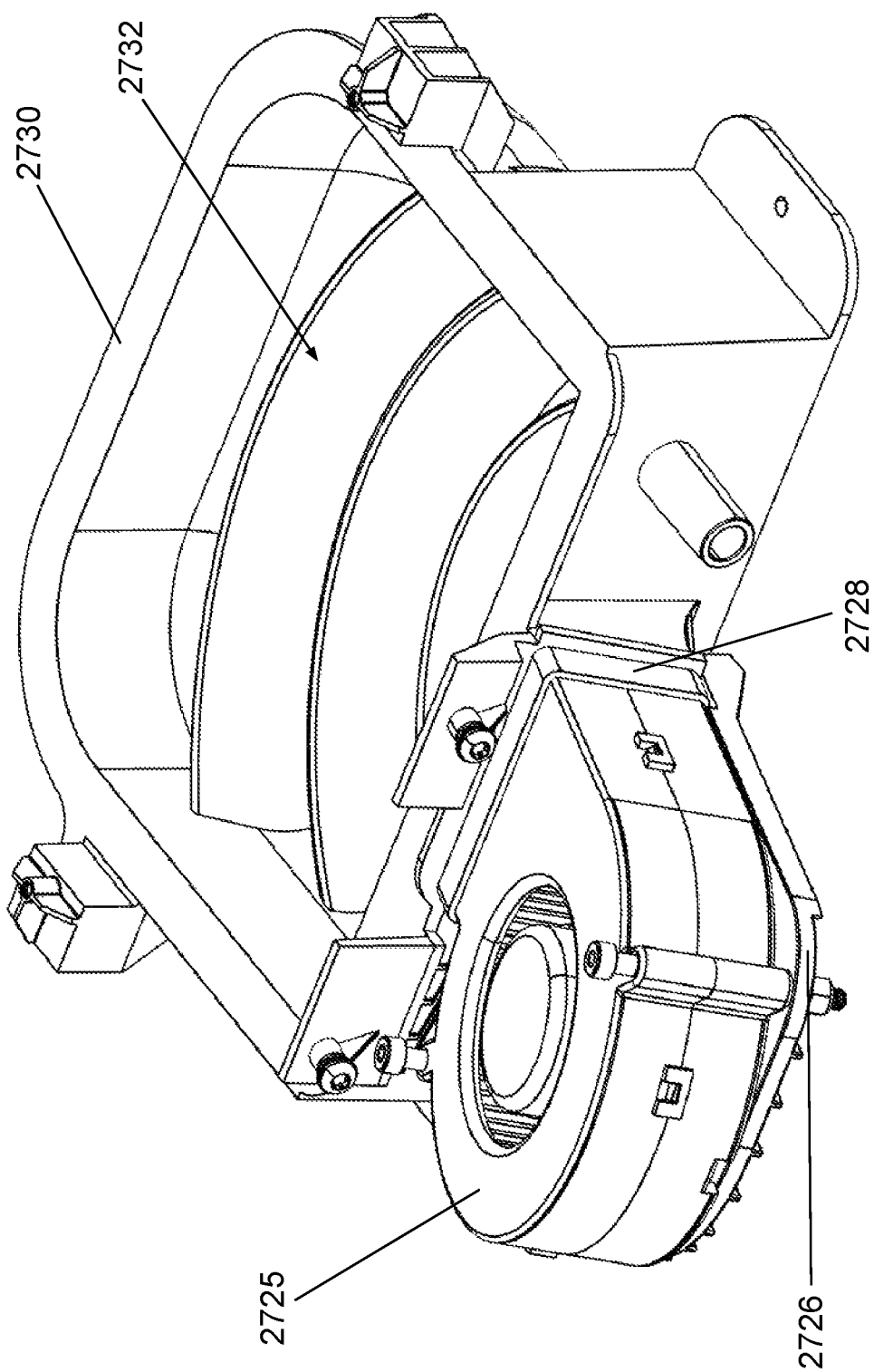

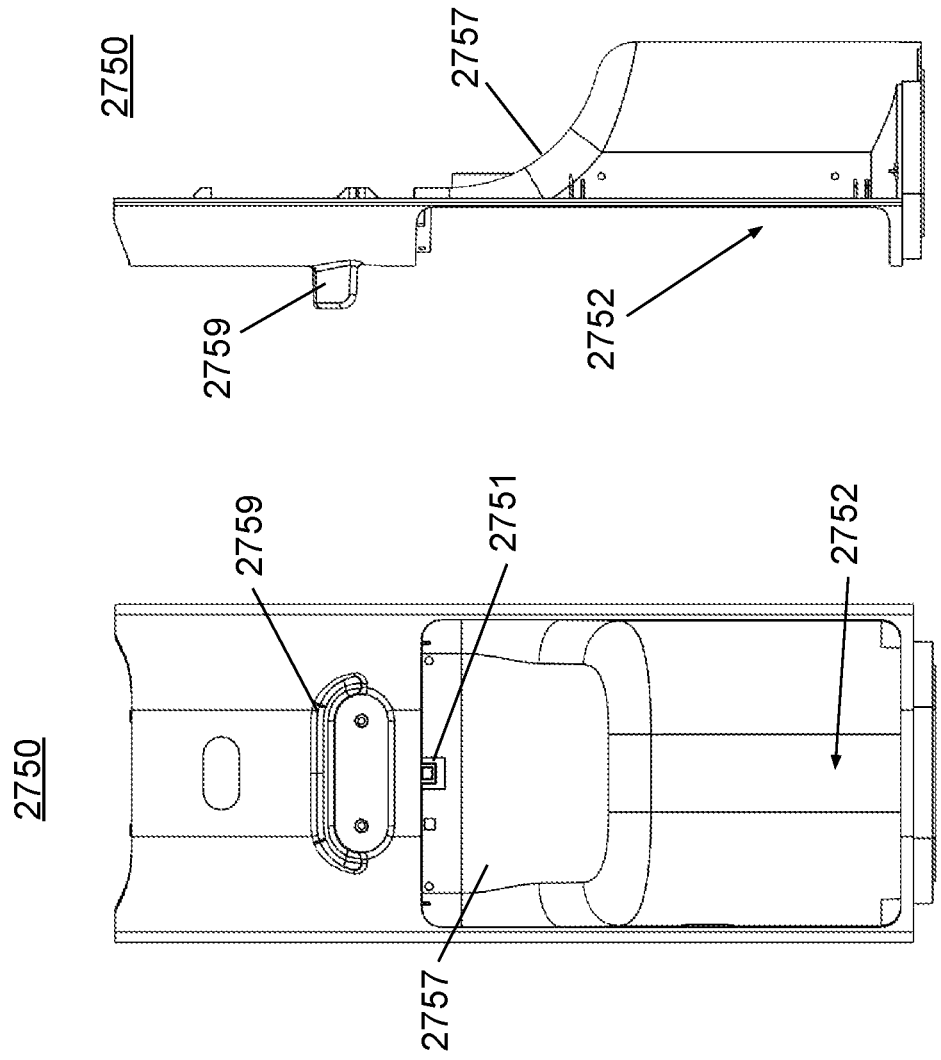
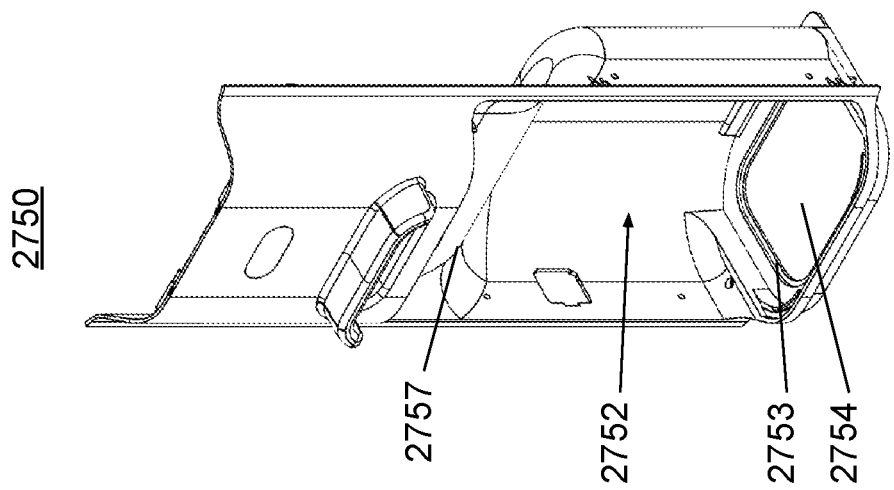
FIG. 31C
FIG. 31B
FIG. 31A

3200

| pulling, via a fan, untreated air downward through an airflow duct assembly from a bucket assembly operative to process organic matter   3210 |

↓

| pushing the untreated air, via the fan, into a manifold   3220 |

↓

| redirecting, with the manifold, the pushed untreated air upward through a media chamber   3230 |

↓

| converting, with the media chamber, the pushed untreated air into treated air   3240 |

↓

| exhausting the treated air out of at least one outlet port   3250 |

| pulling ambient air into the lid assembly via a first fan contained in the lid assembly and pushing the ambient air through an opening into the bucket assembly    3310 |

↓

| pulling, via a second fan, untreated air into the air treatment system from the bucket assembly    3320 |

↓

| pushing the untreated air through the air treatment chamber, wherein the air treatment chamber converts the untreated air to treated air 3330 |

↓

| exhausting the treated air from the OMPA    3340 |

↓

| controlling operation of the bucket assembly, the first fan, and the second fan    3350 |

↓

| controlling an ambient air intake volume with the first fan and a treated air exhaust volume with the second fan, wherein the treated air exhaust volume is greater than or equal to the ambient air intake volume    3360 |

FIG. 33

APPARATUS FOR PROCESSING ORGANIC MATTER HAVING LID AND AIR TREATMENT SYSTEM PROMOTING PLEASANT USER EXPERIENCE

CROSS-REFERENCE TO A RELATED APPLICATION

This patent application claims the benefit of U.S. Provisional Application No. 63/239,852, filed Sep. 1, 2021, and U.S. Provisional Application No. 63/392,339, filed Jul. 26, 2022, the disclosures of which are incorporated herein in their entireties.

TECHNICAL FIELD

This patent specification relates to an organic matter processing apparatus, and more particularly to a lid assembly, and air treatment system, and an air flow control system of the organic matter processing apparatus and the operation thereof.

BACKGROUND

The terms "waste management" and "waste disposal" may be used to refer to the activities required to manage waste from its inception to its disposal. These activities generally include the collection, transport, treatment, and disposal of waste, together with monitoring the process to ensure compliance with related ordinances, rules, and laws. Landfills represent the oldest form of waste management.

A common form of waste in landfills is food and other organic matter. This is a significant problem since food and other organic matter degrades into methane—a powerful greenhouse gas—without oxygen. These harmful emissions can be avoided by diverting food and other organic matter from landfills. One way to divert food and other organic matter from landfills is to process the food and other organic matter into a partially desiccated product using a conventional food recycler or food grinder. These conventional food recyclers and food grinders, however, are not efficient in processing food and other organic matter.

BRIEF SUMMARY

Embodiments disclosed herein provide an organic matter processing apparatus and method for the use thereof to convert organic matter into a ground and desiccated product. The organic matter processing apparatus includes a lid assembly that is positioned at the top or head of the processing apparatus. The lid assembly is operative to open to allow a user to deposit organic matter into the processing apparatus or to remove a removable bucket contained therein. The lid assembly is operative to close and provide an odor containing seal that prevents or substantially mitigates escape of odor. The organic matter processing apparatus also includes an air treatment system operative to convert untreated air into treated air.

A further understanding of the nature and advantages of the embodiments discussed herein may be realized by reference to the remaining portions of the specification and the drawings.

BRIEF DESCRIPTION OF THE DRAWINGS

FIG. 16C shows an alternative latch assembly according to an embodiment.

FIG. 16D shows a detailed view of a latch interface according to an embodiment.

FIGS. 28A and 28B show different views of the fan and a manifold according to an embodiment.

FIGS. 31A-31C show respective perspective, front, and side views of a spine member according to an embodiment.

FIG. 32 shows illustrative process for operating an air treatment system according to an embodiment.

FIG. 33 shows illustrative process for operating an OMPA having a bucket assembly, a lid assembly, and an air treatment system according to an embodiment.

Figure 1:
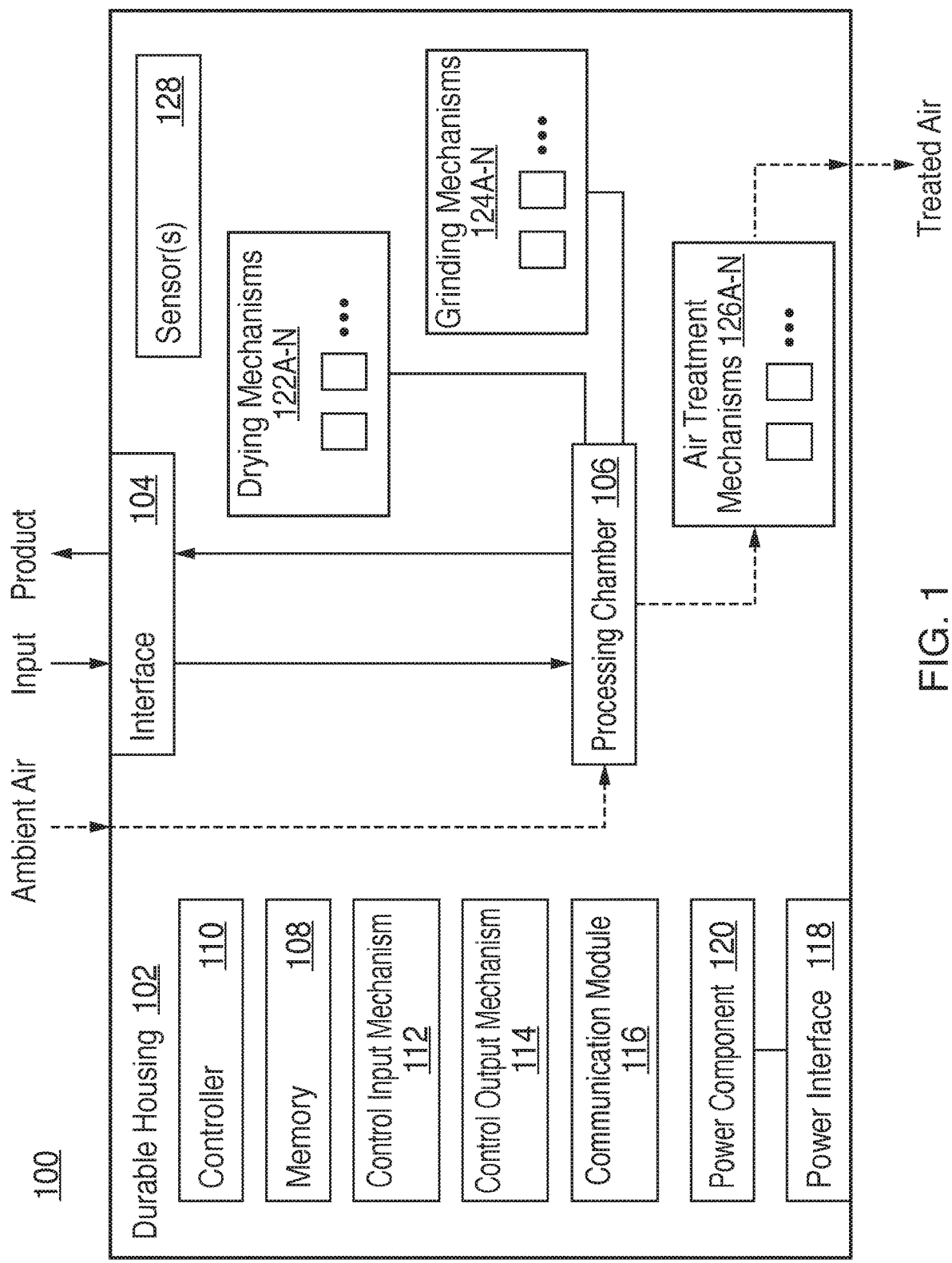
FIG. 1 includes a high-level illustration of an organic matter processing apparatus in accordance with various embodiments according to embodiment.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

As defined herein, an organic matter processing apparatus (OMPA) is an aero-mechanical device operative to convert OMPA input into an OMPA output using judicious combinations of physical, aero, and thermal processes including grinding, paddling, electric heating, and airflow.

OMPA input is defined herein as predominantly organic matter that is intended for processing by the OMPA. OMPA input can include food matter and/or mixed organic matter. Food matter can include consumable food items such as fats, oils, sweets such as sugars and chocolates, dairy products such as milk, yogurt, cheese, proteins such as meat (and bones thereof), poultry (and bones thereof), fish (and bones thereof), beans, eggs, and nuts, vegetables, fruits, and starches such as bread, cereal, pasta, and rice. Food matter is sometimes referred to as foodstuffs. Mixed organic matter can include paper or other fiber materials (e.g., soiled napkins or paper towels), compostable resins, compostable plastics, cellulosic materials (e.g., compostable silverware), and other non-food organic materials. OMPA input can also include other types of biodegradable matter (e.g., compostable diapers).

For many implementations, OMPA input may include food matter and/or mixed organic matter that is post-consumer, post-commercial, or post-industrial in nature, matter that if not processed according to the present teachings could be considered as waste, garbage, refuse, leavings, remains, or scraps. By way of example, food that is leftover on a child's dinner plate, and not in suitable condition or quantity to be stored and served later as leftovers, can represent one example of OMPA input. As another example, items such as potato peels, apple cores, cantaloupe rinds, broccoli stumps, and so forth, and similar organic materials that are spun off from the food preparation process, can represent other examples of OMPA input.

OMPA output is defined herein as processed organics derived from transformation of organic matter processed by the OMPA to yield a ground and selectively desiccated product. The processed organics can be a substantially desiccated product having water content ranging between 0.1 and 30 percent of total weight, between 5 and 25 percent of total weight, between 5 and 20 percent of total weight, between 1 and 15 percent of total weight, between 5 and 15 percent of total weight, between 10 and 15 percent of total weight, between 10 and 20 percent of total weight, between 15-20 percent of total weight, or between 10 and 25 percent of total weight. Alternatively, the processed organics can be a substantially desiccated product having water content of less than 15 percent of total weight, less than 10 percent of total weight, or less than 5 percent of total weight. The processed organics can exist as granulated or ground media. One type of processed organics can be FOOD GROUNDS™.

As defined herein FOOD GROUNDS™ refers to an OMPA output characterized as having a minimum nutritional value. FOOD GROUNDS™ can be derived from OMPA input comprised of a minimum percentage of food matter such that the FOOD GROUNDS™ OMPA output has the minimum nutritional value. The minimum percentage of food matter can ensure that the FOOD GROUNDS™ OMPA output attains at least the minimum nutritional value. For example, a higher nutrient value OMPA output can be more readily obtained from food matter than from mixed organics such as fiber materials and cellulosic materials.

As defined herein, an OMPA output processor repurposes the OMPA output for a commercial purpose. For example, the OMPA output can be used as feed or feedstock for feed for animals or fish. In some embodiments, an OMPA output processor that receives FOOD GROUNDS™ may produce a derivative product having a higher intrinsic value (e.g., nutritional, monetary, or both nutritional and monetary) than a derivative product produced primarily from mixed organics.

As defined herein, non-processed matter refers to matter that is not intended for processing by an OMPA or an OMPA output processor. Non-processed matter is not an OMPA input or an OMPA output. An example of non-processed matter can include inorganic matter such as, for example, metals, plastics, glass, ceramics, rocks, minerals, or any other substance that is not linked to the chemistry of life. Another example of non-processed matter can be yard waste such as grass clippings, leaves, flowers, branches, or the like. In very general terms, non-processed matter can refer to the garbage or waste that a resident or business disposes in a conventional trash bin for transport to a landfill processor, a recycle bin for transport to recyclables processor, or a yard waste bin for transport to a yard waste processor.

In one embodiment, the OMPA is designed to be used primarily in a residential context (e.g., in single family homes, townhouses, condos, apartment buildings, etc.) to convert residential based OMPA input into residential sourced OMPA output. Converting residential generated OMPA input to OMPA output can have a net positive effect in the reduction of methane and space occupied by landfills or compost centers by redirecting the OMPA input and the OMPA output thereof away from traditional reception centers of such material. Moreover, because the OMPA is user friendly, aesthetically pleasing, energy efficient, clean, and substantially odor free, the OMPA provides an easy to use platform for the residential sector to handle OMPA input (e.g., food scraps, etc.), thereby making the decision on what to do with residential based OMPA input an easier one to handle. The OMPA can convert OMPA input into FOOD GROUNDS overnight, where the FOOD GROUNDS are substantially odorless, easily transportable, and shelf-stable. The FOOD GROUNDS can remain in the OMPA until it is full, at which point the FOOD GROUNDS are removed and transported to an OMPA processing facility, which may convert the FOOD GROUNDS into a higher value food product (e.g., animal feed). It should be understood that OMPAs can be used to serve entire communities, cities, and industries. Use of OMPAs in these other sectors, as well as the residential sector, can result in diversion from landfills and further serve a goal of preventing OMPA input from becoming waste in the first place by converting it into usable products that can be used to enable more resilient, sustainable food systems.

Overview of Organic Matter Processing Apparatus

Figure 2B:
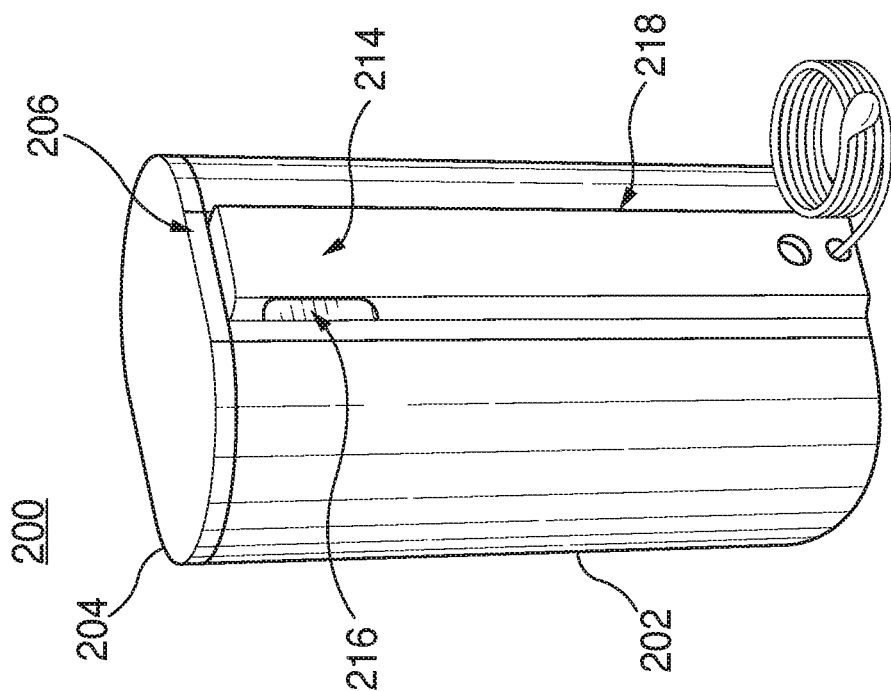
FIG. 2B includes another perspective view of the organic matter processing apparatus with the lid in an open position according to embodiment.
Figure 2A:
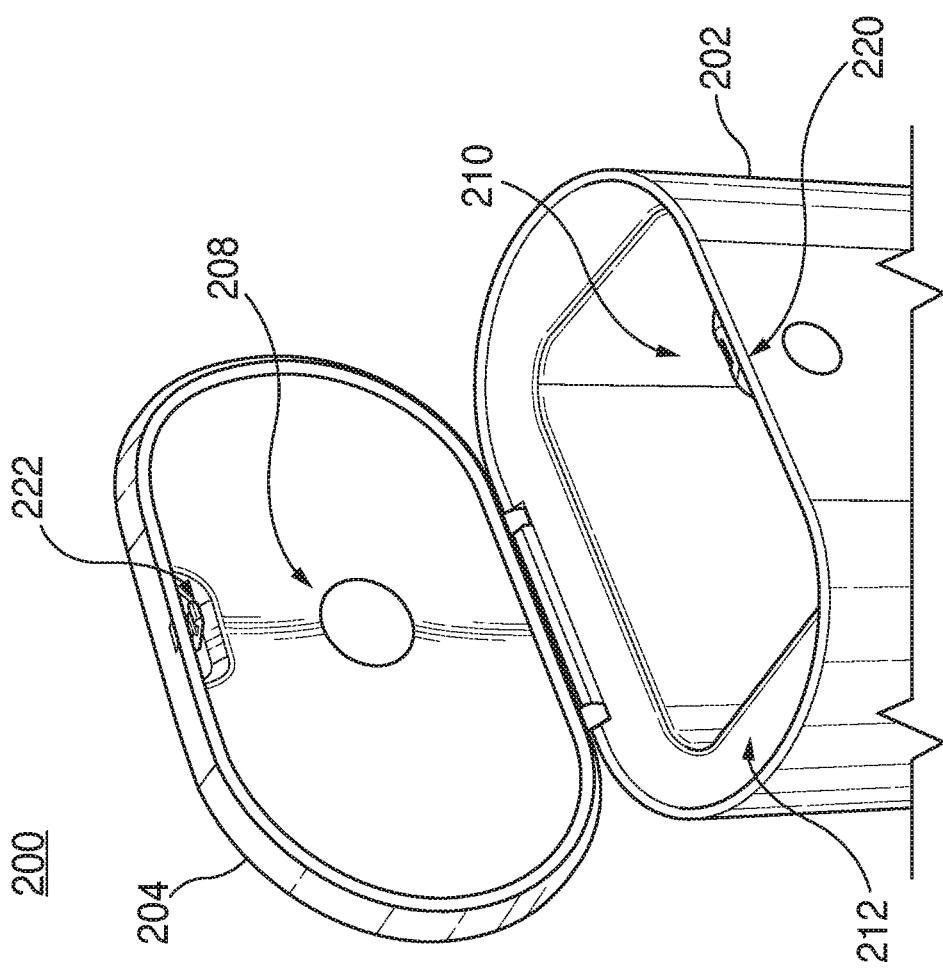
FIG. 2A includes a perspective view of an organic matter processing apparatus that includes a lid in a closed position according to embodiment.

FIG. 1 includes a high-level illustration of a OMPA 100 in accordance with various embodiments. As further discussed below, OMPA 100 may have a durable housing 102 with an interface 104 through which a processing chamber 106 can be accessed. The interface 104 may serve as the ingress interface through which OMPA input can be deposited into the processing chamber 106 and the egress interface through which the product can be retrieved from the processing chamber 106. As shown in FIGS. 2A-B, the durable housing 102 may take the form of a roughly cylindrical container that has an aperture along its top end.

Instructions for operating OMPA 100 may be stored in a memory 108. The memory 108 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the controller 110, the memory 108 can also store data that is generated by OMPA 100. For example, values generated by one or more sensors 128 included in OMPA 100 may be stored in the memory 108 in preparation for further analysis, as further discussed below. As further discussed below, these values may relate to characteristics (e.g., humidity or temperature) of the air traveling through OMPA 100, and insights into the OMPA input contained in the processing chamber 106 can be gained through analysis of these values. Note that the memory 108 is merely an abstract representation of a storage environment. The memory 108 could be comprised of actual integrated circuits (also referred to as "chips"). When executed by a controller 110, the instructions may specify how to control the other components of OMPA 100 to produce OMPA output from OMPA input in the processing chamber 106. The controller 110 may include a general purpose processor or a customized chip (referred to as an "application-specific integrated circuit" or "ASIC") that is designed specifically for OMPA 100.

Generally, OMPA 100 is able to operate on its own. Assume, for example, that OMPA 100 determines that OMPA input has been deposited into the processing chamber 106 based on measurements output by a weight sensor (also referred to as a "mass sensor"), as further discussed below. In response to such a determination, OMPA 100 may initiate processing of the OMPA input. Note, however, that the OMPA input need not necessarily be processed immediately. For example, OMPA 100 may not dry and then grind the OMPA input until a given criterion (e.g., time of day, weight of OMPA input, etc.) or combination(s) of various criteria is/are satisfied.

While OMPA 100 may be able to operate largely, if not entirely, on its own, there may be some situations where input from a user will be helpful or necessary. For example, the user may want to indicate when processing should be temporarily halted so that additional OMPA input can be added to the processing chamber 106. As another example, the user may to request that an operation be initiated or halted. For instance, the user could opt to initiate a "drying cycle" if the ambient environment is expected to be vacant, or the user could opt to halt a "grinding cycle" if the ambient environment is expected to be occupied. The various cycles of OMPA 100 are discussed in greater detail below.

As shown in FIG. 1, OMPA 100 may include a control input mechanism 112 (also referred to as a "data input mechanism" or simply "input mechanism") with which the user can interact to provide input. Examples of input mechanisms include mechanical buttons and keypads for tactile input, microphones for audible input, scanners for visual input (e.g., of machine-readable codes, such as barcodes or Quick Response codes), and the like. OMPA 100 may also include a control output mechanism 114 (also referred to as a "data output mechanism" or simply "output mechanism") for presenting information to inform the user of its status. For example, the control output mechanism 114 may indicate the current cycle (e.g., whether OMPA input is being processed, or whether product is ready for retrieval), connectivity status (e.g., whether OMPA 100 is presently connected to another electronic device via a wireless communication channel), and the like. One example of an output mechanism is a display panel comprised of light-emitting diodes (LEDs), organic LEDs, liquid crystal elements, or electrophoretic elements. In embodiments where the display panel is touch sensitive, the display panel may serve as the control input mechanism 112 and control output mechanism 114. Another example of an output mechanism is a speaker that is operable to output audible notifications (e.g., in response to a determination that the product is ready for retrieval).

Some embodiments of OMPA 100 are able to communicate with other electronic devices via wireless communication channels. For example, a user may be able to interact with OMPA 100 through a control platform (not shown) that is embodied as a computer program executing on an electronic device. The control platform is discussed in greater detail below with reference to FIG. 11. In such embodiments, OMPA 100 may include a communication module 116 that is responsible for receiving data from, or transmitting data to, the electronic device on which the control platform resides. The communication module 116 may be wireless communication circuitry that is designed to establish wireless communication channels with other electronic devices. Examples of wireless communication circuitry include chips configured for Bluetooth®, Wi-Fi®, ZigBee®, LoRa®, Thread, Near Field Communication (NFC), and the like.

OMPA 100 may include a power interface 118 (also referred to as a "power port" or "power jack") that is able to provide main power for the drying and grinding functionality, as well as power for the other components of OMPA 100, as necessary. The power interface 118 may allow OMPA 100 to be physically connected to a power source (e.g., an electrical outlet) from which power can be obtained without limitation. Alternatively, the power interface 118 may be representative of a chip that is able to wirelessly receive power from the power source. The chip may be able to receive power transmitted in accordance with the Qi standard developed by the Wireless Power Consortium or some other wireless power standard. Regardless of its form, the power interface 118 may allow power to be received from a source external to the durable housing 102. In addition to the power interface 118, OMPA 100 may include a power component 120 that can store power received at the power interface 118. The power component 118 could advantageously be useful to maintain some or all operations (e.g., the state of communications and functionality of electronic components) in the event of a power outage. Examples of power components include rechargeable lithium-ion (Li-Ion) batteries, rechargeable nickel-metal hydride (NiMH) batteries, rechargeable nickel-cadmium (NiCad) batteries, and the like.

In order to produce an OMPA output from OMPA input, OMPA 100 (and, more specifically, its controller 110) may control one or more drying mechanisms 122A-N and one or more grinding mechanisms 124A-N. The drying mechanisms 122A-N are discussed in greater detail below with reference to FIGS. 2A-4, while the grinding mechanisms 124A-N are discussed in greater detail below with reference to FIG. 6. The drying mechanisms 122A-N are responsible for desiccating the OMPA input. Desiccation may not only allow the OMPA input easier to process (e.g., grind), but also may prevent the formation of mold that thrives in humid conditions. Examples of drying mechanisms include heating elements that reduce moisture by introducing heat and fans that reduce moisture by introducing an airflow. Meanwhile, the grinding mechanisms are responsible for cutting, crushing, or otherwise separating the OMPA input into fragments. Examples of grinding mechanisms include paddles, mixers, impellers, and rotating blades (e.g., with two, three, or four prongs). Grinding mechanisms are normally comprised of a durable material, such as die cast aluminum, stainless steel, or another material that offers comparable strength and rigidity. By working in concert, the drying and grinding mechanisms 122A-N, 124A-N can convert OMPA input into a more stable product as further discussed below.

Moreover, air may be drawn from the ambient environment into the durable housing 102 and then expelled into the processing chamber 106 so as to help desiccate the OMPA input contained therein, as further discussed below with reference to FIGS. 2A-4. As shown in FIG. 1, air that is drawn from the processing chamber may be treated using one or more air treatment mechanisms 126A-N (also referred to as "air management mechanisms" or "air discharge mechanisms") before being released back into the ambient environment.

Other components may also be included in OMPA 100. For example, sensor(s) 128 may be arranged in various locations throughout OMPA 100 (e.g., along the path that the air travels through OMPA 100). The sensor(s) 128 may include a proximity sensor that is able to detect the presence of nearby individuals without any physical contact. The proximity sensor may include, for example, an emitter that is able to emit infrared (IR) light and a detector that is able to detect reflected IR light that is returned toward the proximity sensor. These types of proximity sensors are sometimes called laser imaging, detection, and ranging (LiDAR) scanners. Alternatively, the presence of an individual may be inferred based (i) whether sounds indicative of the user are detectable (e.g., by a passive microphone or an active sonar system) or (ii) whether an electronic device associated with the user is detectable (e.g., by the communication module 116).

OMPA 100 may adjust its behavior based on whether any individuals are nearby. For instance, OMPA 100 may change its operating state (or simply "state") responsive to a determination that an individual is nearby. As an example, OMPA 100 may stop driving the grinding mechanisms upon determining that someone is located nearby. Thus, OMPA 100 could intelligently react to changes in the ambient environment. Over time, outputs produced by the proximity sensor (plus other components of OMPA 100) could be used to better understand the normal schedule of individuals who frequent the physical space in which OMPA is situated.

In some embodiments, OMPA 100 includes an ambient light sensor whose output can be used to control different components. The ambient light sensor may be representative of a photodetector that is able to sense the amount of ambient light and generate, as output, values that are indicative of the sensed amount of ambient light. In embodiments where the control output mechanism 114 is a display panel, the values output by the ambient light sensor may be used by the controller 110 to adjust the brightness of the display panel.

Desiccating OMPA Input Through Airflow Generation

One core aspect of OMPA is its ability to desiccate OMPA input that is deposited into the processing chamber. By removing moisture from the OMPA input through a judicious application of heating, grinding, mixing, and airflow according to the teachings herein, the OMPA can substantially halt decomposition of the OMPA input and produce a stable mass of dried-and-grinded OMPA input (hereinafter "OMPA output" or "end product" or simply "product"). This can be accomplished by directing an airflow through the processing chamber that causes the OMPA input to become increasingly dry in a predictable manner.

FIG. 2A includes a front-side perspective view of OMPA 200 that includes a lid 204 in a closed position. FIG. 2B, meanwhile, includes a rear-side perspective view of OMPA 200 with the lid 204 in an open position. As further discussed below, the lid 204 may be pivotably connected to a durable housing 202, so as to allow a user to easily expose and then cover a processing chamber 210 located inside the durable housing 202. As described further herein, OMPA 200 can be advantageously designed and configured such that it can be placed flush up against a wall or other barrier in a space-saving manner, in that it does not require gapped separation from the wall, while at the same time maintaining the ability for good airflow in and out of OMPA 200.

As shown in FIG. 2A, the lid 204 may have one or more air ingress openings 206 (or simply "openings") through which air can be drawn from the ambient environment by a first fan (also referred to as a "turbulent fan") installed therein. Here, for example, a single opening 206 is located along a periphery of the lid 204 near a rear side of the OMPA 200. Generally, the opening(s) 206 are located near where the lid 204 is pivotably connected to the durable housing 202. Advantageously, there may be a built-in offset between a plane of the opening 206 and a backmost plane of the overall durable housing 202, whereby airflow into OMPA 200 will not be impeded even while the backmost plane is flush against a wall. However, the opening(s) 206 could be located, additionally or alternatively, elsewhere along the exterior surface of the lid 204. For example, multiple openings may be spaced along a periphery of the lid 204 to further ensure that sufficient air can be drawn into the lid 204 by the first fan even if OMPA 200 is positioned proximate to an obstacle (e.g., a wall).

As shown in FIG. 2B, this air can then be expelled toward the OMPA input through one or more openings 208 along the interior surface of the lid 204. This will create a downward airflow that causes turbulence inside the processing chamber 210, thereby increasing the rate at which the OMPA input is dried. The speed of the first fan may be roughly proportional to the speed of the downward airflow (and thus, the amount of turbulence). OMPA 200 may increase the speed of the first fan if quicker drying is desired.

Accordingly, the first fan may draw air through the opening(s) 206 in the exterior surface of the lid 204 and then blow the air downward toward the OMPA input to create a turbulent airflow (also referred to as a "turbulent airstream"). This turbulent airflow may create small vortices inside the processing chamber 210 that ensure the air continues to move across the surface of the OMPA input.

In the embodiment shown in FIG. 2B, the opening(s) 208 are centrally located along the interior surface of the lid 204. However, the opening(s) 208 could be located elsewhere along the interior surface of the lid 204. For example, the opening(s) 208 may be located along one edge of the lid 204 if the intake vent through which air is removed from the processing chamber 210 is located near an opposing edge of the lid 204.

When in operation, air can be removed from the processing chamber 210 through a used-air intake vent (not shown) in an exhaust hood that is located beneath a bezel 212. The intake vent is further discussed below with reference to FIGS. 3A-B. The bezel 212 may extend around a periphery of the durable housing 202 to "frame" the aperture through which OMPA input can be deposited in the processing chamber 210. The exhaust hood may be partially or fully obstructed when the bezel 212 is installed within the durable housing 202. Here, for example, the exhaust hood is fully obstructed by the bezel 212, and therefore cannot be easily viewed while the bezel 212 is installed within the durable housing 202.

As further discussed below, a user may need to remove the bezel 212 in order to remove the processing chamber 210 from the durable housing 202. To remove the bezel 212, the user may grasp a structural feature 220 (referred to as a "lip") that allows the bezel 212 to be readily removed by hand. The structural feature 220 may also serve other purposes. For example, the structural feature 220 may accommodate a locking mechanism 222 that extends downward from the lid 204 into the durable housing 202. After the locking mechanism 222 extends into the durable housing 202, a latch (e.g., driven by a solenoid) may secure the locking mechanism 222 in place. This may be helpful to restrict access when, for example, the OMPA 200 is operating at high intensity and contents of the processing chamber 210 are hot.

Figure 3A:
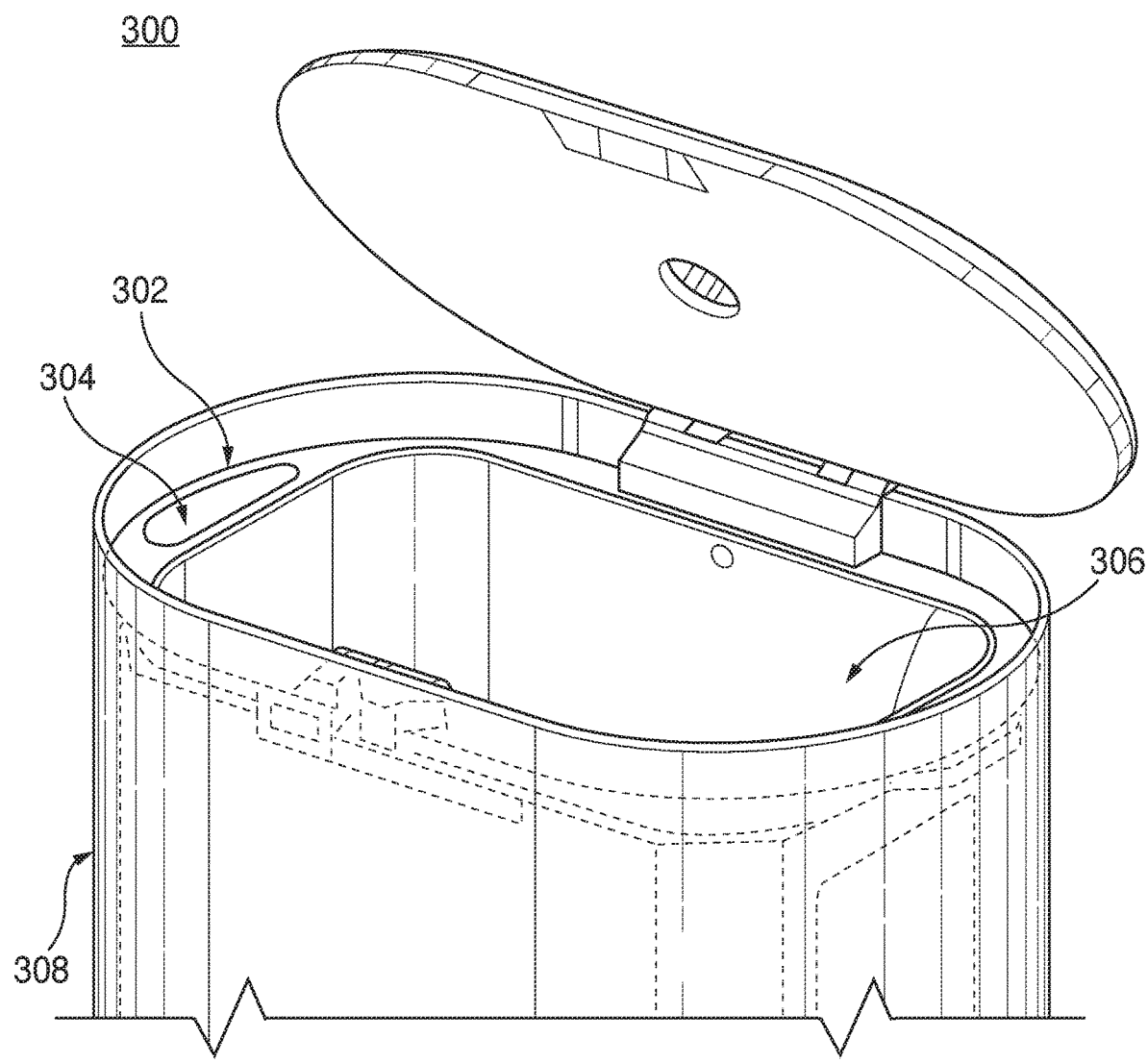
FIG. 3A includes a perspective view of an organic matter processing apparatus without its bezel to illustrate one possible location for the exhaust hood that extends over an intake vent according to embodiment.

Removal of the bezel 212 may expose the exhaust hood as mentioned above. FIG. 3A includes a perspective view of OMPA 300 without its bezel to illustrate one possible location for the exhaust hood 302 that extends over a used-air intake vent. As further discussed below, the processing chamber 306 of OMPA 300 may be representative of a receptacle that can be removably installed within a cavity that is defined by an interior surface of the durable housing 308. Normally, the exhaust hood 302 is located along the interior surface such that, when the receptable is installed within the cavity, the used-air intake vent is positioned proximate to an upper end of the receptacle. Said another way, the exhaust hood 302 may be positioned so that the used-air intake vent is not obstructed when the receptacle is installed within the cavity in the durable housing 308.

At a high level, the exhaust hood 302 may be designed to guide or direct air from the processing chamber 306 through the used-air intake vent for treatment and then release into the ambient environment. A filter 304 may be installed in the used-air intake vent to prevent large fragments of OMPA input or product from entering the odor treatment system. This filter 304 may be removable. Accordingly, a user may be able to remove the filter 304 (e.g., for cleaning purposes), or the user may be able to replace the filter 304.

Figure 3B:
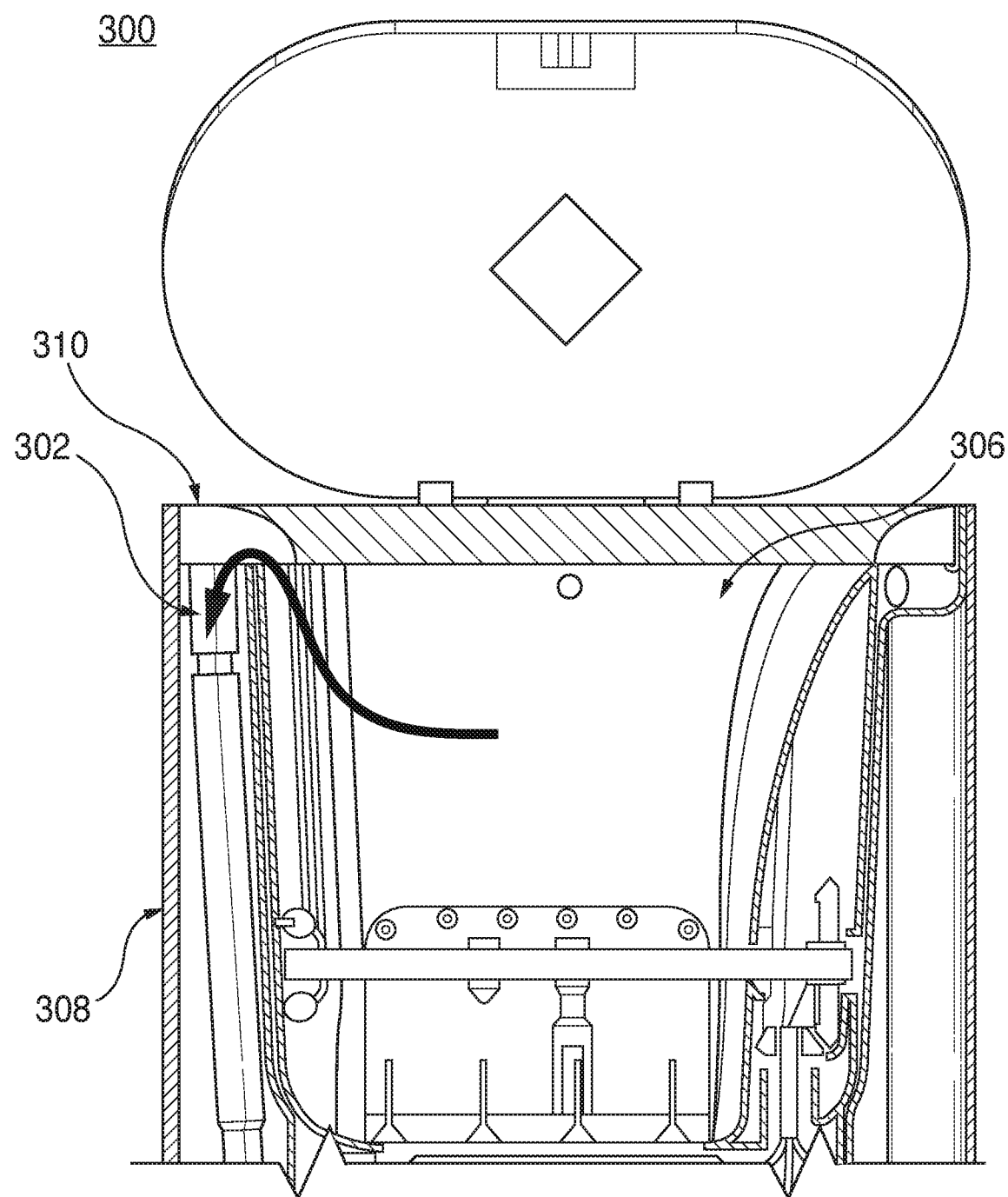
FIG. 3B illustrates how, when the bezel is installed in the organic matter processing apparatus, air in the processing chamber can flow underneath the bezel into a space above the edge of the receptacle and then downward through the used-air intake vent according to embodiment.

FIG. 3B illustrates how, when the bezel 310 is installed in OMPA 300, air in the processing chamber 306 can flow underneath the bezel 310 into a space above the edge of the receptacle and then downward through the used-air intake vent. Air that is removed from the processing chamber 306 through the used-air intake vent can be routed through an odor treatment system (not shown) of OMPA 300 for treatment, as further discussed below with reference to FIG. 4A. Then, the treated air can be expelled from OMPA 300 into the ambient environment. Referring again to FIG. 2, the treated air may be expelled through one or more air egress openings (or simply "openings") located along an interior surface of a mechanical feature 214. The interior surface of the mechanical feature 214 may define a space 216 into which treated air can be expelled. As shown in FIG. 2B, the space may not be fully enclosed. Here, for example, the mechanical feature 214 is roughly in the form of an open cylinder, and thus may also serve as a handle along the exterior surface of the durable housing 202. Additionally or alternatively, opening(s) may be located along the rear surface of the durable housing 202 but oriented such that the treated air is expelled outward at an angle. For example, opening(s) may be located along one or both sides of a vertical pillar 218 (also referred to as a "spine") that runs along the rear side of OMPA 200, so that the treated air is expelled toward the sides of OMPA 200. These designs allow treated air—which may be moister than ambient air—to exit OMPA 200 without being expelled directly onto a nearby obstacle (e.g., a wall). Another benefit of these designs is that "recycling" of air is minimized by ensuring that the treated air is not expelled toward the opening 206 in the lid 204 through which air is drawn into OMPA 200. Advantageously, the vertical pillar 218 can serve multiple functions. The vertical pillar 218 may not only serve as a mechanical offset that allows OMPA 200 to be placed adjacent to obstacles without obstructing incoming and outgoing airflow, but may also function as a plenum by providing a pathway along which air can travel while inside the durable housing 202. Moreover, the vertical pillar can act as an anti-tipping mechanism by providing stability.

Figure 4A:
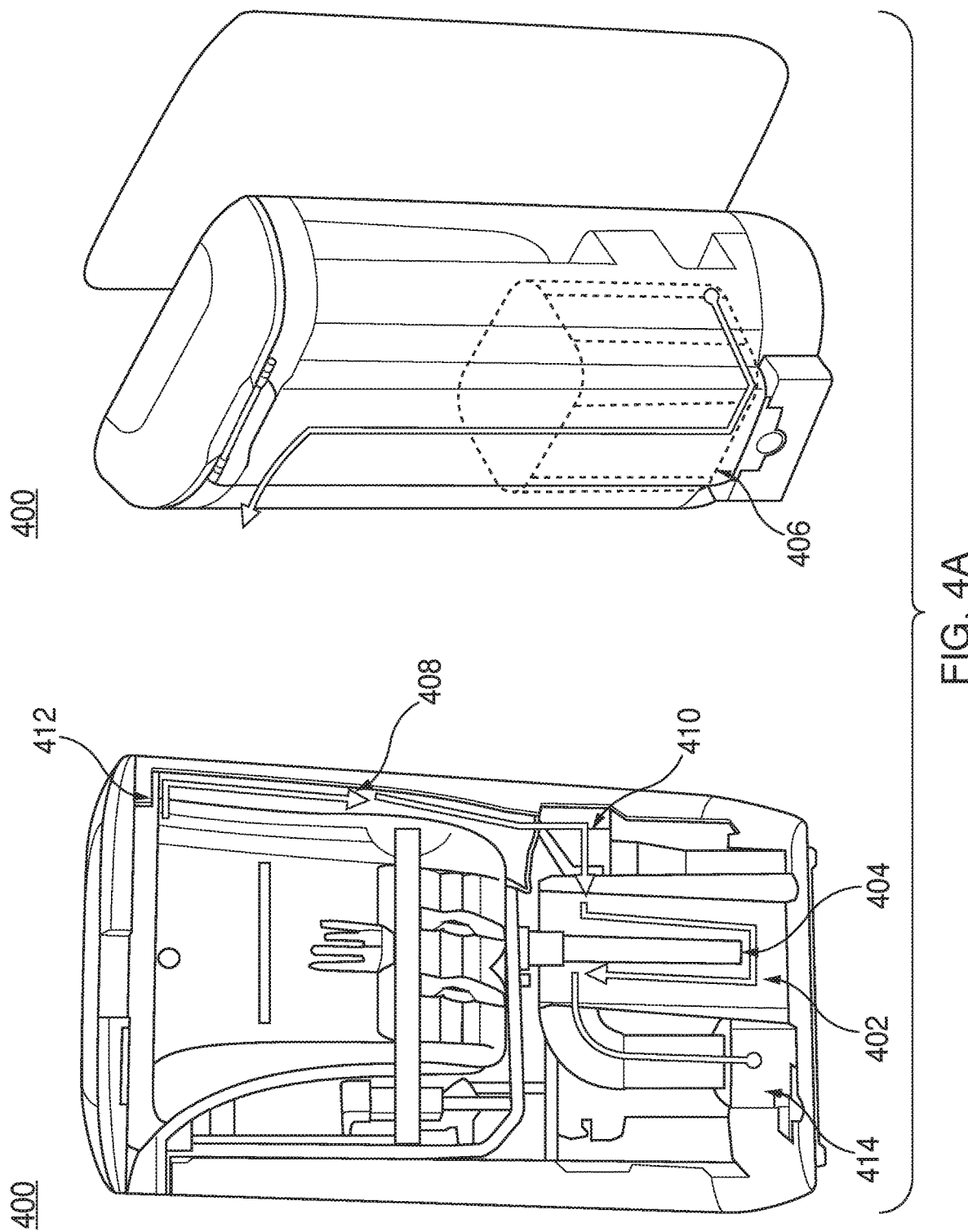
FIG. 4A includes isometric front and rear perspective views of an organic matter processing apparatus where the durable housing is transparent to show additional details according to embodiment.

FIG. 4A includes isometric front and rear perspective views of OMPA 400 where the durable housing is transparent to show additional details. In FIG. 4A, a trace is shown to indicate the route that air drawn from the processing chamber (e.g., through the exhaust hood 302 of FIG. 3) traverses before exiting OMPA 400. There are two main chambers through which the air guided as it traverses the route.

First, the air is guided through a photolysis chamber 402. In the photolysis chamber 402, the air is exposed to light emitted by a light source 404 that is meant to cause the decomposition or separation of odor-causing molecules. The light source 404 may be, for example, an ultraviolet (UV) bulb or UV light-emitting diode (LED).

Second, the air is guided through a dry media chamber 406. In the dry media chamber 406, the air is exposed to dry media that is meant to trap odor-causing molecules through a process referred to as adsorption. Examples of dry media include charcoal, coconut shell carbon, and manganese dioxide. In addition to acting as an odor destructor, the dry media may also act as an ozone destructor. Ozone may be generated by the light source 404 in the photolysis chamber 402, and the dry media may help to destroy that ozone.

In some embodiments, the durable housing includes a pivotable door that permits access to the dry media chamber 406. By opening the pivotable door, a user may be able to easily replace the dry media in the dry media chamber 406. For example, the user may remove existing canisters and then reinstall new canisters that have loose granules, disks, or other particulates of the dry media stored therein. Such a design allows the dry media to be replaced whenever necessary.

Following treatment in the dry media chamber 406, the air may rise upward through the vertical pillar along the rear side of the OMPA 400 that acts as a plenum. Then, the air can be expelled into the ambient environment through opening(s) located near the upper end of the vertical pillar as discussed above with reference to FIG. 2B.

Accordingly, air may initially be drawn through a used-air intake vent 412 into a channel 408 by a second fan 410 (also referred to as a "blower fan") that is located in or near the channel 408. The used-air intake vent 412 is the same used-air intake vent as mentioned above with reference to FIGS. 2-3. The air can then be directed into the photolysis chamber 402. Air leaving the photolysis chamber 402 can be directed into the dry media chamber 406. In some embodiments, the air is heated by a heater 414 before it enters the dry media chamber 406 in order to decrease moisture. This may help lengthen the lifespan of the dry media in the dry media chamber 406. After the air has been treated in the photolysis and dry media chambers 402, 406—which collectively represent the odor treatment system—the air can be guided upward through the vertical pillar that acts as a plenum, and then the air can be expelled into the ambient environment. As mentioned above, the air could be expelled through opening(s) along the rear surface of the durable housing.

The first fan included in the lid of OMPA 400 and the second fan 410 situated in the odor treatment system of the OMPA 400 may have variable speeds. Accordingly, a controller (e.g., controller 110 of FIG. 1) may be able to easily change the speed of the first and second fans. However, to ensure that air is drawn through the used-air intake vent 412, the second fan 410 may be driven at a higher speed than the first fan. Driving the second fan 410 at a higher speed than the first fan will result in a pressure differential that causes air to be advantageously drawn through the used-air intake vent 412.

Figure 4B:
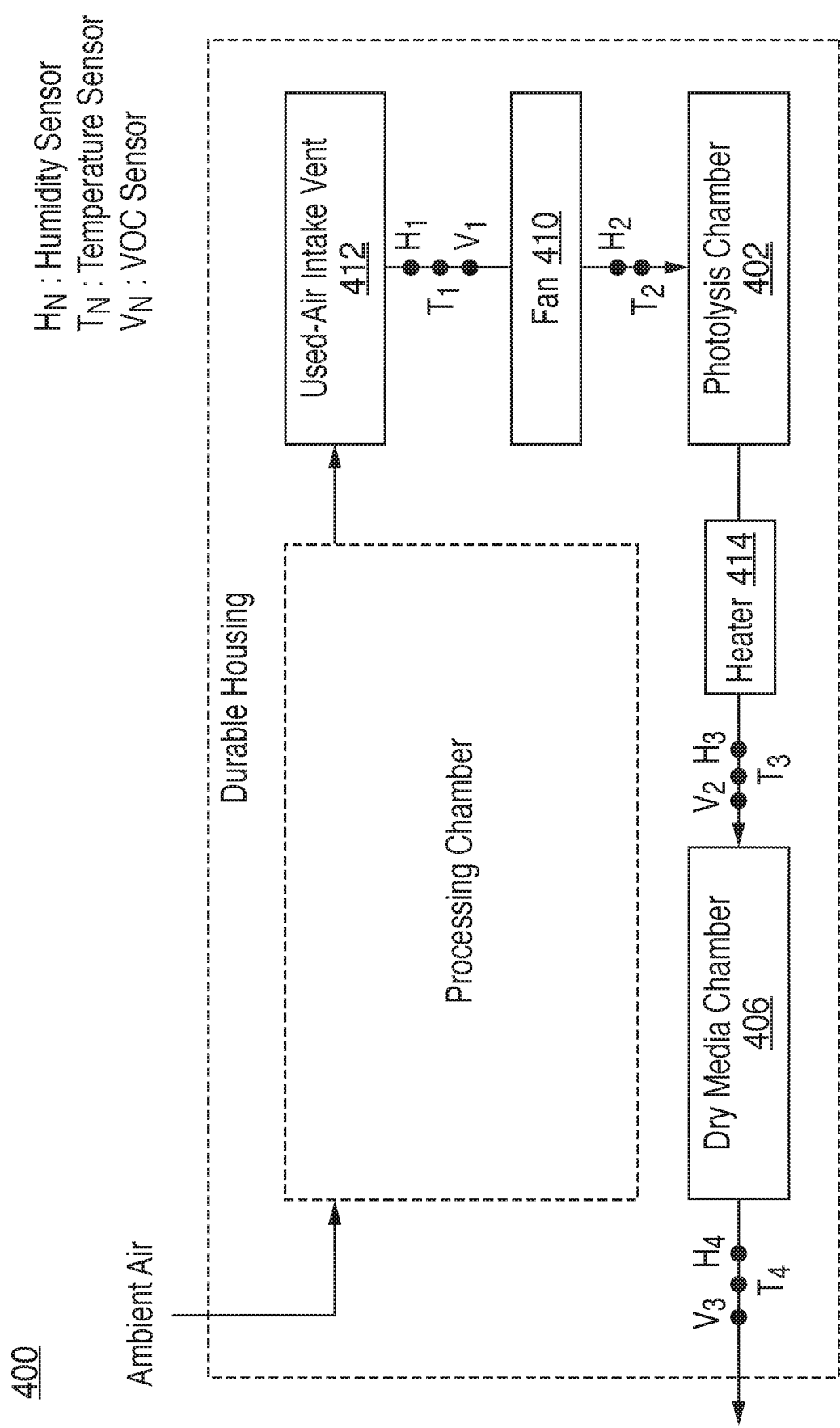
FIG. 4B includes a conceptual diagram that identifies possible locations for different types of sensors according to embodiment.

In order to gain insights in the nature of the air as it travels through OMPA 400, one or more sensors may be located along the route indicated by the trace. FIG. 4B includes a conceptual diagram that identifies possible locations for different types of sensors. Note that the selection and placement of sensors in FIG. 4B is provided for the purpose of illustration, and some or all of these sensors could be included in OMPA 400. For example, sensors able to measure temperature and humidity may be located proximate to the intake vent 412, the entry of the photolysis chamber 402, the channel interconnected between the photolysis and dry media chambers 402, 406, the exit of the dry media chamber 406, or any combination thereof. As another example, a sensor able to measure ozone may be located in the channel 408 leading to the photolysis chamber 402 and/or the channel interconnected between the photolysis and dry media chambers 402, 406. As another example, a sensor able to measure volatile organic compounds (VOCs) may be located along the route. If the VOC sensor is located before the photolysis chamber 402, its measurements may be used to monitor variations in odor across the lifetime of the OMPA 400. Meanwhile, if the VOC sensor is located after the photolysis chamber 402, its measurements may be used to determine the degree to which the dry media chamber 406 is responsible for destroying odor. Said another way, measurements produced by a VOC sensor located after the photolysis chamber 402 could be a useful indicator of the expected lifetime of the dry media in the dry media chamber 406. Other measurement dimensions that may be monitored by sensor(s) include carbon dioxide ($CO_2$), carbon monoxide (CO), dioxygen ($O_2$), hydrogen sulfide ($H_2S$), nitrogen dioxide ($NO_2$), potential of hydrogen (pH), and salinity.

Because the sensors are located along the route indicated by the trace, the odor treatment system may be able to operate as a closed loop system. The term "closed loop system," as used herein, is meant to describe a system that is able to dynamically adjust its activities based on feedback to achieve a desired goal. For instance, measurements generated by VOC sensors located along the route indicated by the trace may influence how a controller (e.g., the controller 110 of FIG. 1) controls different components of the OMPA 400. As an example, if measurements generated by a VOC sensor (e.g., V2 or V3 in FIG. 4B) located after the photolysis chamber 402 indicate that the air still has a relatively high concentration of an undesired gas, then the controller may adjust the speed of the second fan 410 so as to change the amount of time that the air remains in the photolysis and dry media chambers 402, 406. The measurements generated by VOC sensors could also be used to infer the condition of the photolysis and dry media chambers 402, 406. Assume, for example, that a VOC sensor is located between the photolysis chamber 402 and dry media chamber 406 as shown in FIG. 4B. In such a scenario, measurements generated by the VOC sensor may be used to predict the state of the dry media included in the dry media chamber 406. Said another way, measurements generated by the VOC sensor may be used to infer the amount of undesired gasses to which the dry media contained in the dry media chamber 406 has been exposed. Rather than simply instruct a user to replace the dry media on a periodic basis (e.g., every month, two months, or three months), an OMPA could instead intelligently indicate when replacement is necessary based on an analysis of measurements generated by the VOC sensor.

While sensors could be located at various positions along the route, sensors generally should not be installed in the photolysis chamber 402. As mentioned above, the light source 402 located in the photolysis chamber 402 may generate ozone as it emits light. This ozone can have a significant oxidative effect on various sensors. As such, sensors are generally not installed in the photolysis chamber 402.

One or more sensors could also be installed inside the processing chamber, for example, to measure characteristics of the air above the OMPA input (i.e., air in the "headspace" of the processing chamber). For example, sensors could be located along the interior surface of the lid, or sensors could be located along the interior surface of the processing chamber.

Additional sensors could also be located along the route indicated by the trace shown in FIG. 4A. For example, OMPA 400 may include a tachometer that measures the rotation speed of the shift of the second fan 410. Values output by the tachometer may be used (e.g., by the controller 110 of FIG. 1) to predict the speed at which the airflow is traveling through the OMPA 400, and therefore how to control other components (e.g., the drying and grinding mechanisms 122A-N, 124A-N of FIG. 1) of OMPA 400. Additionally or alternatively, OMPA 400 may include a dedicated sensor that is responsible for measuring the speed of the airflow, either directly or indirectly. For example, a hot wire anemometer may be situated along the route within the airflow. The hot wire anemometer may be electrically heated to some temperature above the ambient temperature. The airflow will cool the wire, and the speed of the airflow can be inferred based on the decrease in temperature. As another example, a pressure sensor may be situated along the route within the airflow. As the airflow contacts the pressure sensor, values indicative of the total force may be produced. The speed of the airflow can be inferred based on these values.

Practical Processing Chamber

Figure 5:
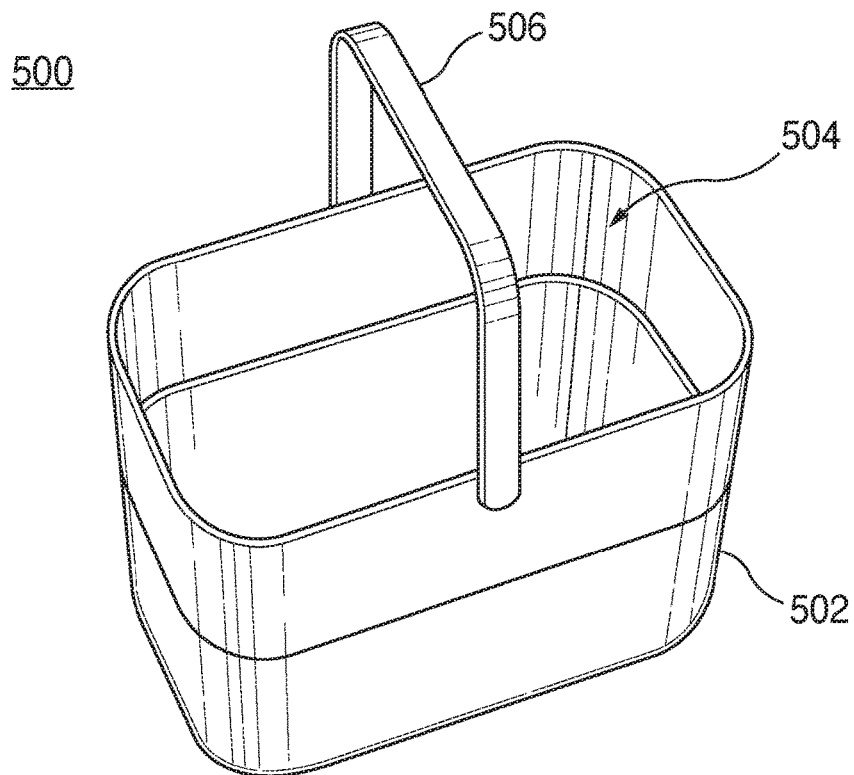
FIG. 5 includes a perspective view of a processing chamber that comprises a receptacle (also referred to as a "bucket") designed to fit securely within the durable housing of an organic matter processing apparatus according to embodiment.

Another core aspect of the OMPA is providing a processing chamber that not only allows OMPA input to be processed in a consistent, predictable manner, but is also easy to use by various individuals. FIG. 5 includes a perspective view of a processing chamber 500 that comprises a receptacle 502 (also referred to as a "bucket") designed to fit securely within the durable housing of an OMPA. The bucket 502 is preferably user-removable from the durable housing, so as to allow for easier integration into existing workflows. For example, the bucket 502 may be placed on the counter during food preparation and then reinstalled in the durable housing afterwards. As another example, the bucket 502 may be removed from the durable housing after production of the product is complete to allow for easier handling (e.g., disposal, storage, or use) of the product.

Generally, the bucket 502 is designed so that, when installed in the durable housing, OMPA input can be easily deposited by simply opening the lid of the OMPA. Normally, the bucket 502 includes an aperture 504 along its top end that is sized to allow for various forms of OMPA input. In some embodiments, the aperture 504 has a rectangular form that is 200-500 millimeters (mm) (7.87-19.68 inches) in length and 150-300 mm (5.90-11.81) in width. For example, the aperture 504 may have a length of roughly 350 mm (13.78 inches) and a width of roughly 200 mm (7.87 inches). Meanwhile, the bucket 502 may have a roughly prismatic form with a length of 250-500 mm (9.84-19.68 inches), a width of 100-300 mm (3.94-11.81 inches), and a height of 150-350 mm (5.90-13.78 inches). For example, the bucket 502 may have a length of roughly 320 mm (12.60 inches), a width of roughly 195 mm (7.68 inches), and a height of roughly 250 mm (9.84 inches).

Moreover, the bucket 502 may be designed to be easily washable (e.g., in a dishwasher). Thus, the bucket 502 may be comprised of one or more durable materials that can withstand prolonged exposure to OMPA input in various states (e.g., moist and dry), as well as repeated washings. Examples of durable materials include plastics, ceramics, metals, and biocomposites. The term "biocomposite," as used herein, may refer to a composite material formed by a matrix (e.g., of resin) and a reinforcement of natural fibers. Biocomposites may be well suited because the matrix can be formed with polymers derived from renewable resources. For example, fibers may be derived from crops (e.g., cotton, flax, or hemp), wood, paper, and the like. This makes biocomposites an attractive option since the benefits (e.g., a focus on renewability and recyclability) align with those offered by the OMPA.

As shown in FIG. 5, a handle 506 may be pivotably connected to opposing sides of the bucket 502. Such a design allows the handle 506 to be pivoted downward when the bucket 502 is installed in the structural body of the OMPA. This can be seen in FIG. 2A, where the handle is folded downward to accommodate a bezel. Thus, the handle 506 may be designed so as to not impede the deposition of OMPA input into the bucket 502. The handle 506 may be designed to allow a user to easily carry the entire processing chamber 500, with either one or two hands. To ensure that the processing chamber 500 can be transported without issue, the bucket 502 may be designed so that, when loaded with product, the weight does not exceed a threshold. The threshold may depend on the size of the bucket 502 and/or the material(s) from which the bucket 502 is made, though it may be desirable to limit the weight to no more than 10-25 pounds (and preferably 15-20 pounds).

Figure 6:
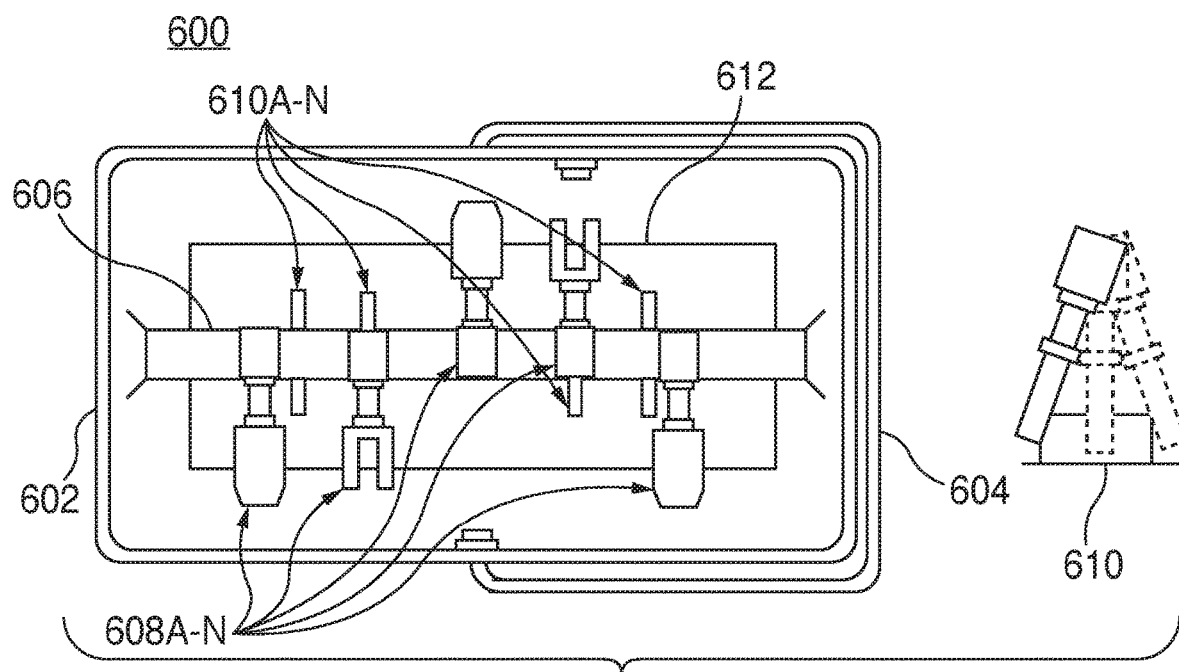
FIG. 6 includes a top view of a processing chamber that includes a bucket with a handle pivotably connected thereto according to embodiment.

FIG. 6 includes a top view of a processing chamber 600 that includes a bucket 602 with a handle 604 pivotably connected thereto. As mentioned above, a OMPA may include one or more grinding mechanisms 608A-N that are responsible for cutting, crushing, or otherwise separating OMPA input deposited into the bucket 602 into fragments. The grinding mechanisms 608A-N may be part of the processing chamber 600 as shown in FIG. 6. Here, for example, five grinding mechanisms are fixedly attached to a central rod 606 that arranged horizontally across the width of the bucket 602 and is driven by gears (not shown), which are in turn driven by a motor (not shown). The motor may be located in the durable housing, while the gears may be located in the bucket 602 as further discussed with reference to FIG. 7.

The grinding mechanisms 608A-N can be driven in such a manner that an appropriate amount of grinding occurs. In some embodiments, the appropriate amount of grinding is predetermined (e.g., programmed in memory of the OMPA). In other embodiments, the appropriate amount of grinding is determined dynamically based on a characteristic of OMPA input in the bucket 602. For example, the appropriate amount of grinding may be based on the amount of OMPA input (e.g., as determined based on measurements output by a mass sensor) contained in the bucket 602. As another example, the appropriate amount of grinding may be based on the amount of resistance that is experienced by the grinding mechanisms 608A-N. Generally, dried OMPA input that has been at least partially ground will offer less resistance than wet OMPA input or dried OMPA input that has not been ground.

As the central rod 606 rotates, the grinding mechanisms 608A-N may also rotate. Generally, the grinding mechanisms rotate at a rate of 1-10 rotations per minute (RPM), at a rate of 1-2 RPMs, or 1.6 RPMS. This rotating action may cause OMPA input located near the bottom of the bucket 602 to be brought toward the top of the bucket 602, such that all OMPA input contained in the bucket 602 is occasionally exposed to the downward airflow emitted from the lid.

The grinding mechanisms 608A-N may not provide sufficient shear on their own to break apart more solid OMPA input. Examples of solid OMPA input include bones, raw produce, and the like. To address this issue, the bucket 602 may include one or more stationary blades 610A-N that can work in concert with some or all of the grinding mechanisms 608A-N. Assume, for example, that the processing chamber 600 includes at least one paddle and at least one two-prong rotating blade. In FIG. 6, the processing chamber 600 includes three paddles and two two-prong rotating blades that are alternately arranged along the length of the central rod 606. In such an embodiment, the stationary blades 610A-N may be positioned so that as each two-prong rotating blade rotates, a corresponding stationary blade will pass through its two prongs to create cutting action. A side view of this scenario is shown in FIG. 6. Paddles may also create some cutting action. However, paddles may create less cutting action than the two-prong rotating blades since (i) the paddles are generally oriented at an angle to promote upward and sideward movement of OMPA input and (ii) the paddles generally pass alongside the stationary blades 610, thereby providing less shear.

Generally, more than one type of grinding mechanism is included in the processing chamber 600. For example, paddles and rotating blades could be arranged in an alternating pattern across the width of the bucket 602 so provide different functionalities. While the paddles may have limited usefulness in terms of grinding OMPA input, the paddles may be useful in churning OMPA input so that wetter material rises toward the top of the bucket 602. Accordingly, some "grinding mechanisms" may be primarily responsible for cutting OMPA input into smaller fragments while other "grinding mechanisms" may be primarily responsible for mixing the OMPA input to promote desiccation.

In FIG. 6, the paddles and rotating blades are shown to be coplanar—though extending from opposing sides of the central rod 606—for the purpose of illustration. The grinding mechanisms 608A-N could be radially arranged about the periphery of the central rod 606 in different ways. For example, the three paddles shown in FIG. 6 could be equally spaced about the circumference of the central rod 606 to ensure that OMPA input contained in the bucket 602 is constantly, or nearly constantly, jostled. Generally, the two-prong rotating blades are offset to minimize the torque that is needed to cut through OMPA input at any given point in time. Said another way, the two-prong rotating blades may be offset so that only one is actively cutting OMPA input in conjunction with its corresponding stationary blade 610 at a time. Here, for example, the two two-prong rotating blades are offset by 180 degrees, though the blades could be offset by more or less than 180 degrees.

Grinding mechanisms (and the power available to those grinding mechanisms) may govern the types of OMPA input that can be handled by a given OMPA. Generally, stronger grinding mechanisms in combination with more power will allow heavier duty OMPA input (e.g., bones) to be handled without issue. Accordingly, different embodiments of OMPA could be designed for residential environments (e.g., with less power and weaker grinding mechanisms) and commercial environments (e.g., with more power and stronger grinding mechanisms).

In some embodiments, the bucket 602 includes a thermally conductive base portion 612 that is responsible for conveying heat to the OMPA input. Normally, the thermally conductive base portion 612 may extend up the longitudinal sidewalls of the bucket 602 that are parallel to the central rod 606. In embodiments where the thermally conductive base portion 612 is responsible for heating the OMPA input, the thermally conductive base portion 612 may extend up the longitudinal sidewalls roughly 40-70 percent of their height. In embodiments where the thermally conductive base portion 612 is responsible for heating the OMPA input and air in the "headspace" of the processing chamber 600, the thermally conductive base portion 612 may extend up the longitudinal sidewalls roughly 70-90 percent of their height.

Figure 7:
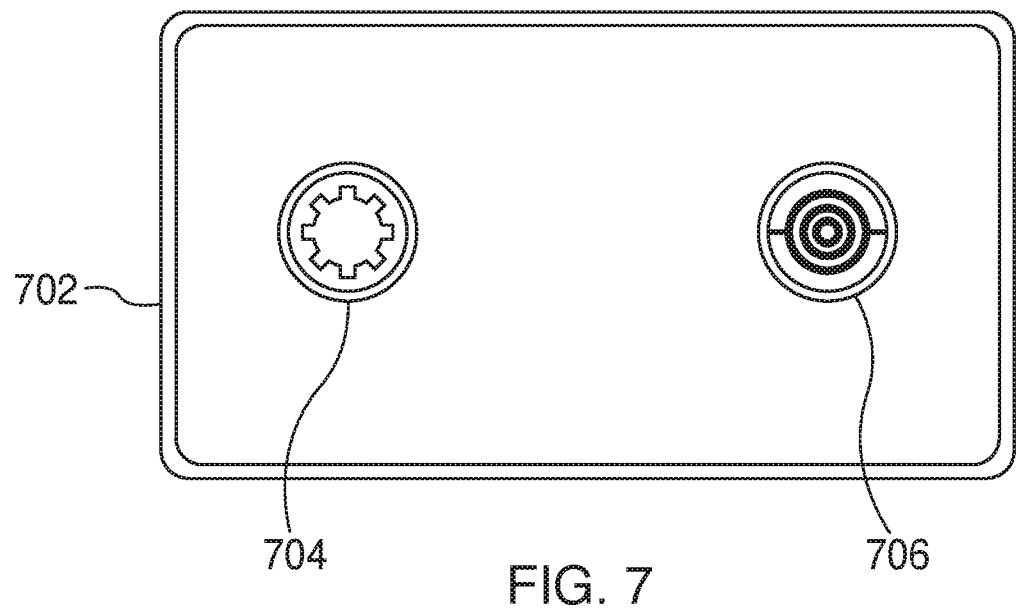
FIG. 7 includes a top view of a cavity in a durable housing that includes a mechanical coupling and an electrical coupling according to embodiment.

When the bucket 602 is installed within the durable housing, the thermally conductive base portion 612 may be electrically connected to a heating element (e.g., a resistive heating element in the form of a coil) that is located in the durable housing. FIG. 7 includes a top view of a cavity in a durable housing 702 that includes a mechanical coupling 704 and an electrical coupling 706. When installed within the cavity in the durable housing 702, the processing chamber 600 may be connected to the mechanical and electrical couplings 704, 706. Thus, the mechanical and electrical couplings 704 may be detachably connectable to respective interconnects on the processing chamber 600. The mechanical coupling 704 may be responsible for driving gears that are located in the bucket 602, while the electrical coupling 706 may be responsible for providing electricity to a heating element (not shown) that heats the thermally conductive base portion 612. The heating element may be part of the bucket 602. In some embodiments, the heating element is included in the cavity of the durable housing 702. In such embodiments, the thermally conductive base portion 612 of the bucket 602 may be heated through contact with the heating element. Accordingly, the thermally conductive base portion 612 may be heated through thermo-mechanical conductive heating or on-bucket electrical heating instead of convective heating.

A mass sensing system may be incorporated into the OMPA so that mass measurements can be made throughout an organic matter processing cycle or anytime the bucket is present within the OMPA. The mass sensing system may include one or more mass sensors such as, for example, piezoelectric mass sensors. Alternatively, the mass sensing system may include a strain gauge mass sensor.

One or more mass sensors are normally located along the bottom of the OMPA (e.g., on each "foot" where the OMPA terminates along a substantially planar level). These mass sensor(s) can be used to measure the weight of the OMPA (and thus, the weight of contents of the processing chamber). However, because the bucket 602 can be removable installed within the durable housing, mass sensors could additionally or alternatively be located along the bottom of the bucket 602. As an example, a mass sensor may be located on each "foot" of the bucket 602. Regardless of location, the mass sensor(s) included in the OMPA may continually or periodically output measurements that can be used to calculate, infer, or otherwise establish the total weight of the bucket 602 (including any OMPA input stored therein). These measurements can be communicated to a controller (e.g., controller 110 of FIG. 1). The controller may determine how to control other components of the OMPA (e.g., its drying and grinding mechanisms) based on these measurements. For example, the controller may determine how long to perform high intensity processing based on the rate at which the weight lessens due to loss of moisture. Mass sensing may play an important role in ensuring that the OMPA can dynamically react to changes in the state of the OMPA input.

Figure 8:
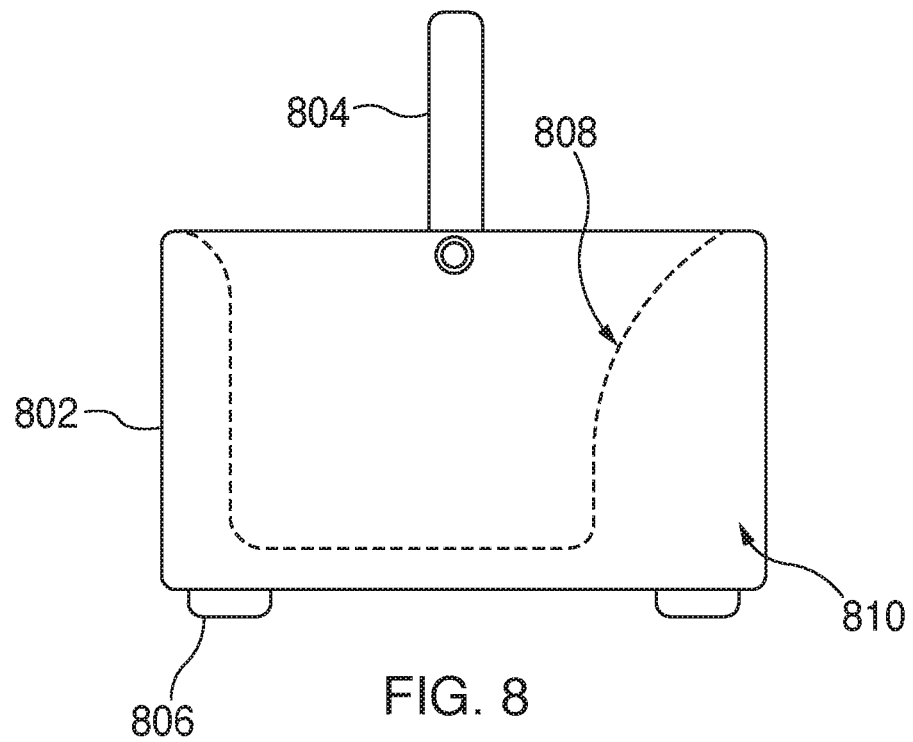
FIG. 8 includes a side profile view of a bucket in which organic matter can be deposited according to embodiment.

FIG. 8 includes a side profile view of a bucket 802 in which OMPA input can be deposited. A handle 804 may be pivotably connected to opposing sides of the bucket 802. The handle 804 may allow the bucket 802 to be easily removed from the OMPA as discussed above, as well as easily conveyed to another location. The bucket 802 may also have structural features 806 that terminate along a substantially planar level. These structural features 806 (also referred to as "feet") may help stabilize the bucket 802. Moreover, these structural features 806 may include the corresponding interconnects for the mechanical and electrical couplings 704, 706 discussed above with reference to FIG. 7. Such a design not only allows the corresponding interconnects to be readily aligned with those couplings, but also ensures that the structural features 806 can protect the corresponding interconnects when the bucket 802 is removed from the OMPA. As mentioned above, while mass sensor(s) are normally installed along the bottom of the OMPA in which the bucket 802 is to be installed, mass sensor(s) could additionally or alternatively be installed within some or all of these structural features 806 to measure the weight of the bucket 802 and its contents.

As shown in FIG. 8, the cavity defined by the interior surface of the bucket 802 may not necessarily by symmetrical across the longitudinal and latitudinal planes defined therethrough. For reference, the term "latitudinal plane" may be used to refer to the plane that is substantially parallel to the handle 804 while extended upward as shown. Meanwhile, the term "longitudinal plane" may be used to refer to the plane that is substantially orthogonal to the latitudinal plane. For example, the cavity may be more gradually tapered along one end to form a lip 808 (also referred to as a "spout"). The spout may allow a user to empty contents from the bucket 802 by simply tipping it along one end.

This gradual tapering along one end may also create a space 810 along one end of the bucket 802 in which components can be installed. For example, the gears that are responsible for driving the central rod that extends through the cavity may be located in this space 810. In addition to conserving valuable space within the bucket 802 (and OMPA as a whole), locating the gears in the space 810 will also add weight to one end of the bucket 802. This added weight may make it easier for the user to rotate the bucket 802 along that end to empty contents via the lip 808.

Practical Lid

An important aspect of increasing adoption is that the OMPA should be easily deployable and operable. The component with which many users will interact most frequently is the lid (e.g., lid 204 of FIG. 2). Accordingly, it is important that the lid be easy to use but also offer some functionality.

Figure 9:
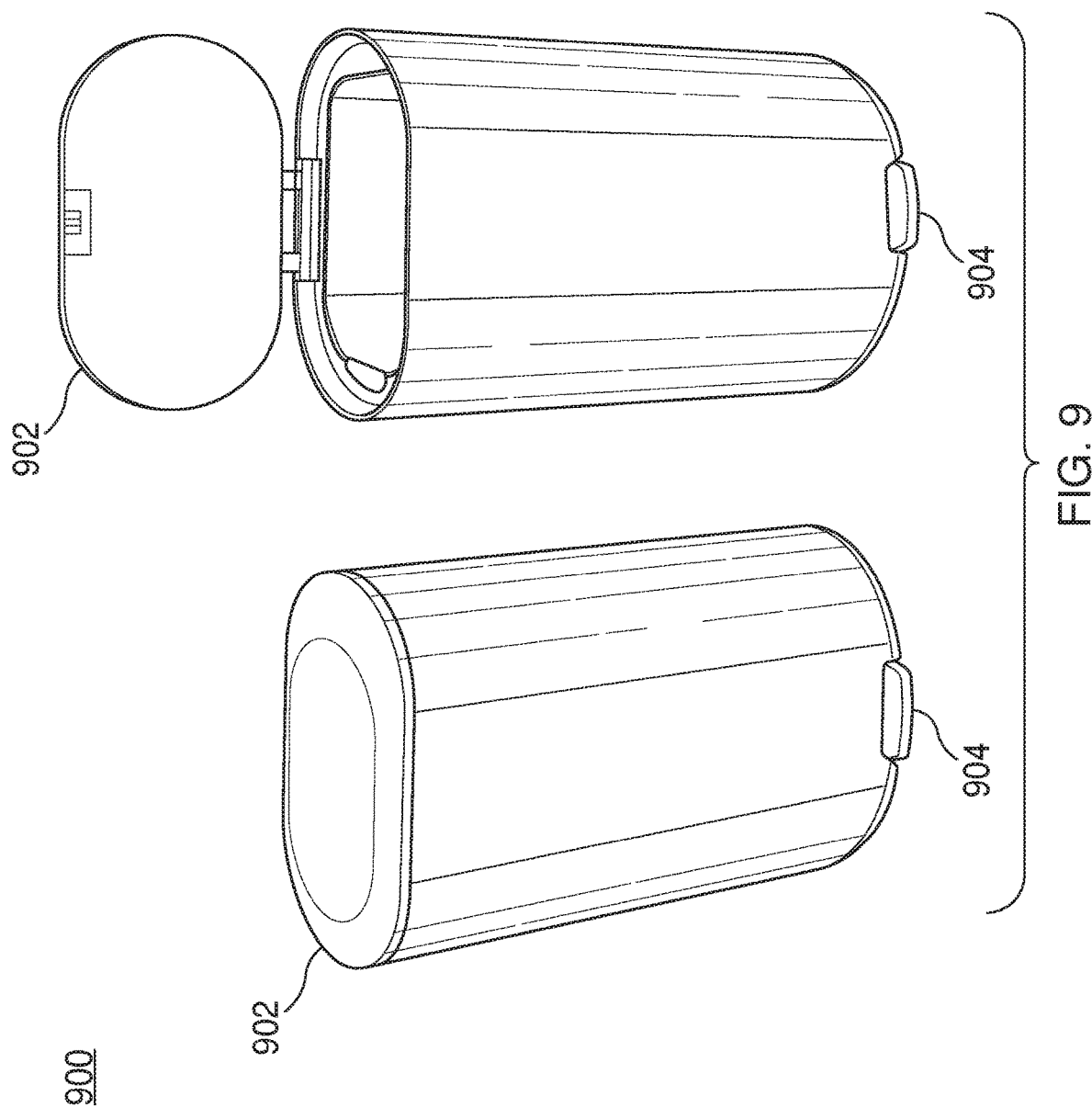
FIG. 9 includes front perspective views of an organic matter processing apparatus with the lid in a closed position and an open position according to embodiment.

As an example, a user may not only be able to open the lid with her hands, but also by interacting with an electro-mechanical pedal switch that is accessible along the front side of the OMPA. FIG. 9 includes front perspective views of OMPA 900 with the lid 902 in a closed position and an open position. As shown in FIG. 9, an electro-mechanical pedal switch 904 (or simply "pedal switch") may be located along the front side of OMPA 900. When a user applies pressure to the pedal switch 904 (e.g., with her foot), the lid 902 may be electro-mechanically actuated to the open position. As further discussed below, the open position may be one of multiple open positions to which the lid 902 can be actuated. When the user stops applying pressure to the pedal switch 904, the lid 902 may automatically close. The lid 902 may not close immediately, however. Instead, the lid 902 may be electro-mechanically actuated to the closed position a short interval of time (e.g., several seconds). Thus, the pedal switch 904 may allow the lid 902 of the OMPA 900 to be partially, if not entirely, operated in a hands-free manner.

As another example, the lid may be controllably lockable, for example, via a damped mechanism with a smooth spring-loaded retraction. Assume, for example, that the OMPA is performing high intensity processing where the processing chamber is heated. In such a situation, the lid may remain locked so long as the temperature of the processing chamber (or its contents) remains above a threshold (e.g., programmed in memory). This locking action may serve as a safety mechanism by ensuring that a user cannot easily access the interior of the OMPA under unsafe conditions. Note, however, that the user may still be able to override this locking action (e.g., by interacting with an input mechanism accessible along the exterior of the OMPA).

As another example, air may be "sucked" downward whenever the lid is opened, thereby preventing odors from escaping into the ambient environment. This action may be particularly helpful in preventing odors from escaping the OMPA when the lid is opened mid-cycle (i.e., while the OMPA input is being dried or ground). This action can be initiated by a controller based on one or more outputs produced by a sensor that is located proximate to where the lid contacts the durable housing when in the closed position. For example, a sensor could be located along the periphery of the lid, and its output may be indicative of whether the lid is adjacent to the durable housing (i.e., in the closed position). As another example, a sensor could be located along the periphery of the durable housing, and its output may be indicative of whether the lid is adjacent to the durable housing (i.e., in the closed position).

As another example, the lid may be intelligently controlled based on the intent of a user as inferred by the OMPA. Assume, for example, that the user either partially opens the lid by pivoting the lid roughly 30-75 degrees with respect to its original location or softly presses on a pedal switch (e.g., pedal switch 904 of FIG. 9). In such a situation, the OMPA may infer that the user is interested in performing a short-duration activity and then actuate the lid to a first angle (e.g., 60 degrees or 75 degrees). Examples of short-duration activities include depositing more OMPA input in the processing chamber or observing the OMPA input in the processing chamber. Now, assume that the user either fully opens the lid by pivoting the lid roughly 90 degrees with respect to its original location or firmly presses on the pedal switch. In such a situation, the OMPA may infer that the user is interested in performing a long-duration activity and then actuate the lid to a second angle (e.g., 90 degrees). Examples of long-duration activities include removing the processing chamber and cleaning the interior of the OMPA. Similarly, if the lid is actuated to the first angle and the OMPA then infers that the user is likely interested in performing a long-duration activity (e.g., based on removal of the bezel), then the lid may be actuated to the second angle. Accordingly, the OMPA may automatically further open the lid responsive to a determination that the user intends to access the interior for a longer period of time.

Similarly, the OMPA may control how quickly the lid closes based on the intent of the user. If the OMPA infers that the user is interested in performing a short-duration activity, the OMPA may maintain the lid in a given position (e.g., at the first angle) for a first amount of time. If the OMPA infers that the user is interested in performing a long-duration activity, the OMPA may maintain the lid in another given position (e.g., at the second angle) for a second amount of time. The first amount of time may be 2-10 seconds, while the second amount of time may be 10-60 seconds.

Overview of Operating States

Figure 10:
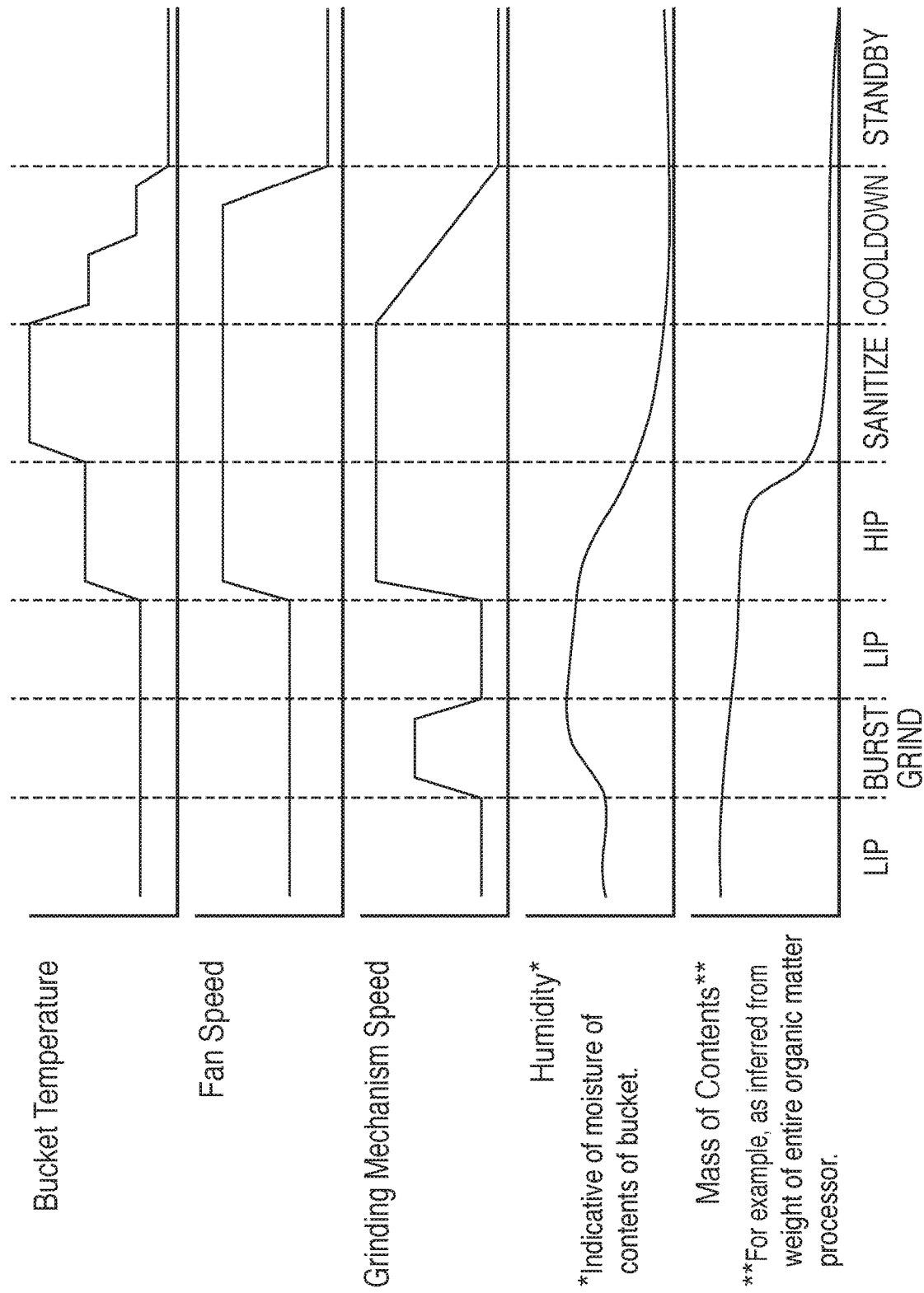
FIG. 10 includes an example of an operating diagram that illustrates how control parameters can be dynamically computed in accordance with an intelligent time recipe in order to process the contents of an organic matter processing apparatus according to embodiment.

Over time, the OMPA may cycle between various states to process OMPA input. As mentioned above, the OMPA may be able to convert OMPA input into a relatively stable product (e.g., food grounds) by drying and grinding the OMPA input. The control parameters for drying or grinding the OMPA input may be dynamically computed (e.g., by the controller 110 of FIG. 1) as a function of the outputs produced by sensors tasked with monitoring characteristics of the air traveling through the OMPA, as well as the mass or weight of the OMPA input in the processing chamber. For example, the control parameters could be dynamically computed as a function of (i) humidity of the air traveling through the OMPA, (ii) temperature of the air traveling through the OMPA, and (iii) weight of OMPA input contained in the OMPA. FIG. 10 includes an example of an operating diagram that illustrates how control parameters can be dynamically computed in accordance with an intelligent time recipe in order to process the contents of an OMPA.

As mentioned above, the OMPA may be able to intelligently cycle between different states to process OMPA input. Six different states are described in Table I. Those skilled in the art will recognize, however, that embodiments of the OMPA may be able to cycle between any number of these states. For example, some OMPAs may only be able to cycle between two, three, or four of these states, while other OMPAs may be able to cycle between all six states.

The OMPA may rely on a single target criterion or multiple target criteria to determine when to cycle between these states. The target criteria could be programmed into the memory of the OMPA, or the target criteria could be specified by a user (e.g., through an interface generated by a control platform). Examples of target criteria include moisture level, temperature, and weight. Using moisture level as an example, there may be multiple preset moisture levels (e.g., 10, 20, 30, and 40 percent) from which the target criterion could be selected (e.g., based on the nature of the OMPA input). The OMPA may not measure moisture of the OMPA input, but can instead predict or infer the moisture based on, for example, the humidity of air traveling through the OMPA and the weight of OMPA input. The OMPA could also rely on the average times for completion of these states. Assume, for example, that the OMPA receives input indicative of a request to process OMPA input deposited into the processing chamber. In such a situation, the OMPA may determine when to schedule the various states based on (i) how long those states have historically taken to complete and (ii) the weight of the OMPA input, among other factors. For example, the OMPA may attempt to schedule high intensity processing to be completed overnight as the grinding mechanisms may operate at a noise that might disturb nearby individuals.

TABLE I

Descriptions of states for processing OMPA input.

| State Identifier (ID) | State Description |
|---|---|
| High Intensity Processing (HIP) | Goal: Achieve the target moisture level at a given temperature.<br>Details: Temperature, airflow, and/or grinding mechanisms can be set to high settings. HIP normally takes at least several hours to complete, so the OMPA |

TABLE I-continued

Descriptions of states for processing OMPA input.

| State Identifier (ID) | State Description |
|---|---|
| | may attempt to schedule overnight. HIP may be triggered manually (e.g., via an interaction with an input mechanism, or via an instruction provided through the control platform) or automatically (e.g., based on a determination that the weight of the OMPA input exceeds a threshold). |
| Sanitize | Goal: Kill at least a predetermined number (e.g., greater than 99 percent) of pathogens. Details: Settings are similar to HIP, though the temperature is higher. By default, sanitization may be performed before, during, or after HIP. Thus, sanitization may be considered part of HIP in some instances. |
| Low Intensity Processing (LIP) | Goal: Advance drying in a non-intrusive manner while individuals are more likely to be nearby (e.g., during daylight hours). Details: Temperature, airflow, and/or grinding mechanisms can be set to low settings. While LIP may be similar to HIP in operation, LIP may be more suitable if individuals may be nearby. For example, the noise generated by the grinding mechanisms will typically be more tolerable at low settings than at high settings. |
| Burst Grind | Goal: Incorporate wet (e.g., unprocessed) OMPA input into dry (e.g., processed or semi-processed) OMPA input to make drying easier. Details: Temperature and airflow may be maintained at the same settings as the prior state (e.g., HIP or LIP), but the grinding mechanisms can be set to a higher state to grind the wet OMPA input that has been newly added. Burst grind may be performed when new OMPA input is added to the processing chamber while HIP or LIP is being performed. |
| Standby | Goal: Conserve power once the target criteria have been reached. Details: Temperatures, airflow, and/or grinding mechanisms can be off, unless necessary to meet some other criterion. For example, airflow and/or grinding mechanisms may be occasionally triggered to maintain an odor criterion. |
| Cooldown | Goal: Allow the user to handle the processing chamber. Details: Settings are similar to standby, though airflow may be higher if necessary to cool the processing chamber or the product stored therein. |

As mentioned above, the durations of these states can be dynamically determined based on, for example, analysis of outputs generated by sensors housed in the OMPA. However, the durations of these states are predefined—at least initially—in some embodiments. For example, high intensity processing may be programmed to occur for a certain amount of time (e.g., 4, 6, or 8 hours), and burst grind may be programmed to occur for a certain amount of time (e.g., 30 seconds, 5 minutes, 30 minutes) whenever new OMPA input is added. Those skilled in the art will also recognize that the duration of some states could be dynamically determined, while the duration of other states could be predefined. As an example, the OMPA may continue performing high intensity processing until the target criteria are achieved. However, whenever new OMPA input is added, the OMPA may cycle to burst grind for a certain amount of time (e.g., 30 seconds, 5 minutes, 30 minutes) before reverting back to its previous state.

Overview of Control Platform

In some situations, it may be desirable to remotely interface with a OMPA. For example, a user may want to initiate high intensity processing if she is not at home and does not expect to return home for an extended duration (e.g., several hours). This could be done through a control platform that is communicatively connected to the OMPA. Thus, the user may be able to interact with the OMPA through the control platform. Through the control platform, the user may also be able to view information regarding the OMPA (e.g., its current state, average duration of each state, how much OMPA input has been processed over a given interval of time, current weight of the bucket and its contents) through interfaces that are generated by the control platform.

Figure 11:
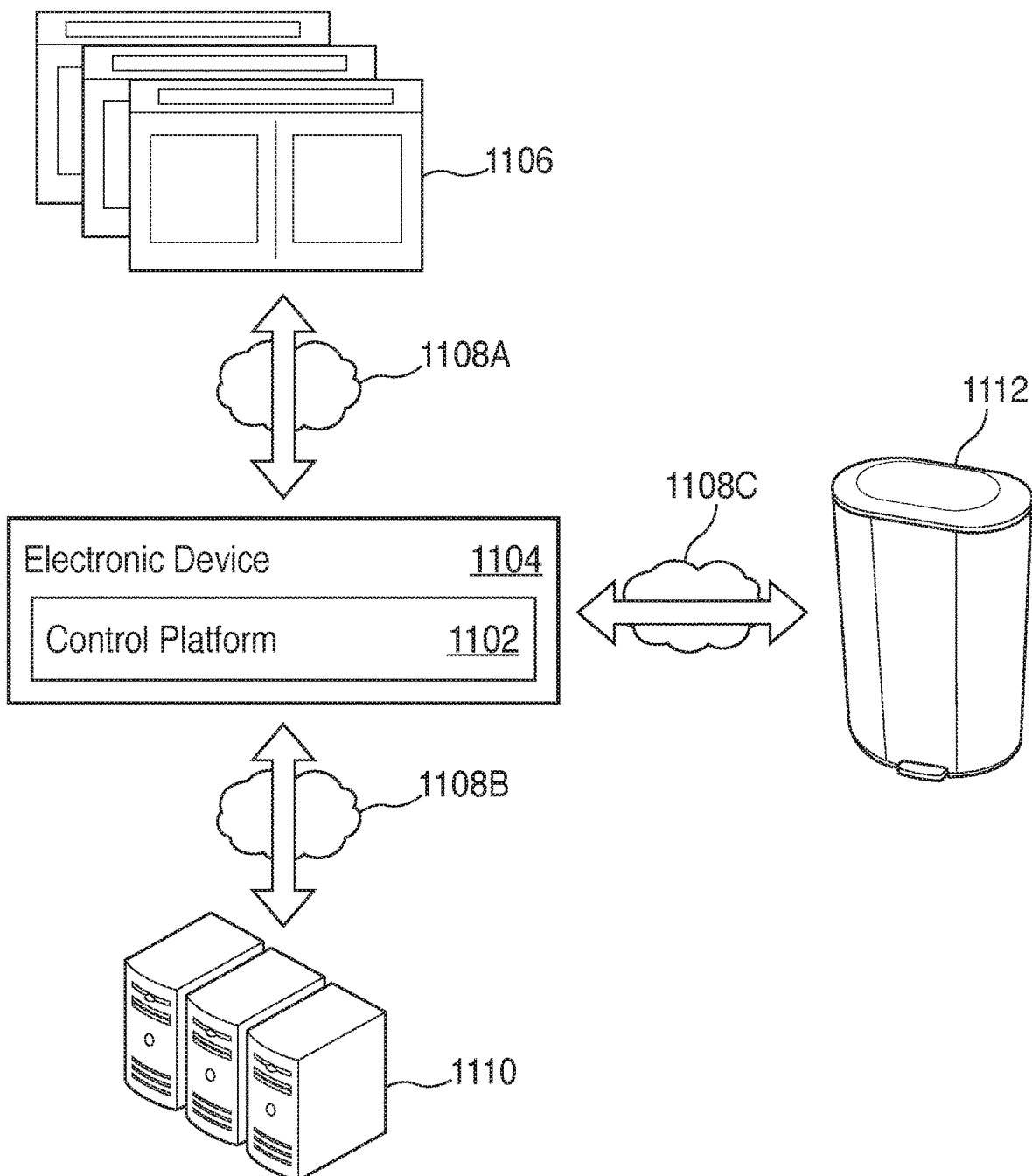
FIG. 11 illustrates a network environment that includes a control platform according to embodiment.

FIG. 11 illustrates a network environment 1100 that includes a control platform 1102. For the purpose of illustration, the control platform 1102 may be described as a computer program that is executing on an electronic device 1104 accessible to a user of OMPA 1112. As discussed above with reference to FIG. 1, OMPA 1112 may include a communication module that is responsible for receiving data from, or transmitting data to, the electronic device 1104 on which the control platform 1102 resides.

Users may be able to interface with the control platform 1102 via interfaces 1106. For example, a user may be able to access an interface through which information regarding OMPA 1112 can be viewed. This information may include historical information related to past performance (e.g., total pounds of OMPA input that has been processed), or this information may include state information related to current activity (e.g., the current state of OMPA 1112, an indication of whether OMPA 1112 is presently connected to the electronic device 1104, an indication of whether OMPA 1112 is presently locked). Thus, a user may be able to educate herself on the OMPA and its contents by reviewing content posted to interfaces generated by the control platform 1102.

Moreover, a user may be able to access an interface through which instructions can be provided to OMPA 1112. Said another way, the user may be able to specify, through the control platform 1102, when or how OMPA 1112 should process OMPA input stored therein. As an example, the OMPA 1112 may initially be configured to perform high intensity processing between 10 PM and 8 AM under the assumption that its ambient environment will generally be devoid of individuals during that timeframe. However, the user may be able to adjust aspects of setup or operation of OMPA 1112 through the control platform 1102. For instance, the user could specify that high intensity processing should not begin until 2 AM, or the user could specify that high intensity processing should not end after 6 AM.

A user could also program, through the control platform 1102, a preference regarding the weight at which to empty the processing chamber of OMPA 1112. On its own, the processing chamber may weigh 8-10 pounds. The total weight of the processing chamber (including its contents) can quickly become unwieldy for some users, such as elderly individuals and juvenile individuals. Accordingly, the control platform 1102 may permit users to define a weight at which to generate notifications (also referred to as "alarms"). Assume, for example, that a user indicates that the total weight of the processing chamber (including its contents) should not exceed 15 pounds through an interface generated by the control platform 1102. In such a scenario, the control platform 1102 may monitor mass measurements received from OMPA 1112 and then generate a notification in response to determining that the total weight of the processing chamber (including its contents) is within a certain amount of 15 pounds. The certain amount may be a fixed value (e.g., 1 pound or 2 pounds), or the certain amount may be a dynamically determined value (e.g., 5 percent or 10 percent of the weight specified by the user).

The notification could be presented in various ways. In embodiments where the control platform 1102 is implemented as a computer program executing on an electronic device 1104 as shown in FIG. 11, the notification may be generated by the computer program (e.g., in the form of a push notification). Additionally or alternatively, the control platform 1102 may transmit an instruction to OMPA 1112 to generate the notification. Accordingly, the notification could be a visual, audible, or tactile notification that is generated by the electronic device 1104 or OMPA 1112.

As shown in FIG. 11, the control platform 1102 may reside in a network environment 1100. Thus, the electronic device 1104 on which the control platform 1102 is implemented may be connected to one or more networks 1108A-C. These networks 1108A-C may be personal area networks (PANs), local area networks (LANs), wide area networks (WANs), metropolitan area networks (MANs), cellular networks, or the Internet. Additionally or alternatively, the electronic device 1104 could be communicatively connected to other electronic devices—including OMPA 1112—over a short-range wireless connectivity technology, such as Bluetooth, NFC, Wi-Fi Direct (also referred to as "Wi-Fi P2P"), and the like.

In some embodiments, at least some components of the control platform 1102 are hosted locally. That is, part of the control platform 1102 may reside on the electronic device 1104 that is used to access the interfaces 1106 as shown in FIG. 11. For example, the control platform 1102 may be embodied as a mobile application that is executable by a mobile phone. Note, however, that the mobile application may be communicatively connected to (i) OMPA 1112 and/or (ii) a server system 1110 on which other components of the control platform 1102 are hosted.

In other embodiments, the control platform 1102 is executed entirely by a cloud computing service operated by, for example, Amazon Web Services®, Google Cloud Platform™, or Microsoft Azure®. In such embodiments, the control platform 1102 may reside on a server system 1110 that is comprised of one or more computer servers. These computer servers can include different types of data (e.g., regarding batches of product that have been produced by OMPAs associated with different users), algorithms for implementing the routine described above (e.g., based on knowledge regarding ambient temperatures, humidity, etc.), algorithms for tailoring or training the routine described above (e.g., based on knowledge gained from nearby OMPAs or comparable OMPAs), and other assets (e.g., user credentials). Those skilled in the art will recognize that this information could also be distributed amongst the server system 1110 and one or more other electronic devices. For example, some data that is generated by a given OMPA may be stored on, and processed by, that OMPA or an electronic device that is "paired" with that OMPA. Thus, not all data generated by OMPAs—or even the control platform—may be transmitted to the server system 1110 for security or privacy purposes.

One benefit of having a network-connected OMPA is that it enables connectivity with other electronic devices, and thus integration into related systems.

Assume, for example, that a user purchases and then deploys a OMPA in a home. This OMPA may include a set of instructions (also referred to as the "intelligent time recipe") that, when executed, indicate how its components are to be controlled. These instructions may involve the execution of heuristics, algorithms, or computer-implemented models. Rather than learn best practices "from scratch," the OMPA (or a control platform to which it is communicatively connected) may be able to learn from the experiences of other OMPAs. These OMPAs may be located nearby, and therefore may experience comparable ambient conditions such as humidity, temperature, and the like. Alternatively, these OMPAs may be comparable, for example, in terms of amount of actual or expected OMPA input, type of actual or expected OMPA input, number of users (e.g., a single individual versus a family of four individuals), etc. Thus, knowledge may be shared among OMPAs as part of a networked machine learning scheme. Referring again to the above-mentioned example, the OMPA may initiate a connection with a control platform after being deployed in the home. In such a scenario, the control platform may provide another set of instructions that is learned based on knowledge gained by the control platform from analysis of the activities of other OMPAs. Accordingly, the control platform may further develop instruction sets based on machine learning. Learning may be performed continually (e.g., as OMPAs perform activities and generate data), and insights gained through learning may be provided continually or periodically. For instance, the control platform may communicate instructions to a OMPA whenever a new set is available, or the control platform may communicate a new set of instructions to an OMPA only upon receiving input (e.g., from the corresponding user) indicating that the OMPA is not operating as expected.

As another example, assume that a municipality is interested in collecting the products produced by various OMPAs for further processing (e.g., composting). In such a scenario, the municipality may be interested in information such as the weight and water content of product that is available for collection. Each OMPA may not only have the sensors needed to measure these characteristics as discussed above but may also have a communication module that is able to transmit measurements elsewhere. In some embodiments, these OMPA directly transmit the measurements to the municipality (e.g., by uploading to a network-accessible data interface, such as an application programming interface). In other embodiments, these OMPAs indirectly transmit the measurements to the municipality (e.g., by forwarding to respective control platforms, which then transmit the measurements—or analyses of the measurements—onward to the municipality). With these measurements, the municipality may be able to retrieve, transport, and handle the products produced by these OMPAs in a more intelligent manner. For example, the municipality may have a better understanding of when retrieval needs to occur, and how much storage space is needed for the products, if the weight is shared.

Users may also be able to communicate with one another, directly or indirectly, through OMPA. Assume, for example, that a first OMPA has finished processing its OMPA input into a product. Although processing is complete, a corresponding first user may not be ready to offload the product. In such a situation, a second user who is located nearby (e.g., as determined based on information generated by the respective OMPA, information input by the respective users, etc.) may offer to handle the product. For instance, the second user may retrieve the product from the first user and then handle it, add it to her own product, etc. Users may be able to communicate through the interfaces 1106 generated by the control platform 1102, or users may be able to communicate directly through their respective OMPAs.

Computing System

Figure 12:
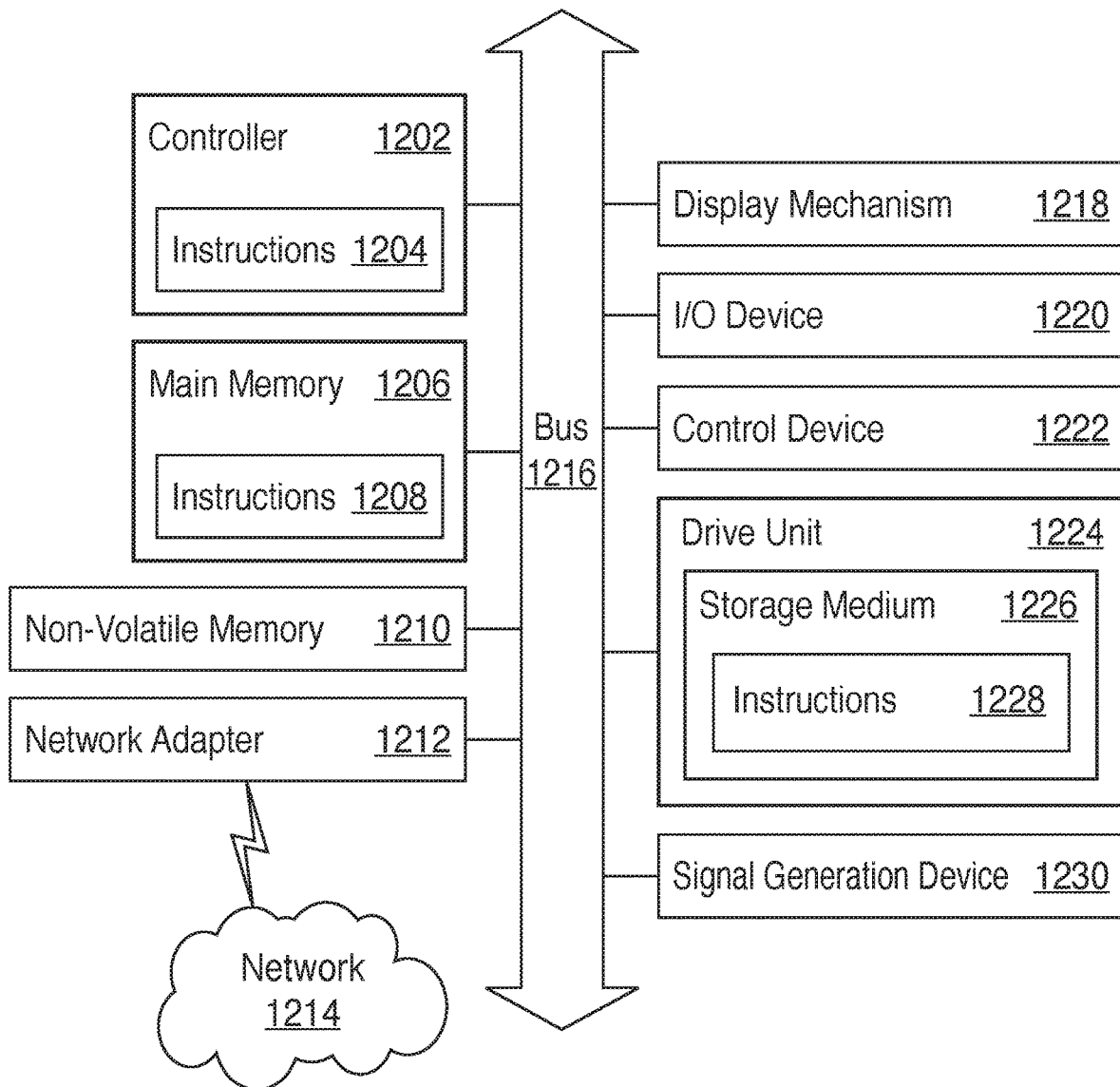
FIG. 12 is a block diagram illustrating an example of a computing system in which at least some operations described herein can be implemented according to embodiment.

FIG. 12 is a block diagram illustrating an example of a computing system 1200 in which at least some operations described herein can be implemented. For example, components of the computing system 1200 may be hosted on an OMPA that is tasked with converting OMPA input into a more stable product. As another example, components of the computing system 1200 may be hosted on an electronic device that is communicatively connected to an OMPA.

The computing system 1200 may include a controller 1202, main memory 1206, non-volatile memory 111210, network adapter 1212, display mechanism 1218, input/output (I/O) device 1220, control device 1222, drive unit 1224 including a storage medium 1226, and signal generation device 1230 that are communicatively connected to a bus 1216. The bus 1216 is illustrated as an abstraction that represents one or more physical buses or point-to-point connections that are connected by appropriate bridges, adapters, or controllers. The bus 1216, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), inter-integrated circuit (I2C) bus, or an Institute of Electrical and Electronics Engineers (IEEE) standard 1394 bus (also referred to as "Firewire").

While the main memory 1206, non-volatile memory 111210, and storage medium 1226 are shown to be a single medium, the terms "machine-readable medium" and "storage medium" should be taken to include a single medium or multiple media (e.g., a database distributed across more than one computer server) that store instructions 1228. The terms "machine-readable medium" and "storage medium" shall also be taken to include any medium that is capable of storing, encoding, or carrying instructions for execution by the computing system 1200.

In general, the routines executed to implement the embodiments of the present disclosure may be implemented as part of an operating system or a specific computer program. Computer programs typically comprise instructions (e.g., instructions 1204, 1208, 1228) that are set at various times in various memory and storage devices in an electronic device. When read and executed by the controller 1202, the instructions cause the computing system 1200 to perform operations to execute various aspects of the present disclosure.

The network adapter 1212 enables the computing system 1200 to mediate data in a network 1214 with an entity that is external to the computing system 1200 through any communication protocol that is supported by the computing system 1200 and the external entity. The network adapter 1212 can include a network adaptor card, wireless network interface card, router, access point, wireless router, switch, protocol converter, gateway, bridge, hub, digital media receiver, repeater, or any combination thereof.

Figure 13:
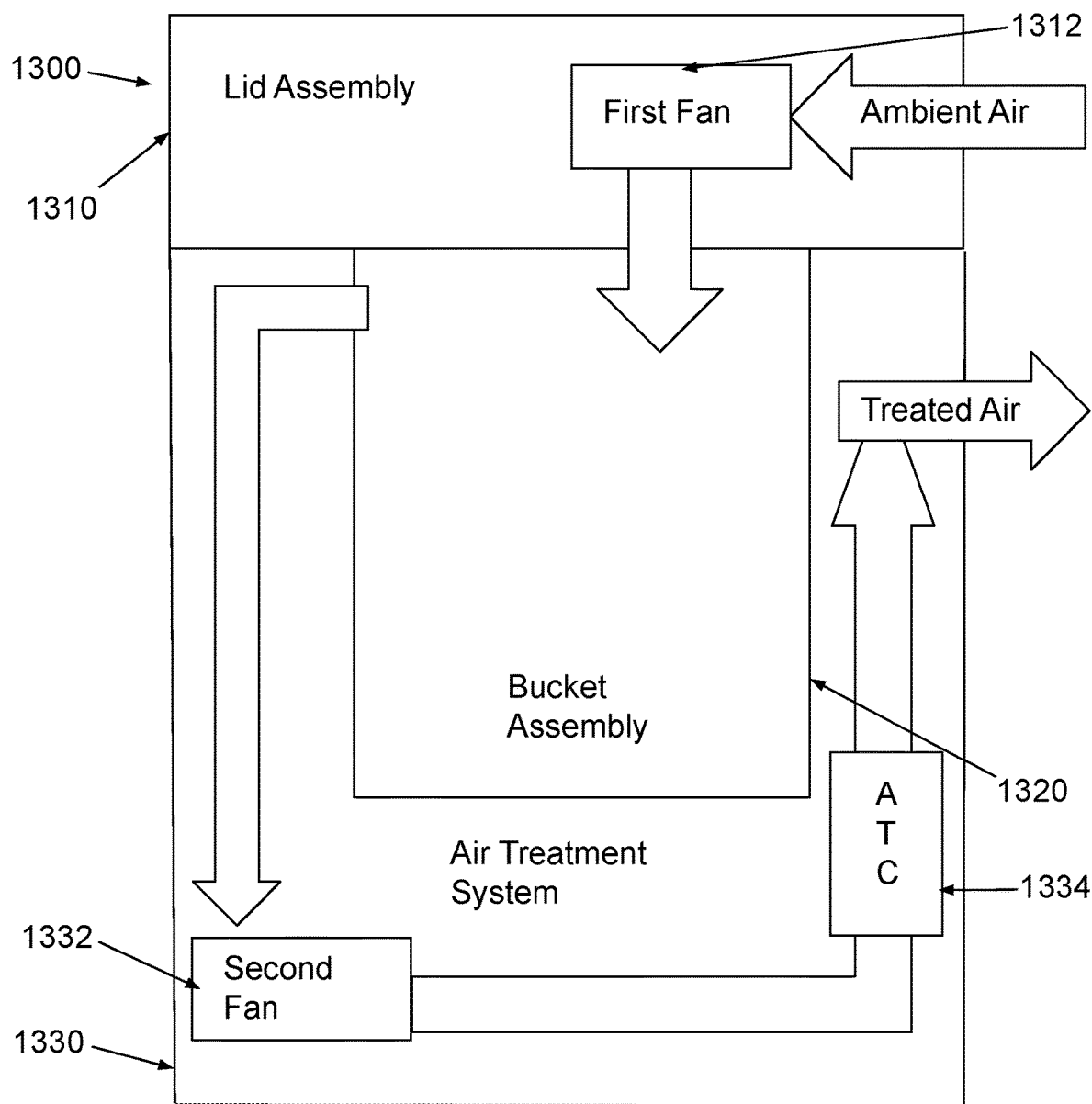
FIG. 13 shows a simplified illustrative block diagram of an OMPA and airflow paths according to an embodiment.

FIG. 13 shows a simplified illustrative block diagram of OMPA 1300 and airflow paths according to an embodiment. OMPA 1300 can include lid assembly 1310, bucket assembly 1320, and air treatment system 1330. Lid assembly 1310 may be akin to lid 204 of FIG. 2 and is also discussed in detail below. Bucket assembly 1320 may be akin to processing chambers of FIGS. 5-7 and the bucket of FIG. 8 and embodiments disclosed in U.S. Provisional Application No. 63/313,946, filed Feb. 25, 2022, the disclosure of which is incorporated by reference in its entirety. Air treatment system 1330 may be akin to the air treatment system discussed above in connection with FIGS. 3A, 3B, 4A, and 4B and is also discussed in detail below.

OMPA 1300 has a length corresponding to an X axis, a width corresponding to a Z axis, and a height corresponding to a Y axis.

Lid assembly 1310 may be responsible for controlling a first airflow path in which ambient air is pulled into lid assembly 1310 by first fan 1312 and directed into bucket assembly 1320. The first air flow path forces air into bucket assembly 1320 to assist bucket assembly 1320 in the desiccation of any OMPA input that is being processed by bucket assembly 1320. Lid assembly 1310 may optionally preheat the ambient air using a heater (not shown) prior to directing the air into bucket assembly 1320. The heated air may further assist bucket assembly 1320 with processing OMPA input to produce OMPA output. Heating the ambient air also reduces the moisture content of the air being injecting into bucket assembly 1320 and the moisture of the air being treated by air treatment system 1330. Reducing the moisture content of the air circulating in the OMPA can improve efficiency of OMPA input processing and air treatment.

Air treatment system 1330 may be responsible for controlling a second airflow path in which untreated air is drawn from bucket assembly 1320 by second fan 1332 and directed through air treatment chamber 1334, which converts the untreated air to treated air that is exhausted away from OMPA 1300. As defined herein, untreated air refers to air that has been in the vicinity of bucket assembly 1320 and has potentially been imparted with particles or compounds that have odorous qualities. As defined herein, treated air refers to air that been "scrubbed" or "cleaned" of particles or compounds that have odorous qualities. Air treatment chamber 1334 can one or more of an activated carbon chamber and an ultraviolet light chamber. Air treatment system 1330 may heat the untreated air using a heater (not shown) to reduce moisture content of the untreated air before it the air is pushed through an activated carbon filter (not shown). The activated carbon filter can extract odor causing molecules from the air as it passes through the filter such that treated air is exhausted out of OMPA 1300.

When lid assembly 1310 is in a closed configuration and OMPA 1300 is managing operations that require use of first fan 1312 and second fan 1332, OMPA 1300 may ensure that a negative pressure differential is maintained between inlet air and exhausted air. This negative pressure differential can be achieved by operating second fan 1332 at a higher airflow rate (e.g., higher cubic feet per minute (CFM)) than first fan 1312. In other words, the airflow rate (or volume) of treated air exiting out of OMPA 1300 is greater than the airflow rate (or volume) of ambient air being pulled into OMPA 1300. This can ensure that air treatment system 1330 controls the flow of air from bucket assembly 1320 to the exhaust port and prevents any untreated air from prematurely exiting OMPA 1300.

Figure 14:
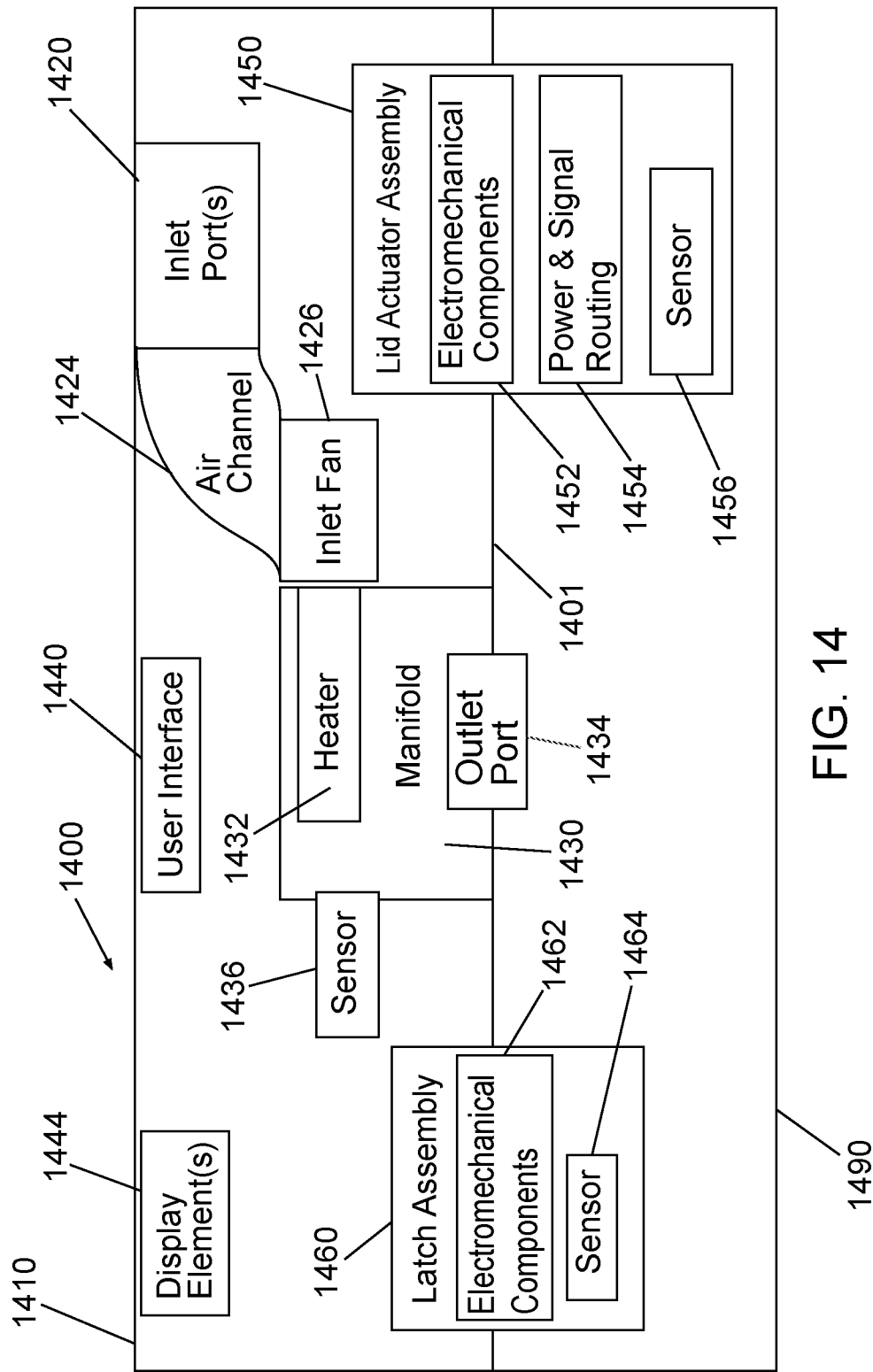
FIG. 14 shows a simplified block diagram of a lid assembly according to an embodiment.

FIG. 14 shows a simplified block diagram of lid assembly 1400 according to an embodiment. Lid assembly 1400 is bifurcated with line 1401 to illustratively represent a transition between the movable portions (which exist above line 1401) and the stationary portions (which exist below line 1401) of lid assembly 1400. The movable portions may be referred to herein as the lid (1410) and bezel as these parts of lid assembly 1400 open and close by rotating about a pivot axis (not shown). The stationary portions are secured to support member 1490. Support member 1490 may be an OMPA subassembly that constitutes part of an OMPA. For example, support member 1490 may include a bucket interface assembly capable of receiving a bucket assembly (e.g., a processing chamber). In addition, support member 1490 may include a lid support member that interfaces with the moveable portion of lid assembly 1490 to form a relatively tight seal. Furthermore, support member 1490 may include several mounting locations for the stationary portions of lid assembly 1400 to be secured.

Lid 1410 may include one or more inlet ports 1420 that are integrated within lid 1410 to permit ambient air to be drawn in via air channel 1424 by inlet fan 1426. Inlet ports 1420 may be sized to enable inlet fan 1426 to obtain a minimum airflow rate. Air channel 1424 may be integrated within lid 1410 or be a standalone component that is secured to lid 1410 to route air from one or more inlet ports 1420 to inlet fan 1426. Lid 1410 may include manifold 1430, which is mounted to an output of inlet fan 1426, and heater 1432, which is contained within manifold 1430. Manifold 1430 may be constructed to direct ambient air through or by heater 1432 to an outlet port 1434 that directs (optionally heated) air down into the OMPA, and in particular, into a bucket assembly that is contained within support structure 1490. Sensor 1436 may interface with plenum 1430 to detect characteristics of air contained within manifold 1430. Sensor 1436 may detect temperature, relative humidity, volatile organic compounds, and other characteristics of the air being forced through outlet port 1434.

Lid 1410 may include user interface 1440 and display elements 1444. User interface may include, in one embodiment, a button or buttons that are depressible by a user. In another embodiment, user interface may include a touchscreen. Display elements 1444 may be dead fronted displays that provide various information such as OMPA operational status, wireless status, etc. Alternatively, display elements 1444 can include other display components such as an LCD or an LED array.

Lid actuator assembly 1450 and latch assembly 1460 may each include components that exist in lid 1410, on support structure 1490, or that span both lid 1410 and support structure 1490. For example, in lid actuator assembly 1450, a first portion of electromechanical components 1452 (e.g., such as a motor and a spring loaded member) may be mounted to support structure 1490, a second portion electromechanical components 1452 (e.g., a mounting plate) may be secure lid 1410, and third portion of electromechanical components 1452 (e.g., an arm member) may couple the first portion to the second portion. Power and signal routing 1454 may be routed through lid actuator assembly 1450 to provide signal and power conductors to various components contained in lid 1410. In one embodiment, sensor 1456 may be mounted to support structure 1490.

As another example, in latch assembly 1460, a first portion of electromechanical components 1462 (e.g., a latch) are secured to lid 1410 and a second portion of electromechanical components 1462 (e.g., a latch interface and a solenoid) may be secured to support structure 1490. Sensor 1464 may be secured support structure 1490.

As illustrated in FIG. 14, one skilled in the art can appreciate that there are a substantial number of components secured to or integrated within lid 1410. The presence of these components add substantial weight to lid 1410, resulting in a movable lid that is much heavier than conventional lids for other receptacles or containers having a similar form factor and/or function as the OMPA described herein. This added weight, coupled with a requirement to minimize Z-height thickness of lid 1410, have relatively fast automatic opening and closing functionality, and have easy to use manual control to open and close lid 1410, introduces a set of constraints that do not have to be addressed by conventional lids. For example, the weight of lid 1410 may be at least 16 ounces or at least 24 ounces. In addition, there may be a timing requirement for lid 1410 to transition from being closed to fully open. As defined herein, a fully open lid may be in a position such that it cannot further pivot about a pivot axis. Such a timing requirement may require the lid to complete a transition from being closed to fully open within 0.5 seconds or between 0.25 and 0.75 seconds. In one embodiment, the transition from open to closed may operate according to the same timing requirements as the transition from closed to fully open. In another embodiment, the transition from open to closed may have different timing requirements than the transition from closed to open. For example, it may be desirable for the lid to have dampened or "soft" close in which the rate of closure changes as a function of a pivot angle along a pivot axis (e.g., rate of closure slows down as the pivot angle decreases). Furthermore, considering that lid 1410 has considerable heft (for a lid), an integral lift assist (e.g., a spring loaded rotation member) may be built into the lid assembly to help a user manually open the lid.

Figure 15A:
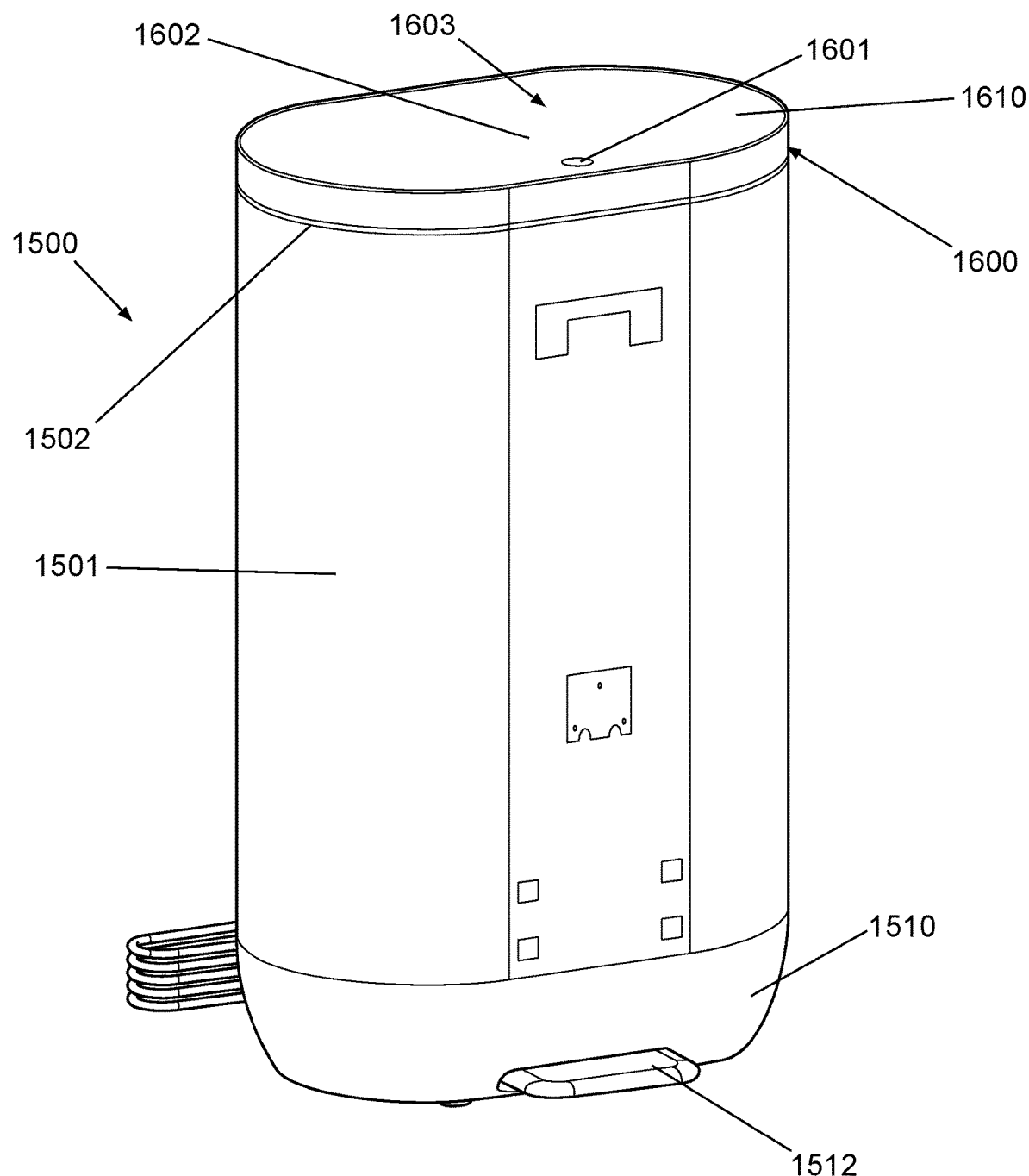
FIGS. 15A and 15B show an OMPA with the lid of a lid assembly in a closed position and in an open position, respectively, according to various embodiments.
Figure 15B:
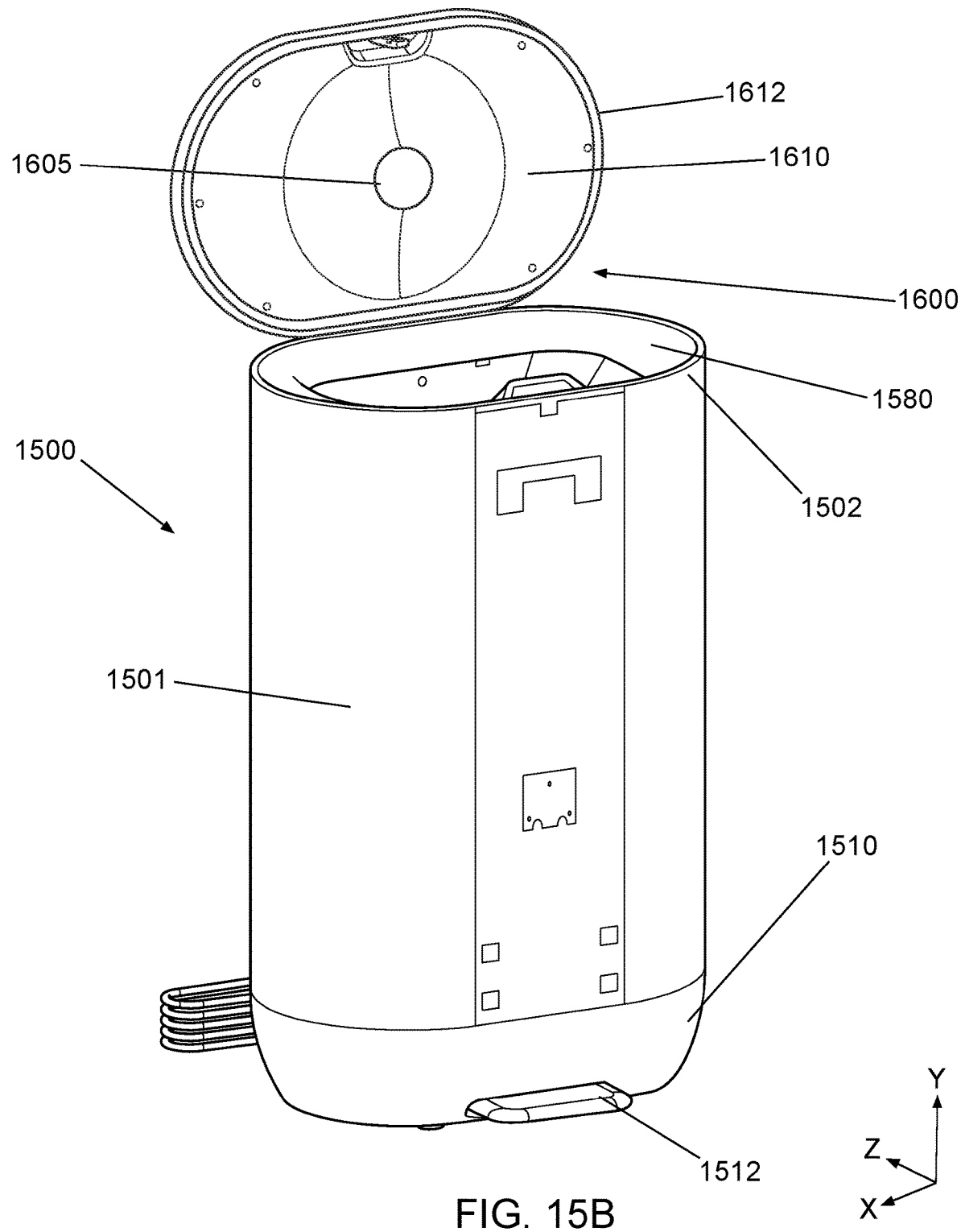

FIGS. 15A and 15B show OMPA 1500 with lid 1610 of lid assembly 1600 in a closed position and in an open position, respectively, according to an embodiment. As shown, lid assembly 1600 sits on top of OMPA 1500 with outer sleeve member 1501 extending from the top to the bottom of OMPA 1500. Base 1510 may exist at the bottom of OMPA 1500 and can include pedal 1512. Lid 1610 may interface with lid interface member 1502, which can sit on top of a bucket interface assembly (not shown and that serves a support structure for lid assembly 1600) and is configured to interface with lid 1610 when lid 1610 is closed. Gasket 1612 is disposed around the periphery of lid 1610. The combination of lid 1610 and gasket 1612 may form an airtight seal with lid interface member 1502 when lid 1610 is closed. In addition, when lid 1610 is closed, button 1601 is visible. Display element region 1602 represents an area on cosmetic member 1603 where dead fronted display elements can be seen when activated. When the dead fronted display elements are not activated, an observer may not be able to see them because cosmetic member 1603 is covering the dead fronted display elements. Cosmetic member 1603 may exhibit a sheer or translucent quality to enable light penetration by the dead fronted display elements. In one embodiment, cosmetic member 1603 can be a wood veneer, a plastic material, or tinted glass.

Lid 1610 may open by pivoting along a pivot axis (not shown). The pivot axis may be parallel to the X-axis of OMPA 1500 so that lid 1610 pivots in the Y-Z plane. When lid 1610 is open, access is provided to an opening within OMPA 1500. As discussed above, a bucket assembly or processing chamber is below this opening. Bezel 1580 is shown in a closed position. Bezel 1580 can be moved to an open position (shown in FIG. 15C). Bezel 1580 can be connected to lid assembly 1600 can pivot along the same pivot axis that of lid 1610. When lid 1610 is open, gasket 1612 and the bottom surface of lid 1610 are visible. The bottom surface of lid 1610 shows outlet port 1605 through which forced air is injected into the opening within OMPA 1500. A fan (not shown) contained in lid 1610 can pull in ambient air from outside lid 1610 through one or more inlet ports and direct forced air through outlet port 1605 into the bucket assembly.

Figure 15C:
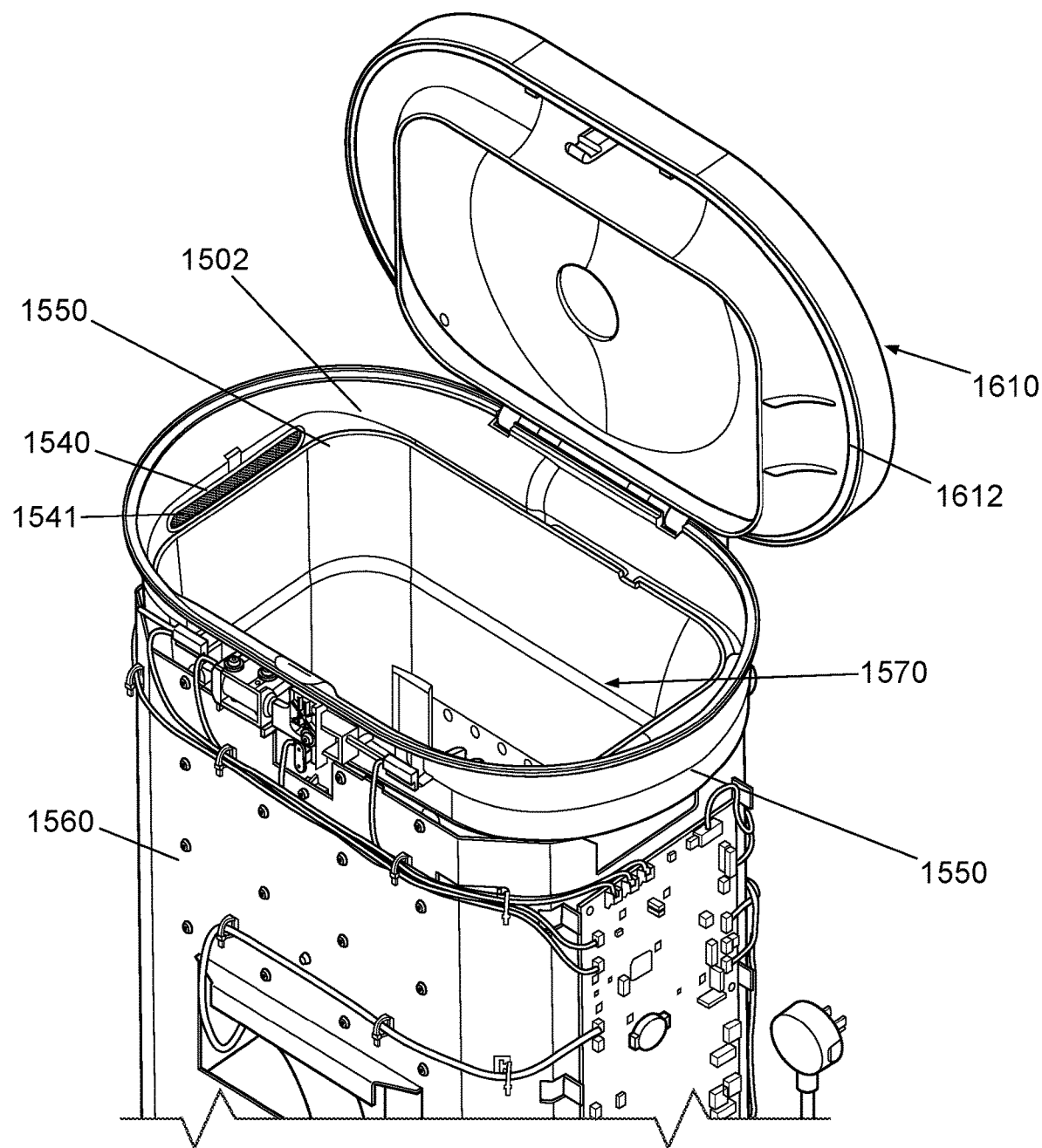
FIG. 15C shows a partial perspective view of an OMPA with a lid in the open position according to an embodiment.

FIG. 15C shows a partial perspective view of OMPA 1500 with lid 1610 in the open position and with outer sleeve member 1501 removed. FIG. 15C shows lid interface member 1502 sitting on top of bucket interface assembly 1550. Bucket assembly 1570 is shown sitting inside bucket interface assembly 1550. Also shown in FIG. 15C is air treatment system inlet port 1540 that exists as part of bucket interface assembly 1550. Note that inlet port 1540 is positioned above bucket assembly 1570 and below lid interface member 1502. A removable screen 1541 may be secured to inlet port 1540 to serve as a pre-filter for an air treatment system according to an embodiment. Screen 1541 may be, for example, a metal mesh filter that is configured to prevent solid particles larger than a predetermined size (e.g., 100 microns) from entering the air treatment system. Screen 1541 may be secured to inlet port 1540 via a hinge mechanism that enables the user to rotate screen 1541 such that if faces towards the bucket assembly. This way the user can flick or tap screen 1541 to dislodge any particles that may be residing thereon. In addition, the user can fully remove screen 1541 from the OMPA and clean it by running water over screen 1541 and reinsert screen 1541. FIG. 15C also shows inner sleeve members 1560 that partially cover bucket interface assembly 1550 and other components of the OMPA. Movable bezel 1580 is shown in an open position in FIG. 15C.

Figure 15D:
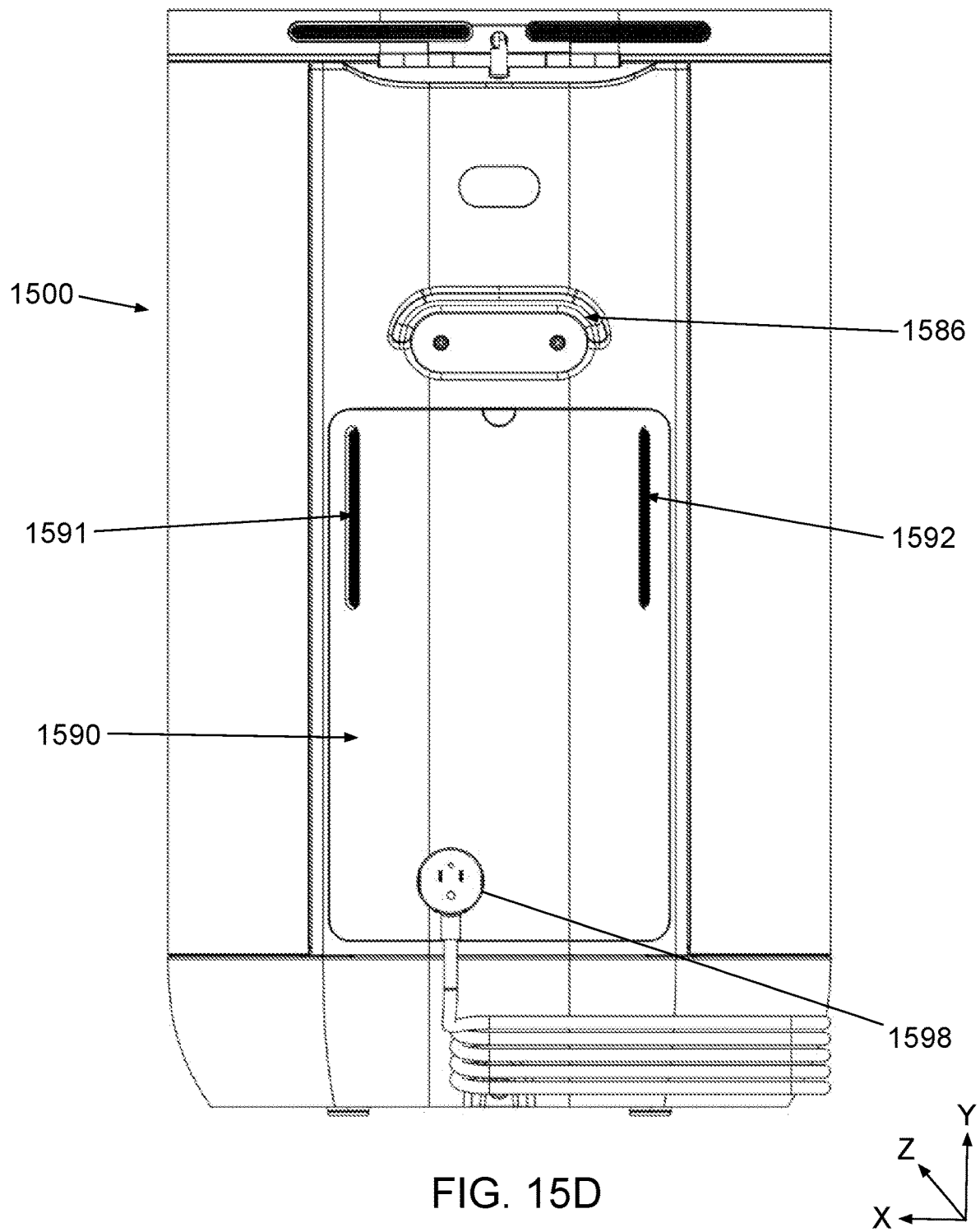
FIG. 15D shows a back view of an OMPA with a cover attached according to an embodiment.
Figure 15E:
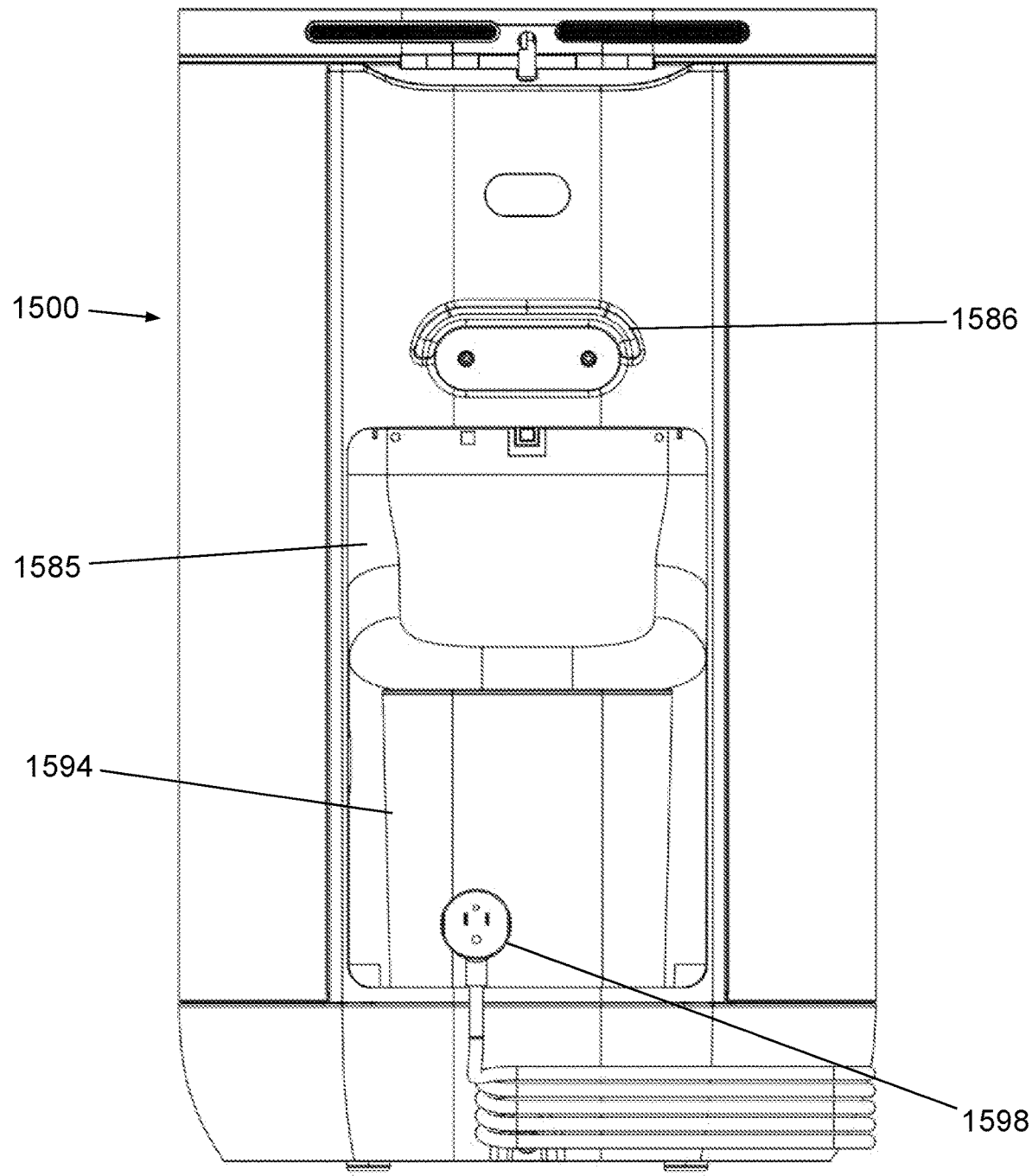
FIG. 15E shows a back view of an OMPA with the cover removed according to an embodiment.

FIG. 15D shows an illustrative back view of OMPA 1500 with removable cover 1590 secured in place on OMPA 1500. Removable cover 1590 can include exhaust ports 1591 and 1592 that are each covered with a screen or filter. Exhaust ports 1591 and 1592 are oriented to primarily exhaust treated air out along the X-Y plane such that treated air is not directly exhausted in the Z axis direction. This way, when OMPA 1500 is positioned next to a wall, the treated air is not exhausted directly into the wall but is exhausted primarily along a plane that is parallel to the wall. Exhausts ports 1591 and 1592 are positioned above the exit portion of an air treatment chamber (shown in FIG. 15E) such that when the treated air exits out of the top of the air treatment chamber, the treated air can continue its upward trajectory towards exhaust ports 1591 and 1592. FIG. 15E shows an illustrative back view of OMPA 1500 with removable cover 1590 removed and shows air treatment chamber 1594 and an interior volume 1585 formed between spine member 1584 and cover 1590 (when cover 1590 is secured to OMPA 1500). Interior volume 1585 can represent the space within OMPA 1500 where treated air exists before it is exhausted out of OMPA 1500. Also shown in FIGS. 15D and 15E are handle 1586 and power cord 1588. A user may use handle 1584 to lift and move OMPA 1500.

Figure 16A:
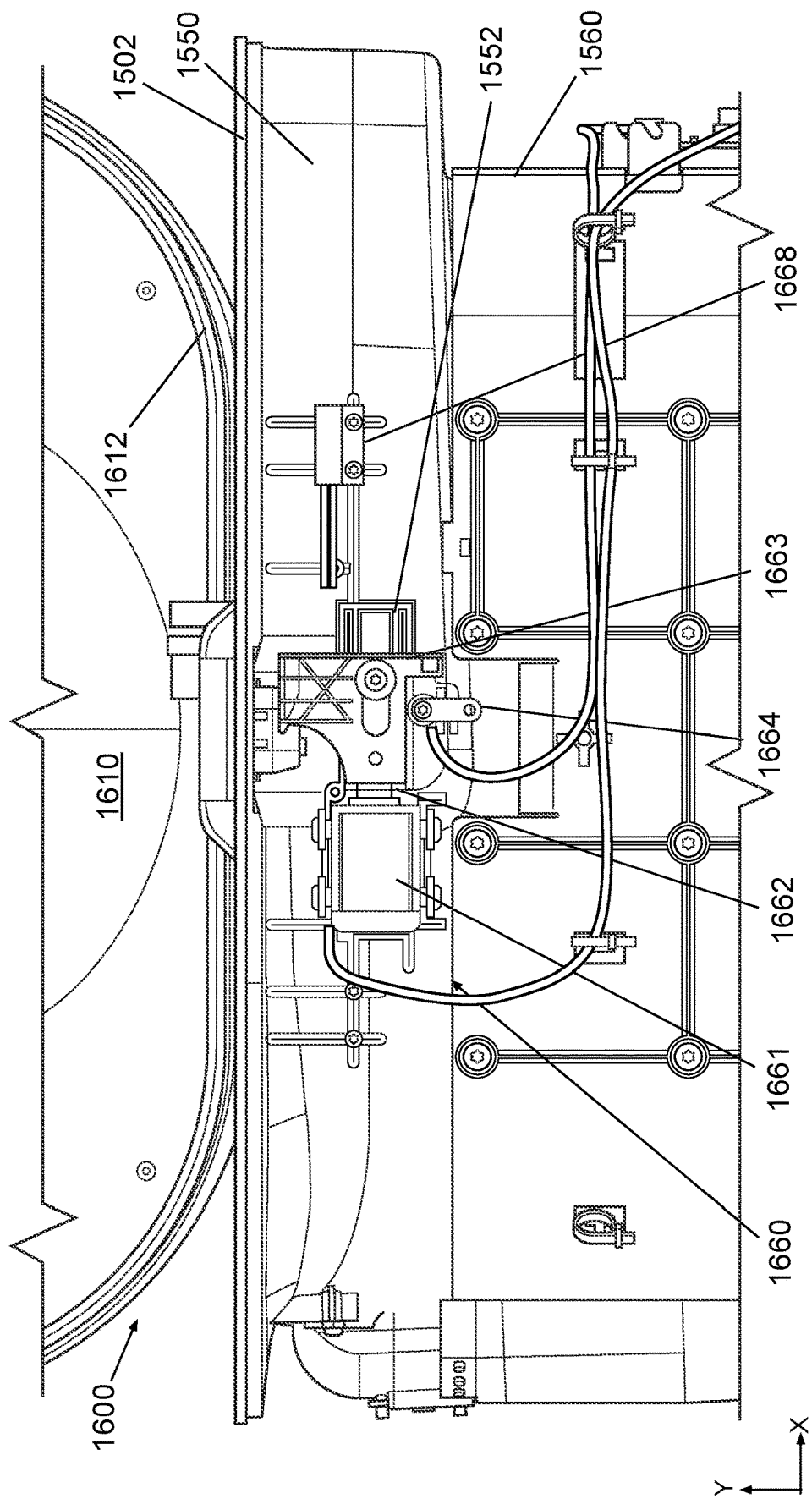
FIGS. 16A and 16B show illustrative front and back views of an OMPA according to an embodiment.
Figure 16B:
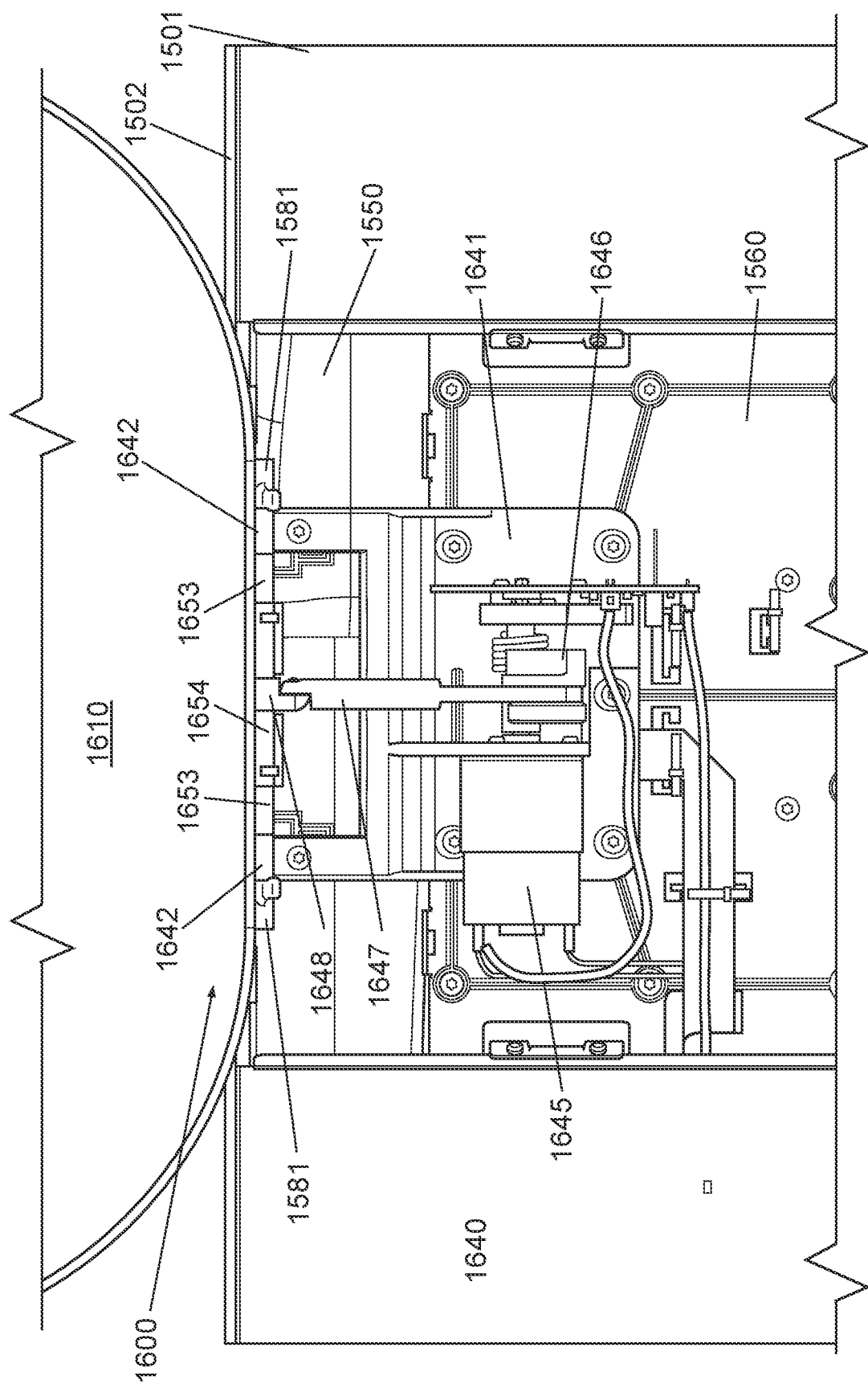

FIGS. 16A and 16B show illustrative front and back views OMPA 1500 with outer sleeve member 1501 removed to show lid assembly 1600, lid 1610, bucket interface subassembly 1550, and inner sleeve member 1560, according to an embodiment. Bucket interface subassembly 1550 and inner sleeve member 1560 can provide structural support for lid assembly 1600. Bucket liner subassembly 1550 can be constructed from a plastic material and is designed to house a bucket assembly that can be inserted and removed from OMPA 1500. Inner sleeve member 1560 can be constructed from metal is designed to attach to bucket liner subassembly 1550. Inner sleeve member 1560 may exist as multiple components. In an alternative embodiment, bucket interface subassembly 1550 and sleeve member 1560 can be a one piece construction made entirely from plastic or a combination of plastic and metal. In either case, the one piece construction or multi-piece construction provides a stable platform for the lift actuation assembly and the latch assembly to be mounted. In addition, bucket interface subassembly 1550 and/or sleeve member 1560 may be referred to herein as a support structure for lid assembly 1600. Additional details of bucket interface subassembly 1550 and bucket assembly 1570 can be found, for example, in commonly owned U.S. Patent Provisional Patent Application No. 63/313,946, filed Feb. 25, 2022, the disclosure of which incorporated by reference in its entirety.

Figure 25:
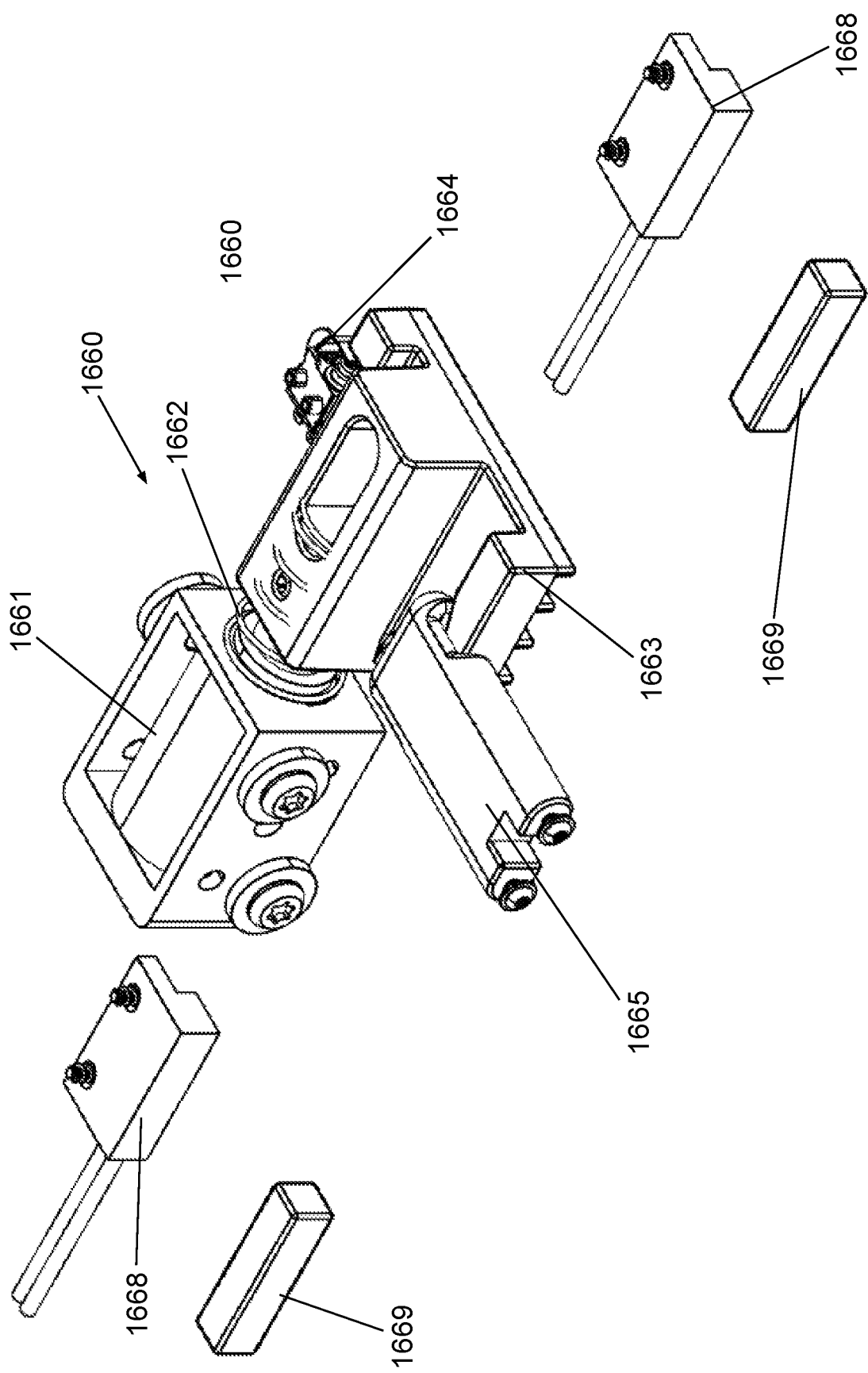
FIG. 25 shows a view of latch assembly according to an embodiment.

FIG. 16A shows the portion of latch assembly 1660 that is mounted to bucket interface subassembly 1550. FIG. 25 shows a standalone view of latch assembly 1660 according to an embodiment. Reference to latch assembly 1660 is made collectively with reference to FIGS. 16A and 25. As shown, latch assembly 1660 can include solenoid 1661, spring 1662, latch interface 1663, and switch 1664. Solenoid 1661 is secured to liner subassembly 1550 as shown and to latch assembly 1663. Latch interface 1663 is moveably secured to track 1552 such that it can move laterally along an axis. Switch 1664 is also secured to liner subassembly 1550. Solenoid 1661 is operative to pull latch assembly 1663 along track 1552 (towards solenoid 1661 in the −X direction) when solenoid 1661 is activated. Latch interface 1663 interfaces with a latch (1665 shown in FIG. 25) that is secured to lid 1610 to lock lid 1610 when it is in a closed position. When latch assembly is in the locked position, it can depress switch 1664, which can electrically signal that the lid is locked. Spring 1662 may be positioned between solenoid 1661 and latch interface 1663 and is operative to push latch interface 1663 away from solenoid 1661 in the +X direction to unlock latch 1665 when solenoid 1661 is deactivated. When latch interface 1663 is in the unlocked position, switch 1664 is not depressed, thereby electrically signaling that lid 1610 is not locked.

Sensor 1668 may be secured to bucket liner assembly 1550 and is operative to detect whether lid 1610 is closed or not. Sensor 1668 may be able to detect the presence of magnet 1669 (illustrated in FIG. 25), is incorporated into lid 1610, when lid 1610 is closed. Only one sensor 1668 is shown in FIG. 16A, but if desired, another sensor (similar to sensor 1668) may be positioned adjacent to solenoid 1661. Use of dual sensors can confirm that lid 1610 is evenly closed. Sensor 1668 and switch 1664 can provide signals to a controller that manages operation of the OMPA. The controller can monitor these signals to ensure safe operation of the OMPA. For example, organic matter processing may be executed only when switch 1664 confirms that lid 1610 is locked and when sensor 1668 confirms lid 1610 is closed.

Figure 24:
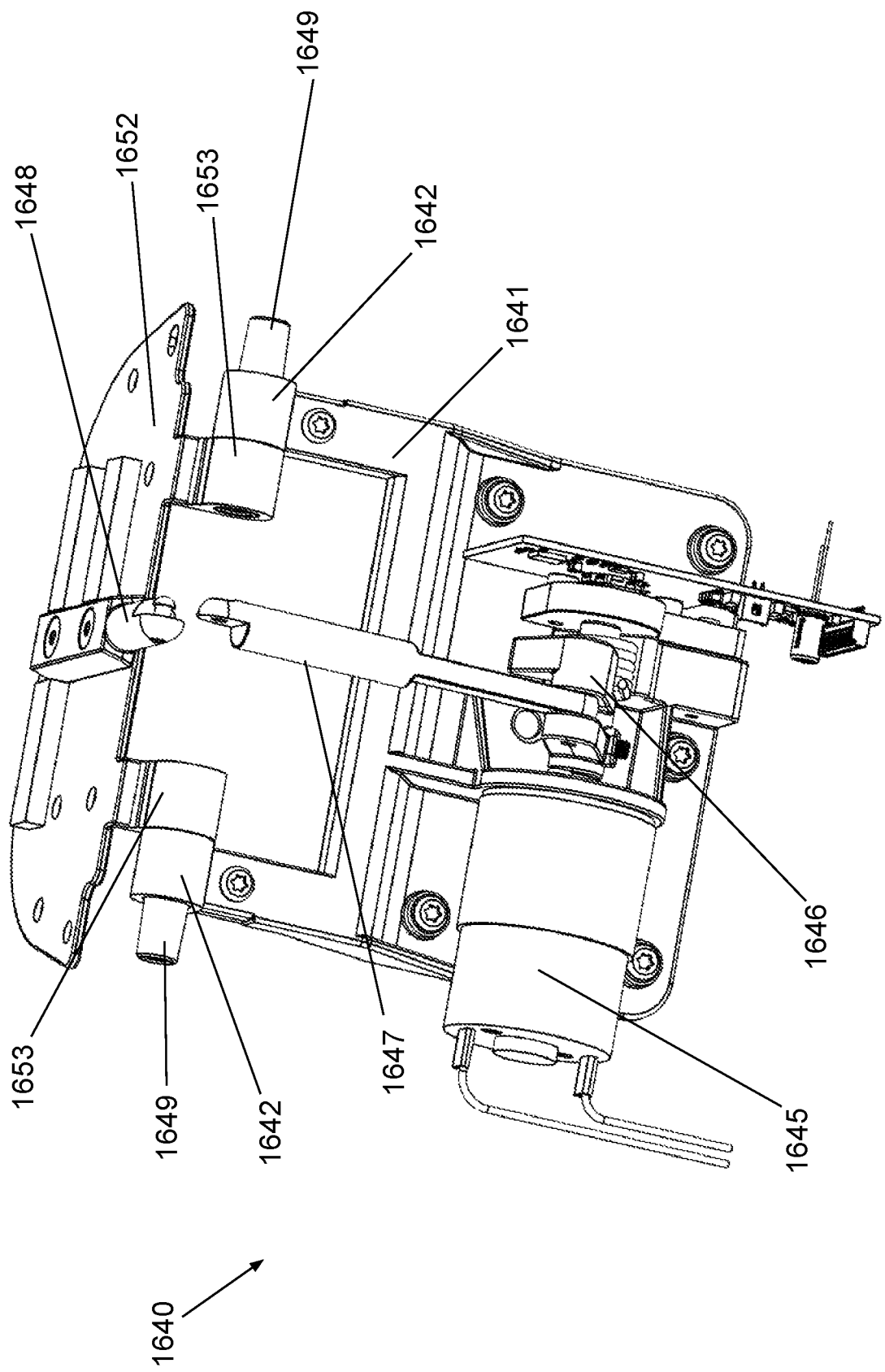
FIG. 24 shows a view of a lid actuation assembly according to an embodiment.

FIG. 16B shows the portion of lid actuator assembly 1640 that is attached to a support member (e.g., bucket interface assembly 1550 and/or inner sleeve member 1560). FIG. 24 shows a stand alone view of lid actuation assembly 1640, according to an embodiment. Reference to lid actuator assembly 1640 is made collectively with reference to FIGS. 16B and 24. As shown, lid actuator assembly 1640 can include mounting plate 1641, pivot barrels 1642, motor 1645, spring loaded rotation member 1646, arm member 1647, arm member 1648, lid hinge plate 1652 (FIG. 25), cover 1654, and other components (not shown). Mounting plate 1641 serves as a rigid structure that is secured to bucket interface assembly 1550 and/or inner sleeve member 1560. Mounting plate 1641 includes integrated structures for securing various components (e.g., motor 1645, spring loaded rotation member 1646, electronics) thereto. In addition, pivot barrels 1642 are integrally formed as part of mounting plate 1641 that serve as the basis for the pivot axis of lid assembly 1600. Cylindrical members 1649 (e.g., rods or tubes) (shown in FIG. 25) may connect hinge barrels 1653 of lid hinge plate 1652 (shown in FIG. 25) to respective pivot barrels 1642. In particular, lid hinge plate 1652 can include two hinge barrels 1653 that are co-axially aligned with pivot barrels 1642 when the cylindrical members are inserted into the hinge barrels and the pivot barrels. The same cylindrical members may also interface with barrel caps 1581 of the bezel. This arrangement enables lid 1610 to rotate about the pivot axis provided by pivot barrels 1642. Furthermore, the bezel (e.g., bezel 1580) is also able to rotate about the pivot axis independently of lid 1610.

Motor 1645 is operative to rotate in a first rotation direction to open lid 1610 or to rotate in a second rotation direction to close lid 1610. Motor 1645 is connected to spring loaded rotation member 1646, which is connected to arm member 1647, and arm member 1647 is connected to arm member 1648, which is secured to lid plate 1652. When lid 1610 is opened, motor 1645 causes spring loaded rotation member 1646 to rotate in the first direction, thereby exerting an "opening" force on arm member 1647, which force is translated through arm member 1648 and lid plate 1652 to open lid 1610. When lid 1610 is closed, motor 1645 causes spring loaded rotation member 1646 to rotate in the second direction, thereby exerting a "closing" force on arm member 1647, which force is translated through arm member 1648 and lid hinge plate 1652 (shown in FIG. 19) to close lid 1610. Spring loaded rotation member 1646 may serve a dual role in assisting motor 1645 in opening and closing lid 1610 at a desired speed and in assisting a user who is manually opening or closing lid 1610. Lid 1610 is relatively heavy as it contains serval components (discussed in detail below) that are not included in conventional lids for containers having a similar form factor, function, or purpose. Spring loaded rotation member 1646 can pre-tension lid 1610 for faster or assisted opening actuation.

FIG. 16C shows an alternative latch assembly 1660a that is mounted to bucket interface subassembly 1550. As shown, latch assembly 1660a can include solenoid 1661, spring 1662, latch interface 1663, switch 1664, mounting plate 1666a, switch 1664a, hall effect sensor 1664b, latch 1665, and magnet 1665a. The operation of solenoid 1661, spring 1662, latch interface 1663, and track 1552 are the same as discussed in FIG. 16A. Mounting plate 1666a is secured to subassembly 1550 and houses switch 1664a and hall effect sensor 1664b. Magnet 1665a is integrated within latch 1665. Switch 1664a can be depressed or activated when the lid is closed. Latch 1665 may press switch 1664a when the lid is in the closed position. Hall effect sensor 1664b can detect presence of magnet 1665a when the lid is closed. Thus, latch assembly 1660a has two different sensors for detecting whether the lid is closed: switch 1664a and hall effector sensor 1664b. In some embodiments, one of these sensors may be omitted. For example, latch assembly 1660a may include switch 1664a but not hall effect sensor 1664b nor magnet 1665a. As another example, latch assembly 1660a may include hall effector sensor 1664b and magnet 1665a, but not switch 1664a.

Latch interface 1663 is shown as a standalone component in FIG. 16D. As shown, latch interface 1663 has a ramp profile 1663a for the portion that interfaces with latch 1665 (not shown). Ramp profile 1663a can serve two purposes: enable sliding of latch interface over latch 1665 to lock the lid and to permit user activated opening of the lid when the lid is locked with latch interface 1663. When a user pulls up on the lid, a force component of that vertical pull force is directed horizontally based on the angle of ramp 1663. The solenoid holding force (which is tunable depending on the voltage supplied to it) is equal to that force component. When the user pulls with enough force, solenoid 1661 will no longer hold closed and will allow the lid to open. This user action does not damage the solenoid or any other parts. Moreover, the manually opening of the lid can be detected by latch switch 1664 and other switches or sensors (e.g., switch 1664a and hall effector sensor 1664b).

Figure 17A:
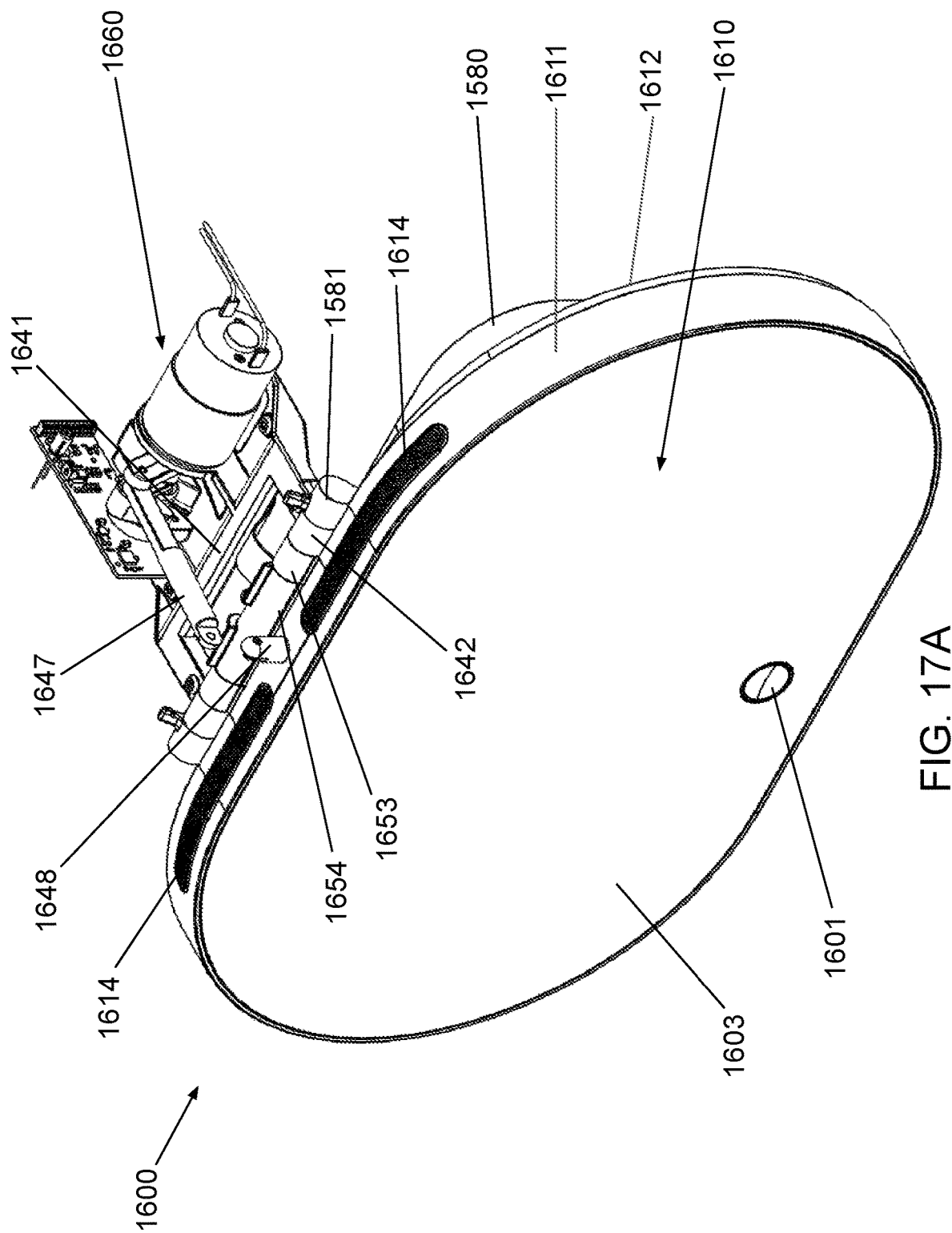
FIGS. 17A-17C show different illustrative views of a lid assembly standing alone without any other components of an OMPA present according to an embodiment.
Figure 17B:
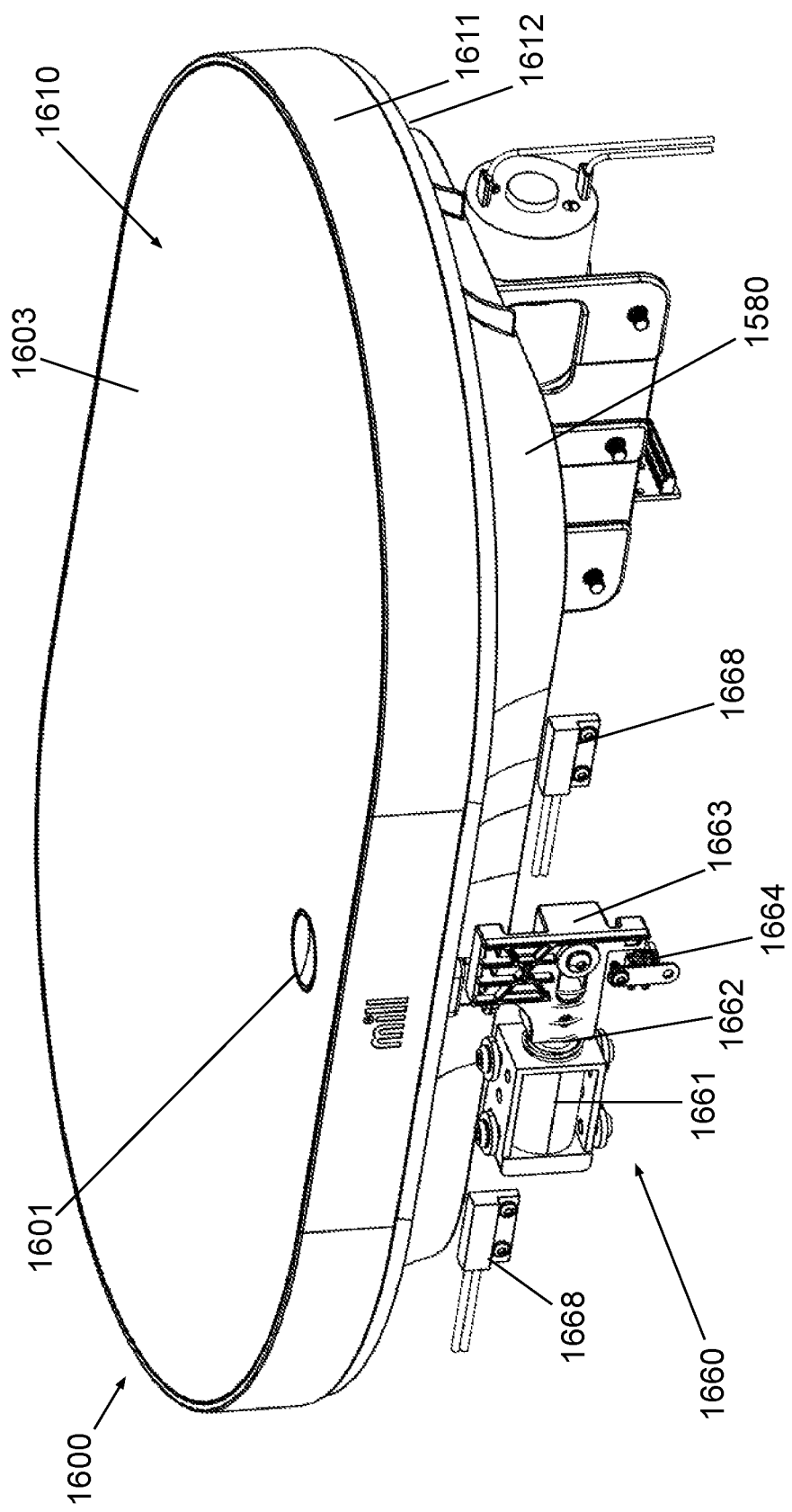
Figure 17C:
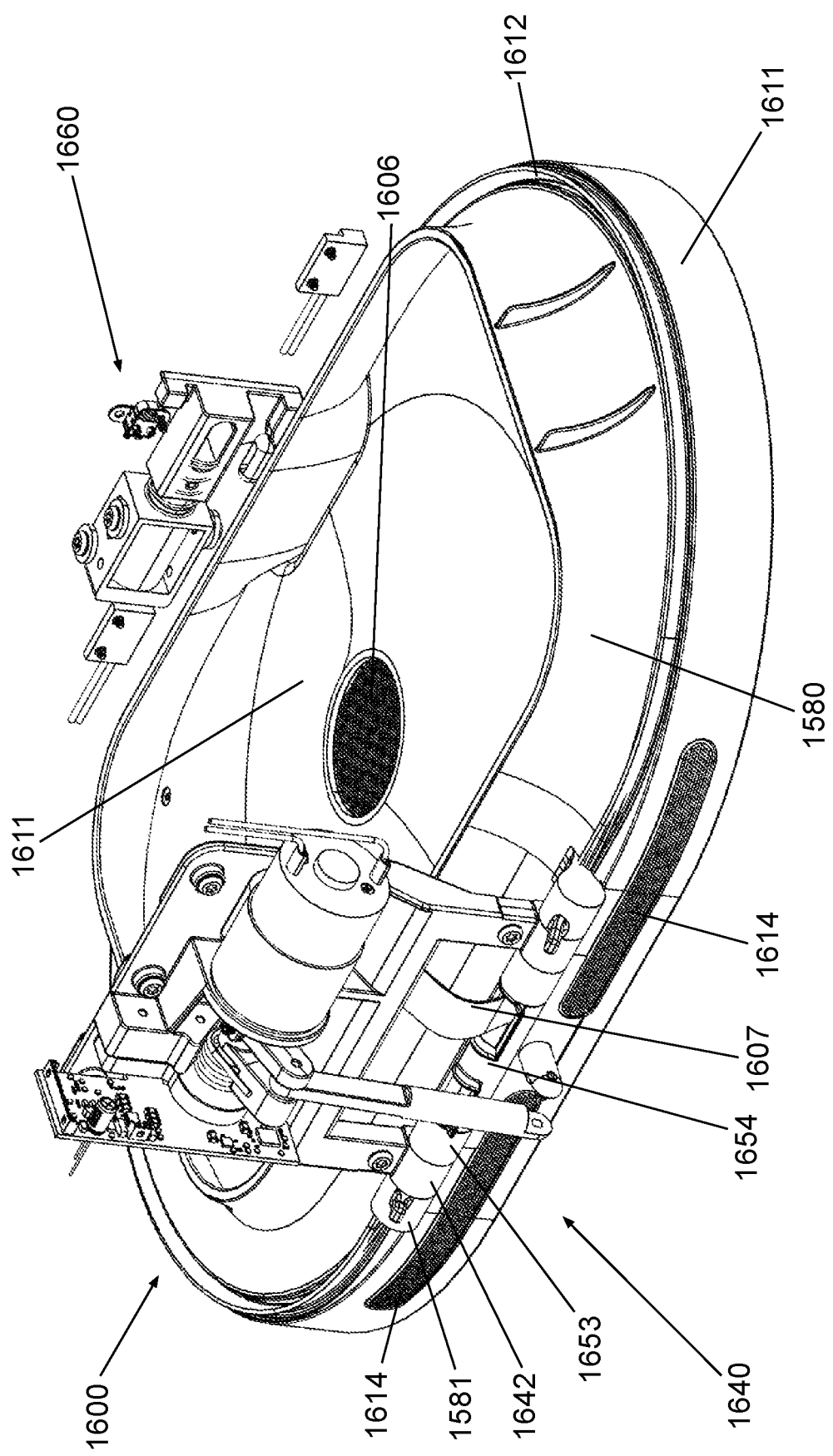

FIGS. 17A-17C show different illustrative views of lid assembly 1600 standing alone without any other components of an OMPA present according to an embodiment. One or more of FIGS. 17A-17C may show parts of lid actuation assembly 1640 and latch assembly 1660. Some of the reference numbers for lid actuation assembly 1640 and latch assembly 1660 may be omitted to avoid overcrowding the figures. In addition, arm member 1647 is shown as not being coupled to arm member 1648. This non-coupling is merely illustrative and those skilled in the art would appreciate that in a fully assembled lid assembly, arm members 1647 and 1648 would be coupled together. Referring now specifically to FIG. 17A, which shows a perspective view of lid assembly 1600, lid 1610, and lid actuation assembly 1640. Also shown are bezel 1580, button 1601, cosmetic member 1603, lid support plate 1611, gasket 1612, inlet screens 1614 that cover holes 1613 (not shown). Arm member 1648 is shown extending beyond the periphery of lid support plate 1611. FIG. 17A shows pivot barrels 1642 of mounting plate 1641, barrels 1653 of lid plate 1652 (not shown), cover 1654, and barrel caps 1581 of bezel 1580.

FIG. 17B shows another perspective view of lid assembly 1600 with emphasis on latch assembly 1660. FIG. 17B shows solenoid 1661, spring 1662, latch interface 1663, switch 1664, latch 1665, and sensors 1668. FIG. 17B also shows lid support plate 1611, gasket 1612, button 1601, cosmetic member 1603, and bezel 1580.

FIG. 17C shows another perspective view of lid assembly 1600 in an inverted position according to an embodiment. Lid actuation assembly 1640, latch assembly 1660, lid support plate 1611, gasket 1612, and bezel 1580 are shown. In addition, screen 1606 is shown covering a hole existing within lid support plate 1611. Inlet screens 1614 that cover other holes in lid support plate 1611 are shown. Arm member 1648 is shown extending beyond the periphery of lid support plate 1611. FIG. 17C shows pivot barrels 1642 of mounting plate 1641, barrels 1653 of lid plate 1652 (not shown), cover 1654, and barrel caps 1581 of bezel 1580. Note, power and signal conductor 1607 being routed through a hole in cover 1654.

Figure 18A:
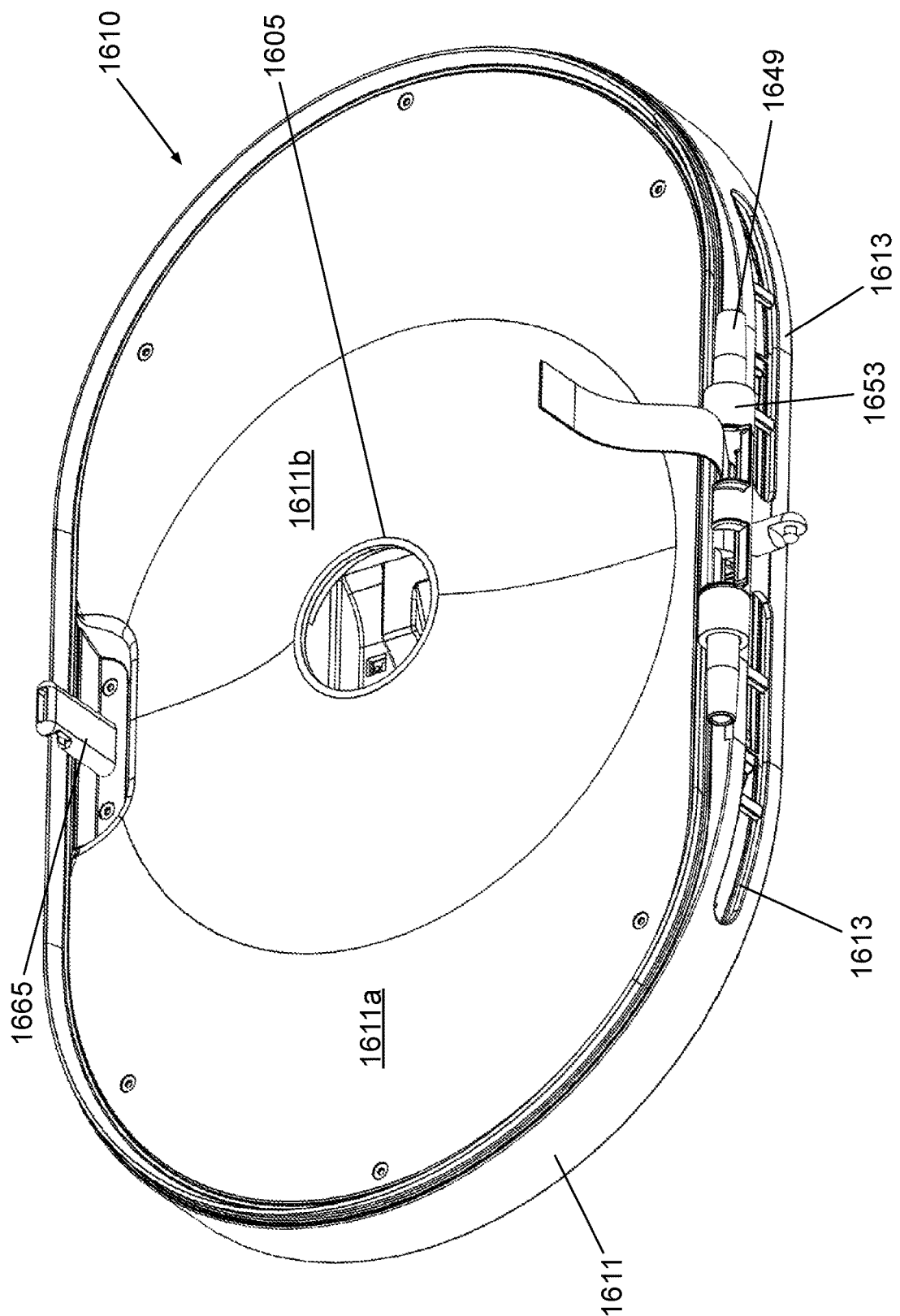
FIGS. 18A and 18B show different perspective views of the bottom side of the lid according to various embodiments.
Figure 18B:
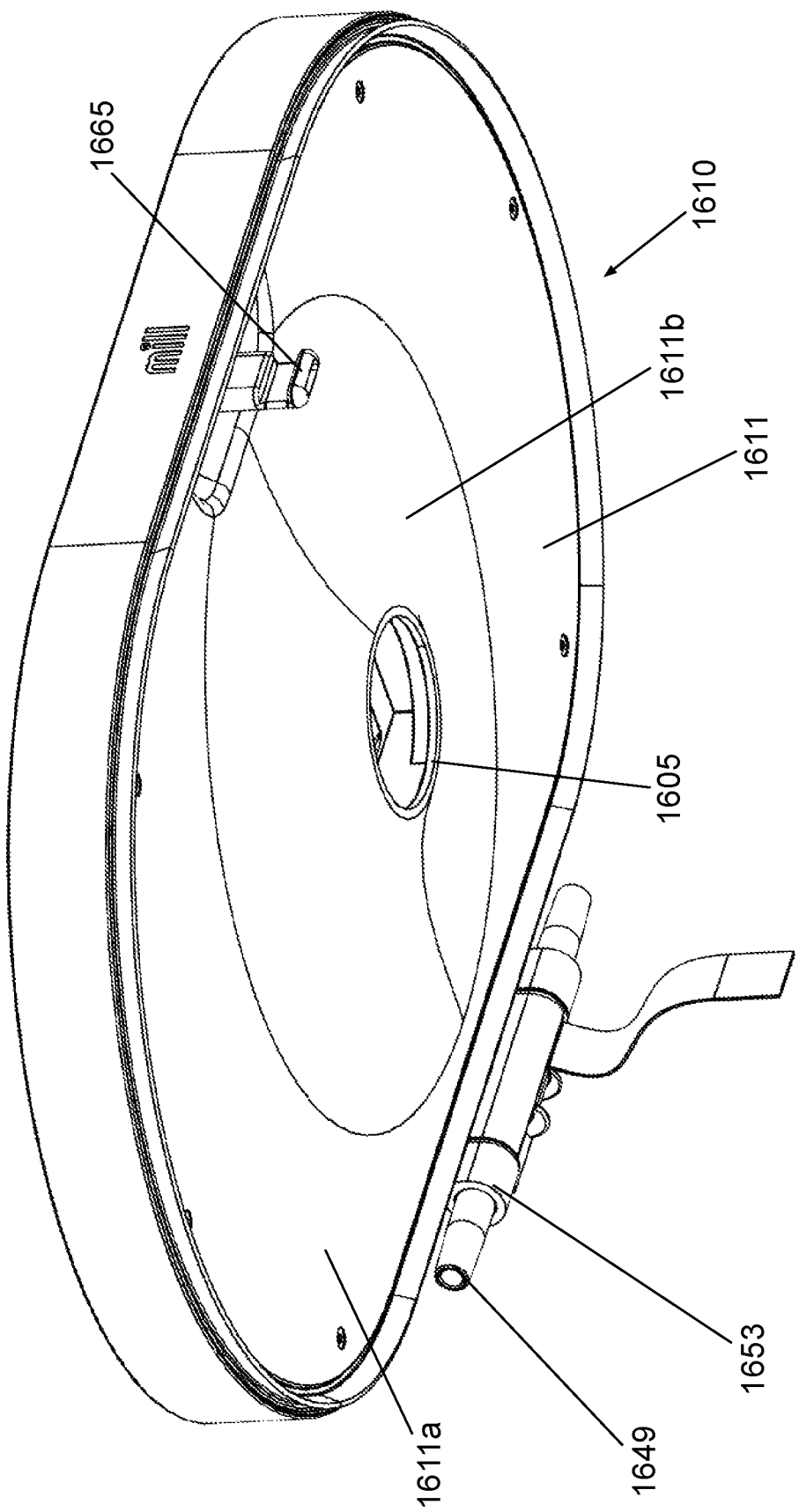

FIGS. 18A and 18B show different perspective views of the bottom side of lid 1610 with bezel 1580 and portions of lid actuation assembly 1640 and latch assembly 1660 removed according to various embodiments. Screens 1606 and 1614 have been removed to show respective outlet port 1605 and inlet ports 1613 in lid support plate 1611. Latch 1665 is shown more clearly in FIGS. 18A and 18B. Cylindrical members 1649 are shown interfacing with barrels 1653 of lid hinge plate 1652; pivot barrels 1642 and barrel caps 1581 are removed in these figures. The bottom surface of lid support plate 1611 includes flat surface 1611a and curved surface 1611b. The bottom surface of lid support plate 1611 is pointed down into the bucket assembly when lid 1610 is closed. Curved surface 1611b may resemble a cone shape (e.g., a relatively shallow cone). Curved surface 1611b may promote air flow within lid 1610 to funnel out of outlet port 1605 when the fan (not shown) contained in lid 1610 is operating.

Figure 18C:
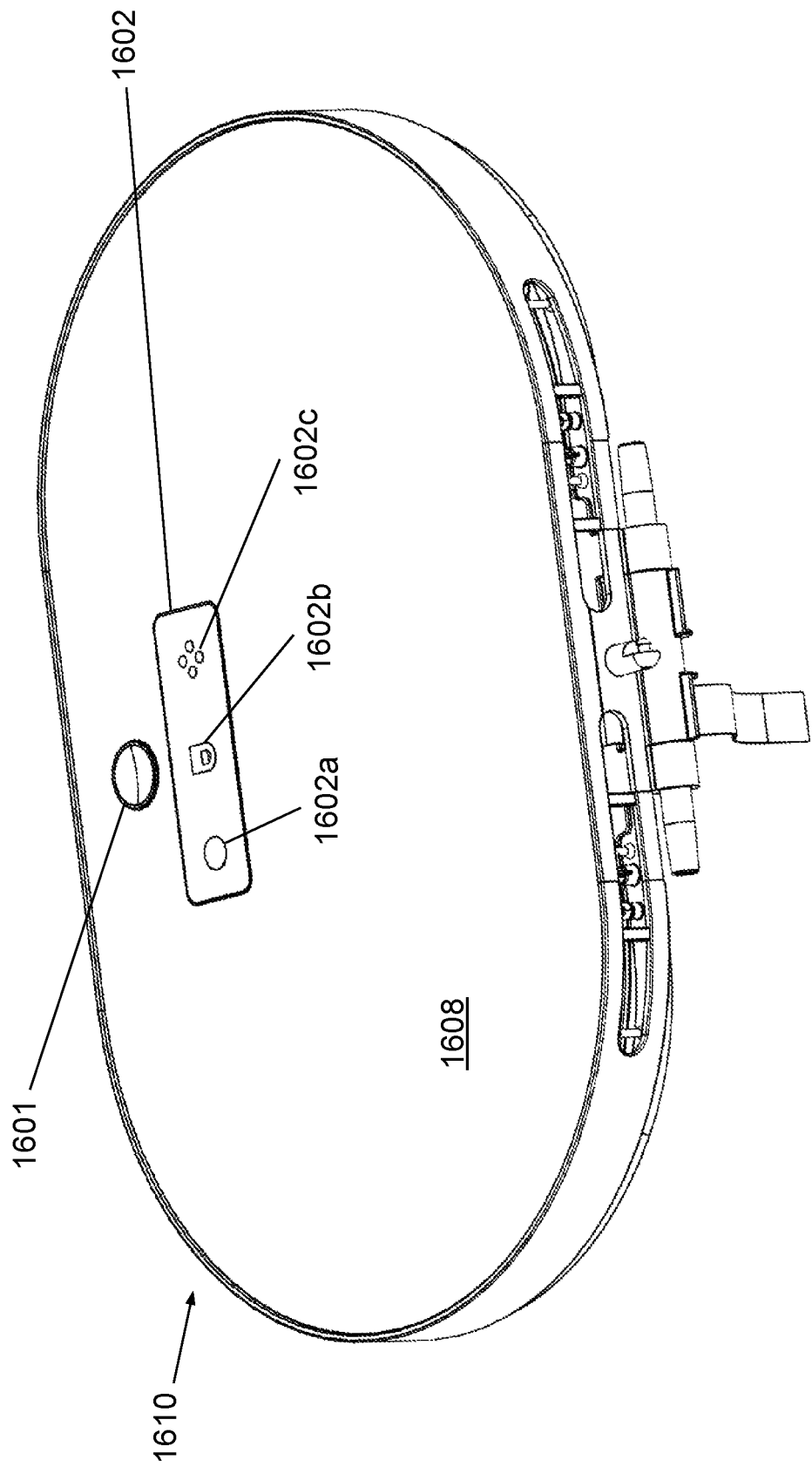
FIG. 18C shows a perspective view of the top side of the lid according to an embodiment.

FIG. 18C shows a perspective view of the top side of lid 1610 with cosmetic member 1603, bezel 1580, and portions of lid actuation assembly 1640 removed according to various embodiments. With cosmetic member 1603 removed, cover member 1608 is shown along with button 1601 and display element region 1602. Display element region 1602 can include dead fronted displays 1602a-1602c.

Figure 19:
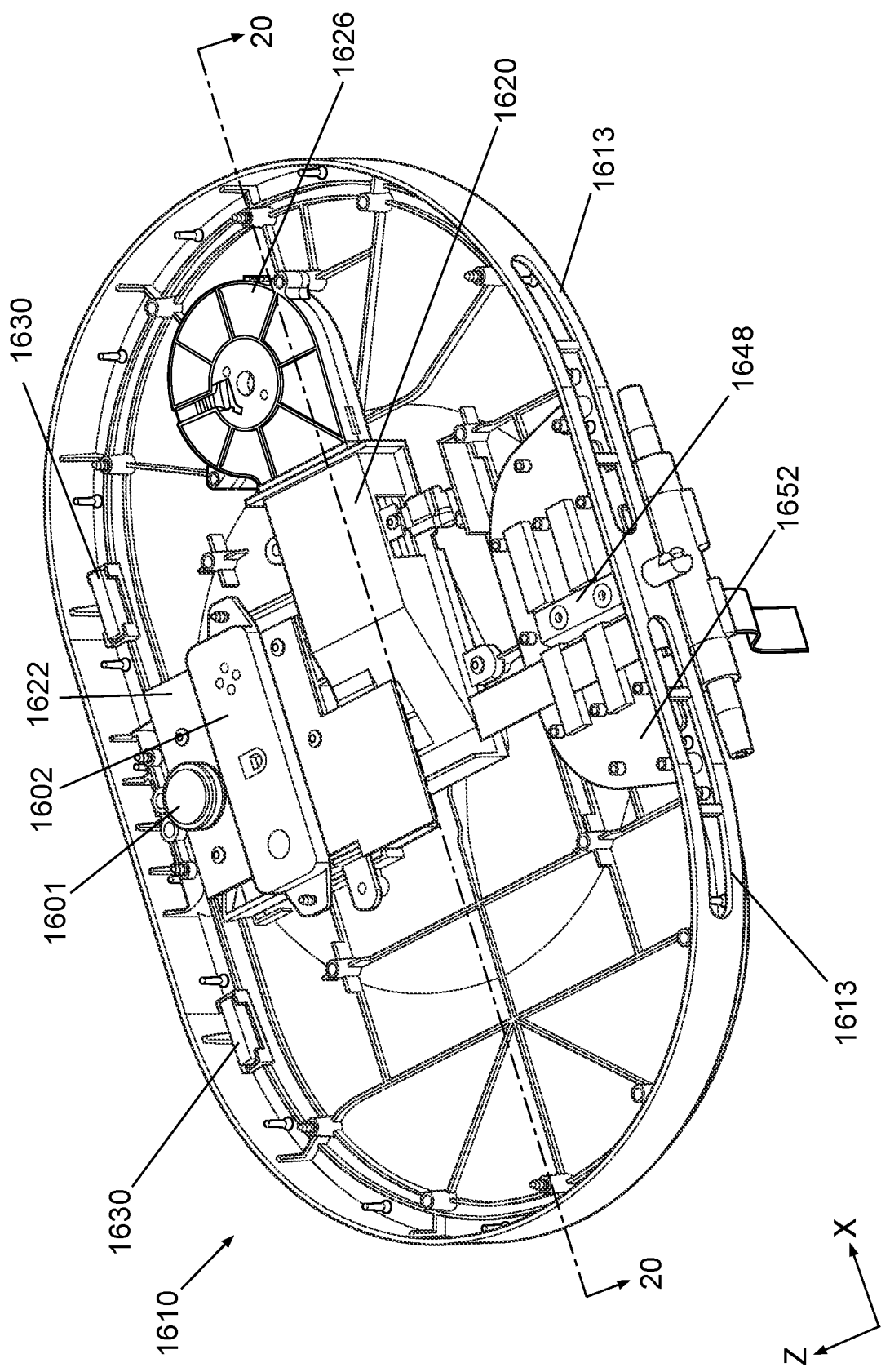
FIG. 19 show a perspective view of the top side of the lid with various components removed according to various embodiments.

FIG. 19 show a perspective view of the top side of lid 1610 with cosmetic member 1603, cover member 1608, bezel 1580, and portions of lid actuation assembly 1640 removed according to various embodiments. FIG. 19 shows the various components that are included in lid 1610. These components can include lid support plate 1611, lid hinge plate 1652, arm member 1648, manifold 1620, circuit board 1622, sensor (not shown), dead fronted displays 1602, button 1601, heater (not show), fan 1626, air directing structure (not shown), and magnets 1630.

Lid support plate 1611 may be constructed from a plastic, thermoplastic, glass filled resin, or other similar material to minimize weight and cost compared to metal-based alternatives. Structural ribbing may be incorporated into lid plate 1611 to enhance structural rigidity thereof and to provide mounting points to other components (e.g., manifold 1620 and fan 1626). Lid support plate 1611 may have outlet port 1605 as shown in FIGS. 18A and 18B. Lid support plate 1611 can also include inlet ports 1613. Ambient air is drawn into lid 1610 via inlet ports 1613 by fan 1626 and then injected into manifold 1620, which redirects the air through outlet port 1605. An air directing structure (not shown) may help funnel air from inlet ports 1613 to fan 1626. The air directing structure can include, for example, internal ribbing, walls, or conduits.

Lid hinge plate 1652 is secured to lid support plate 1611. Lid hinge plate 1652 may be constructed from a metal such as aluminum and is sized to distribute loading across a minimum cross-sectional area of lid support plate 1611. The interface between lid hinge plate 1652 and lid support plate 1611 is designed to handle the full weight of lid 1610 during opening and closing actions. In one embodiment, hinge plate 1652 may be heat staked directly to lid support plate. Heat staking, in contrast to metal fasteners or screws, may be lighter and result in a robust coupling that is less susceptible to failure over time. In addition, use of heat staking in lieu of metal screws prevents stripping within lid support plate 1611 during assembly. Arm member 1648 may be secured to lid hinge plate 1652. Arm member 1648 may be constructed from a metal material and thus can be secured to hinge plate 1652 with a metal screw, fastener, or rivet. Moreover, arm member 1648 is constructed to be coupled to arm member 1647 (not shown).

Manifold 1620 can serve multipurpose roles of channeling air from fan 1626 to outlet port 1605, holding heater (not shown) in place within manifold 1620, providing a mounting platform for circuit board 1622. Fan 1626 may be mounted to an inlet port of manifold 1620. In some embodiments, the interface between fan 1626 and manifold may be sealed with a rubber boot or gasket. Fan 1626 can be a centrifugal fan. If desired, in some embodiments, manifold 1620 can split into multiple parts. That is, the air channel portion of the manifold can exist separately from a circuit board mounting portion of the manifold.

Manifold 1620, fan 1626, and the heater contained within manifold are arranged along the X-Z plane to minimize height (Y-axis) stack up within lid 1610 and to minimize thickness (Y-height) of lid 1610. With is arrangement, air is pulled in from outside of lid 1610, routed to fan 1626, which forces air into manifold 1620 where it is optionally heated by the heater and then pushed out of lid 1610 via outlet port 1605. In one embodiment, the forced air travels initially along the X-axis and then is redirected along the Y-axis by manifold 1620 and lid support plate 1611.

Figure 20:
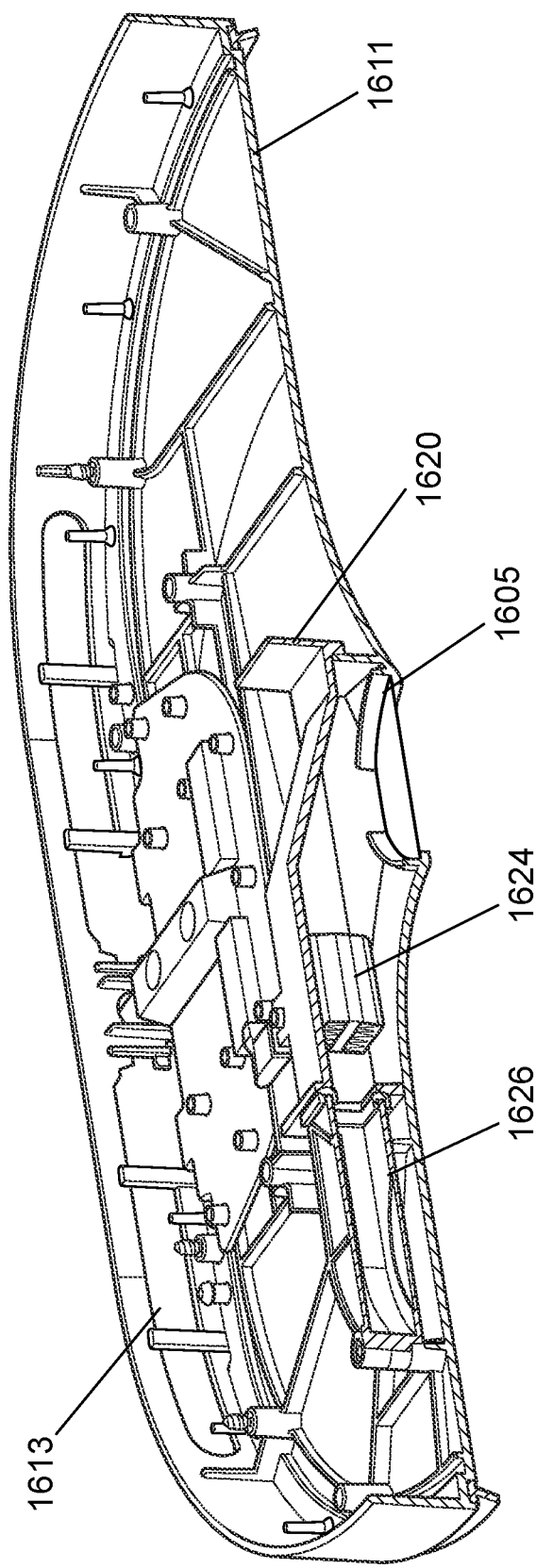
FIG. 20 show a cross-sectional view of the lid assembly of FIG. 19 taken along line 20-20 according to an embodiment.

FIG. 20 show a cross-sectional view of lid assembly 1600 of FIG. 19 taken along line 20-20. FIG. 20 shows heater 1624 secured within manifold 1620. Heater 1624 can be a ceramic heater. Heater 1624 may be aligned with the outlet port of fan 1626 to maximize air flow through heater 1624 such that heater 1624 can heat the forced ambient air being pushed through port 1605. Note that manifold 1620 can be constructed to have a curve or slant to further direct airflow down into port 1605. The curve or slant may be selected to maximize dispersal of forced air or heated forced air through port 1605 and into the bucket assembly positioned below port 1605.

Figure 21:
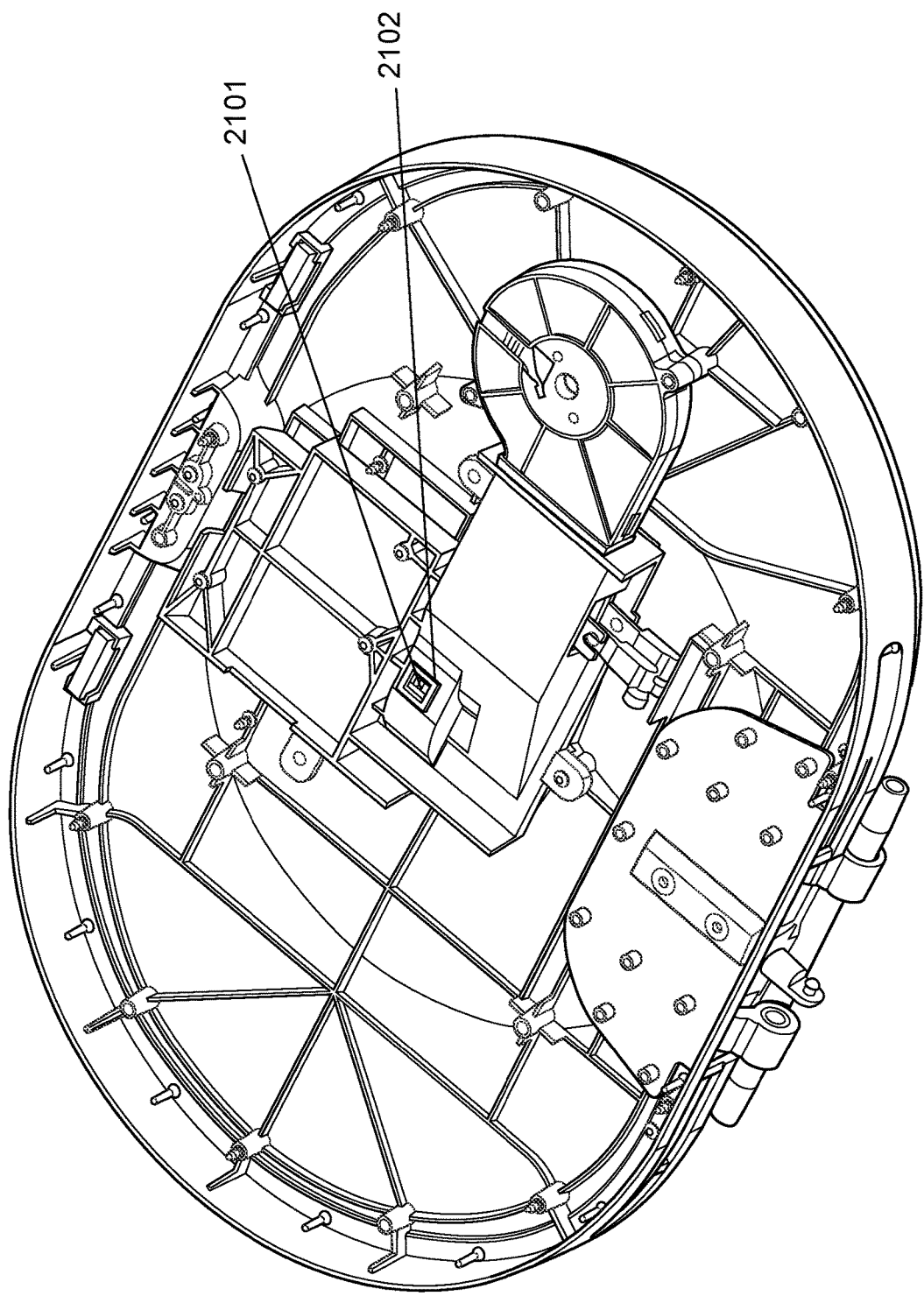
FIG. 21 show a perspective view of the top side of lid assembly according to an embodiment.

FIG. 21 show a perspective view of the top side of lid assembly 1600 that is similar to FIG. 19, but with circuit board 1622 removed, according to an embodiment. FIG. 21 shows sensor port 2101 in manifold 1620 with seal 2202 surrounding it. Seal 2102 exists around the sensor in between board 1622 and manifold 1620 to prevent any forced air or heated forced air from escaping manifold 1620. A sensor that is attached to circuit board 1622 (not shown) can be exposed to sensor port 2101 such that the sensor can monitor conditions within manifold 1620. For example, the sensor can monitor temperature, humidity, and presence of volatile organic compounds.

Figure 22:
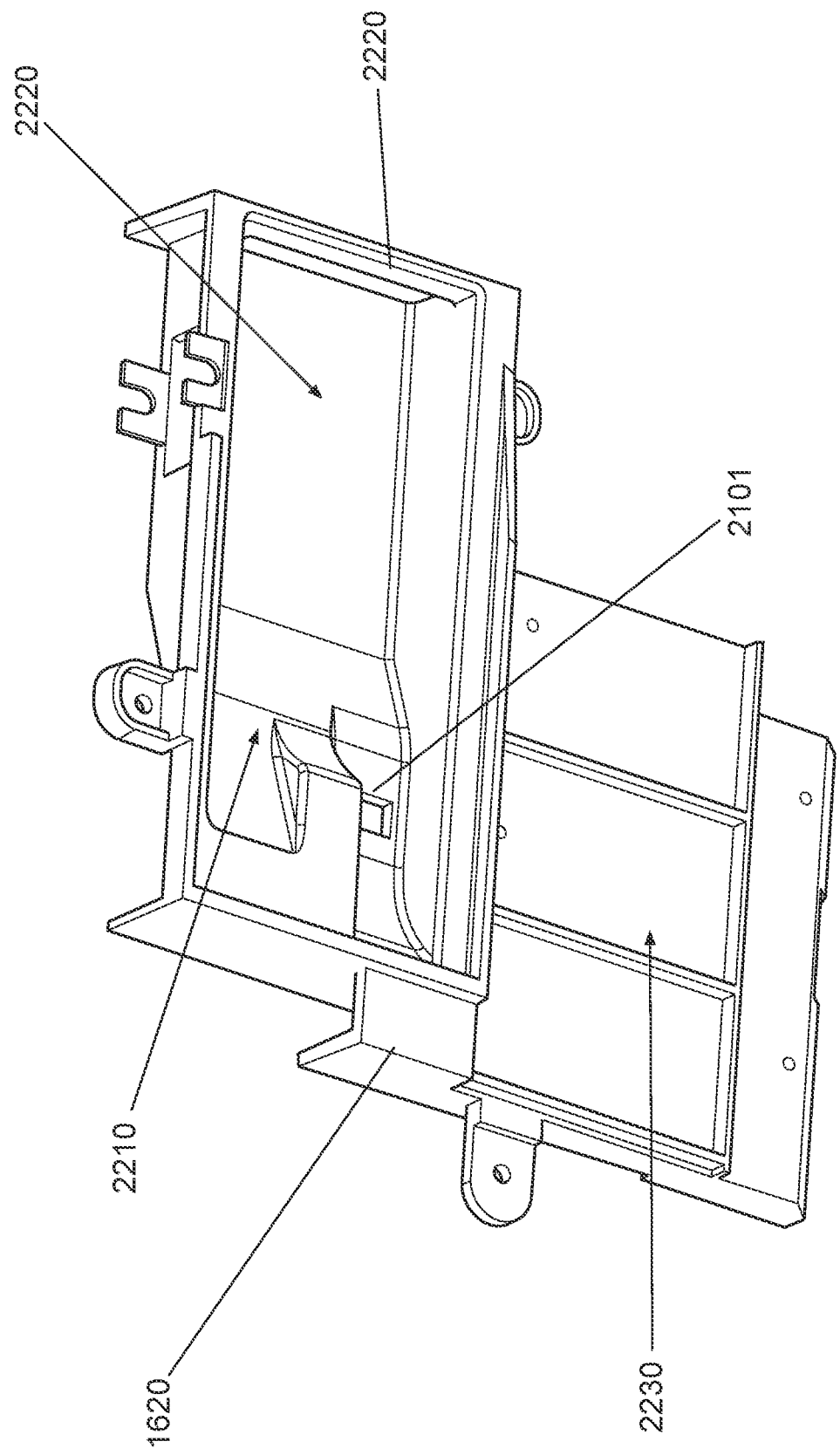
FIG. 22 show a bottom perspective view of a manifold according to an embodiment.

FIG. 22 show a bottom perspective view of manifold 1620 according to an embodiment. Sensor port 2101 is shown. Manifold 1620 can include air directing portion 2210, distal portion 2220, and circuit board mounting portion 2230. Air directing portion 2210 may be shaped to direct force air into outlet port 1605 (not shown). The shape of air directing portion 2210 can vary in design and can include curves and/or slanted surfaces. In addition, air directing portion 2210 may be positioned over the outlet port. Furthermore, sensor port 2101 may exist in air directing portion 2210. Distal portion 2220 can represent the portion of manifold 1620 that extends laterally away from air directing portion 2210 (and the outlet port) and contains space for retaining the heater (e.g., heater 1624). The fan (e.g., e.g., fan 1626 may be coupled to a distal end 2222 of distal portion 2220. Circuit board mounting portion 2230 is self-explanatory and can support a circuit board (e.g., circuit board 1622).

Figure 23:
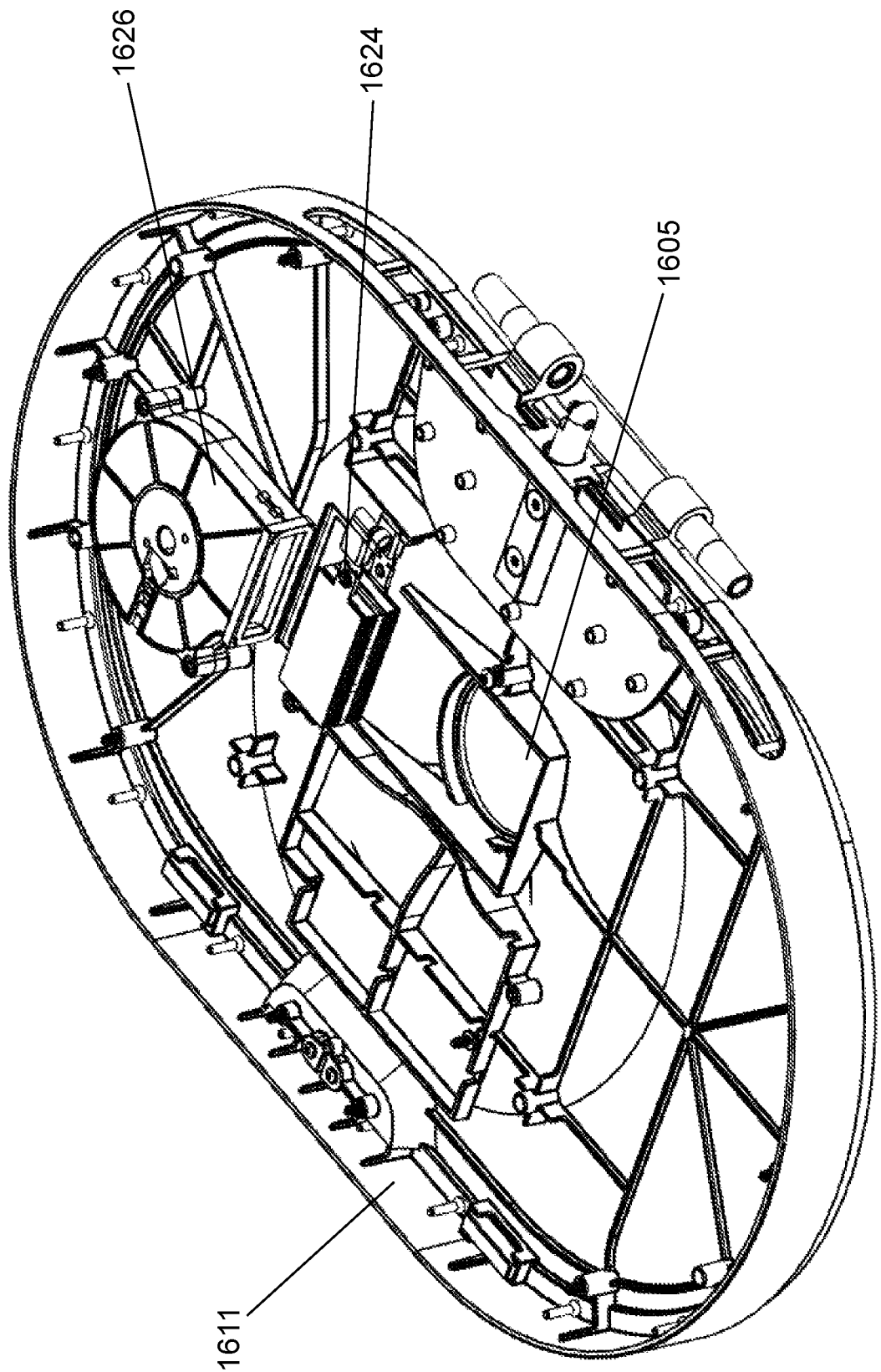
FIG. 23 removes the manifold from FIG. 21 to show position of a heater on a lid support plate according to an embodiment.

FIG. 23 removes manifold 1620 from FIG. 21 to show the position of heater 1624 on lid support plate 1611 according to an embodiment. Support plate 1611, particularly manifold retaining box 1621, is configured to hold manifold 1620 in place and serve as a bottom surface of manifold 1621. Hole 1605 exists as part of manifold retaining box 1621.

Figure 26:
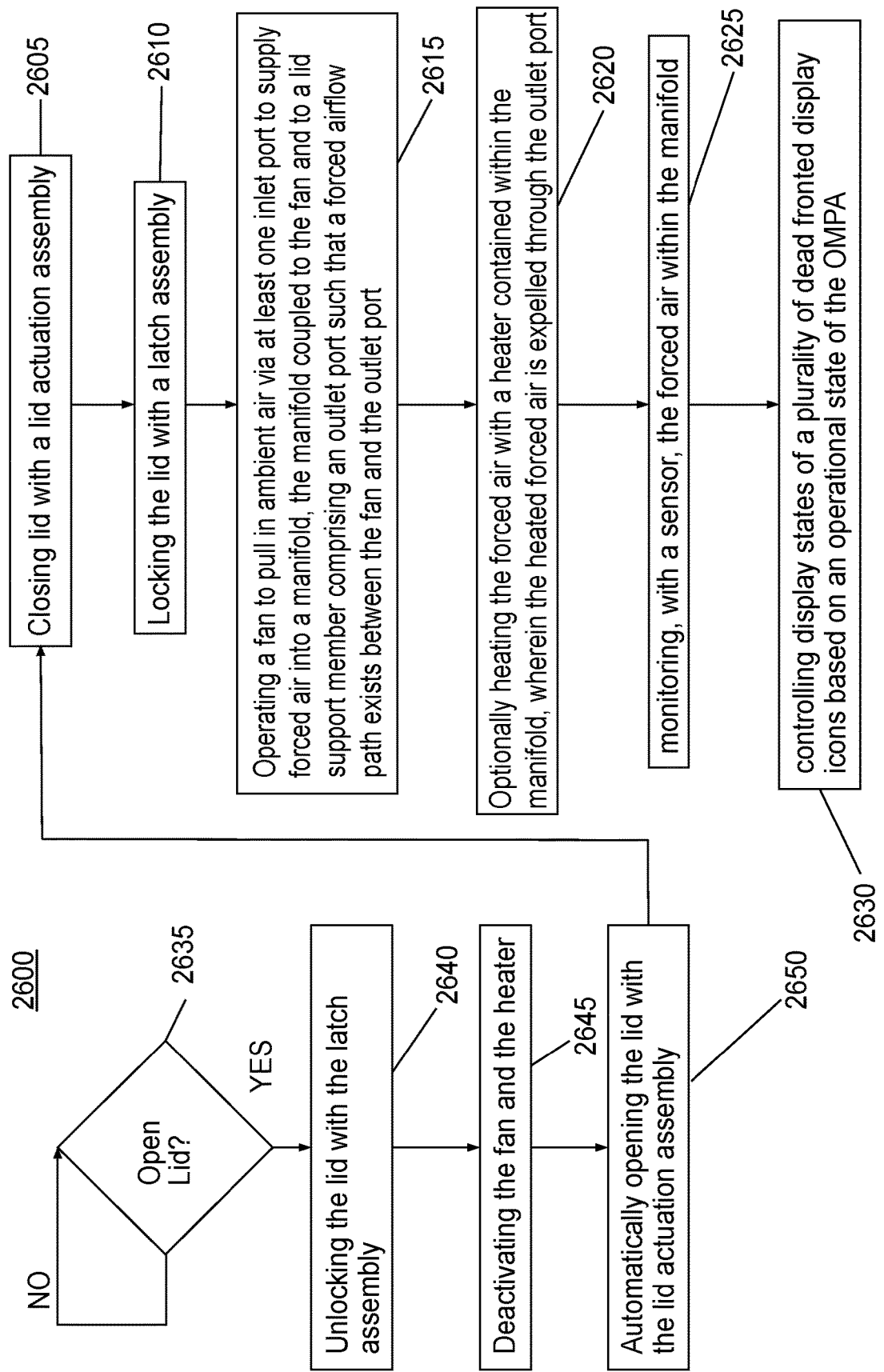
FIG. 26 shows an illustrative process for operating a lid assembly according to an embodiment.

FIG. 26 shows illustrative process 2600 for operating a lid assembly according to an embodiment. Process 2600 can be implemented in an OMPA, and in particular, implemented in a lid assembly according to embodiments discussed herein. Starting with step 2605, the lid (e.g., lid portion 1610) of the lid assembly (e.g., lid assembly 1600) can be closed with a lid actuation assembly (e.g., lid actuation assembly 1640). The lid may closed automatically after a predetermined period of time has elapsed, in response to user input command (e.g., stepping on a pedal located at the bottom of the OMPA, or in response to a command transmitted from a remote device such as a phone, tablet, or computer), in response to a user manually pushing the lid closed, or in response to a user gently moving the lid to cause the actuation assembly to sense the movement and complete the closing action. When the lid is closed, the lid may be locked with a latch assembly (e.g., latch assembly 1660). The latch assembly may verify that the lid is fully closed by monitoring one or more magnetic sensors that can detect whether the lid is closed or open before engaging the latch to lock the lid.

When the lid is closed, a fan (e.g., fan 1626) may be operated to pull in ambient air via at least one inlet port (e.g., inlet holes 1613) to supply forced air into a manifold (e.g., manifold 1620), at step 2615. The manifold is coupled to the fan and to a lid support member including an outlet port such that a forced airflow path exists between the fan the outlet port (e.g., hole 1605). The forced air is directed into the bucket assembly responsible for processing organic matter. At step 2620, the forced air may be optionally heated by a heater (e.g., heater 1624) contained within the manifold. The forced air may pass through and/or around the heater as it flows through the manifold to the outlet port. When the heater is operating, the heated forced air is expelled through the outlet port.

At step 2625, the forced air, whether heated or not, can be monitored by a sensor that is exposed to a sensor port in the manifold. The sensor can monitor temperature, relatively humidity, and any volatile organic compounds. The information collected by the sensor can be used as feedback control for the fan and heater. In addition, the information may be used by an OMPA processor to manage control of other systems or components of the OMPA. Furthermore, the collected information may be transmitted to a central server that is in communication with the OMPA.

At step 2630, the display states of several dead fronted displays may be controlled based on the operational state of the OMPA. For example, one display may indicate whether the OMPA is currently processing organic matter. Another display may indicate that OMPA output is ready to be retrieved from the OMPA. Yet another display may indicate Wi-Fi or Bluetooth pairing status. It should be appreciated that any number of displays can be used and that examples provided here are not exhaustive.

During most of the operational life of the OMPA, the lid will be closed. However, there are times when the user will want to open the lid. The user can open the lid by issuing an open lid command, for example, by depressing a pedal near the bottom of the OMPA, using an application running a device to open the lid, or manually opening the lid at anytime. At step 2635, a determination is made if an open lid command is received. When an open lid command is received, process 2600 can unlock the lid with latch assembly (at step 2640) and deactivate the fan and the heater (at step 2645). The lid may be automatically opened with the lid actuation assembly at step 2650. After a predetermined time has elapsed or in response to a user action, process 2600 can revert back to step 2605.

It should be understood that the steps shown in FIG. 26 are merely illustrative that additional steps may be added, steps may be omitted, and the order of the steps can be rearranged. For example, steps 2640 and 2645 can performed simultaneously.

Figures 27A, 27B:
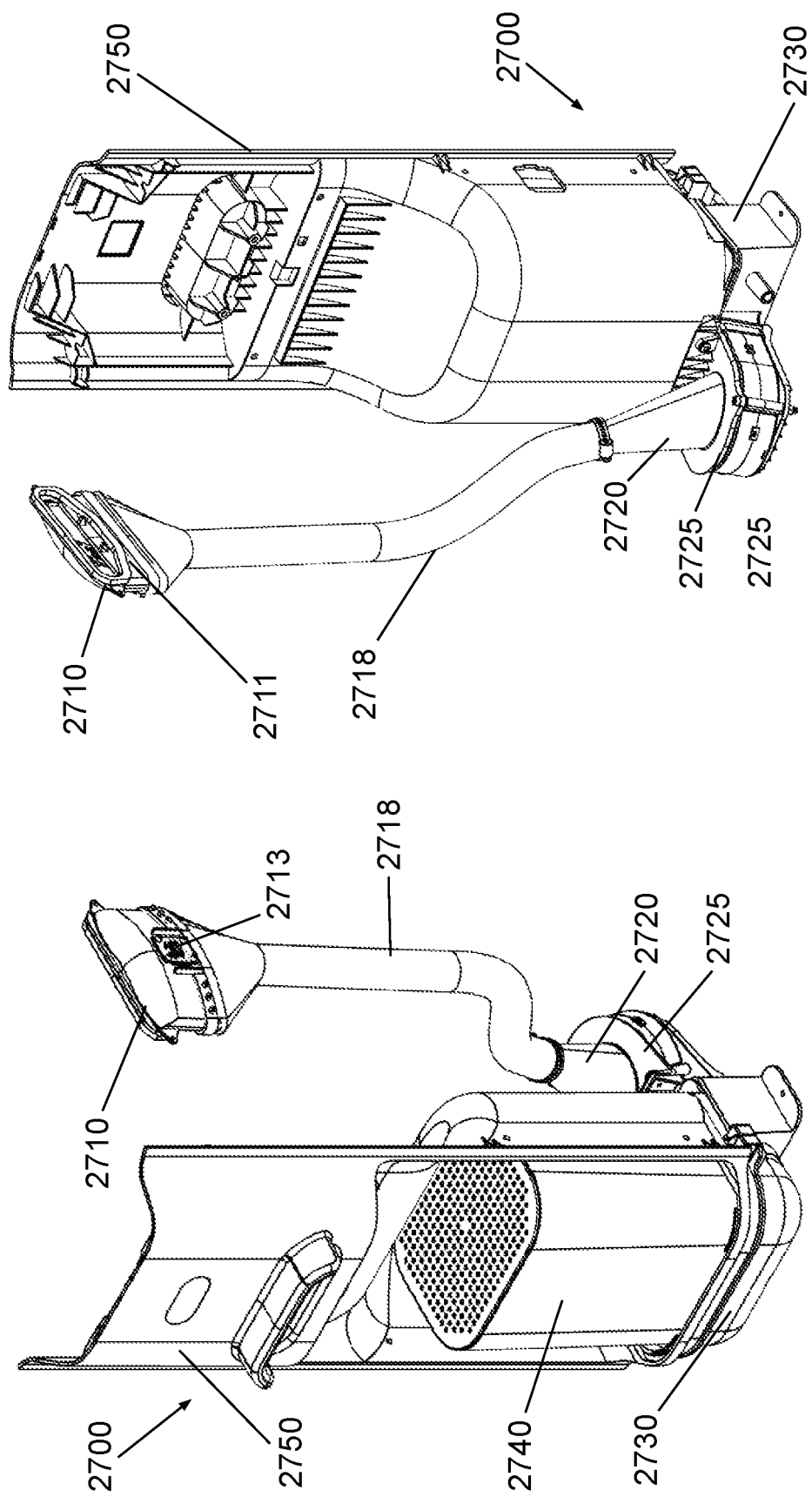
FIGS. 27A-27G show different views of air treatment system without any other components of the OMPA according to various embodiments.
Figure 27D:
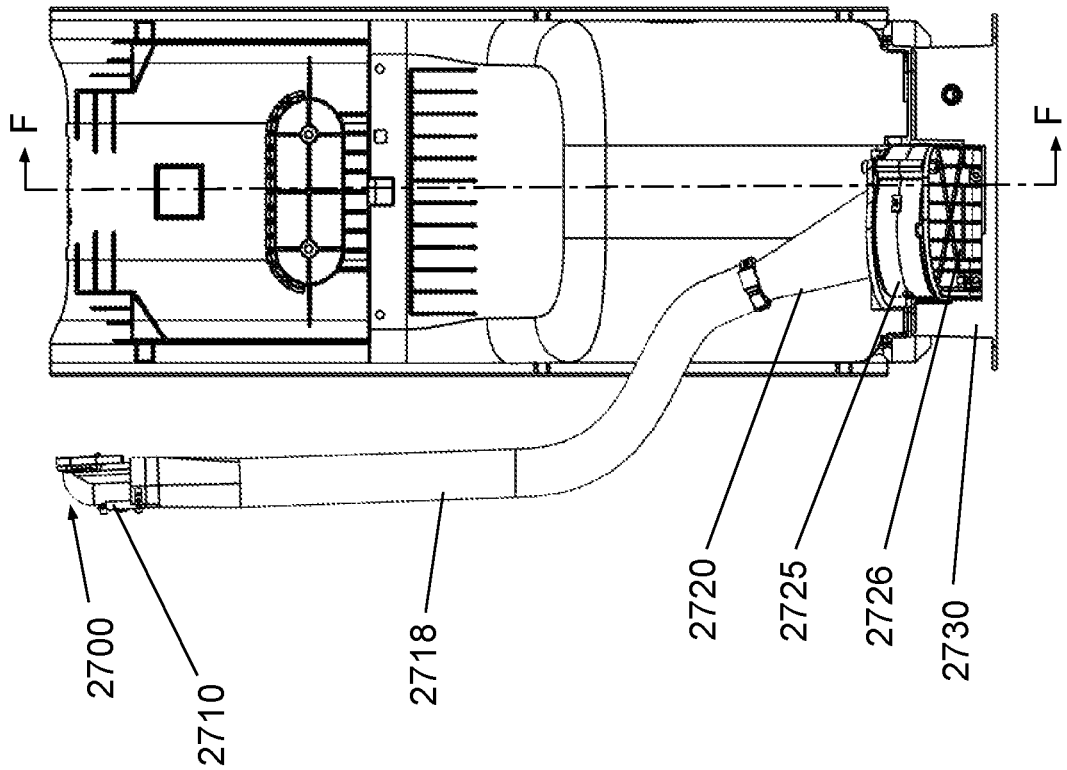
Figure 27C:
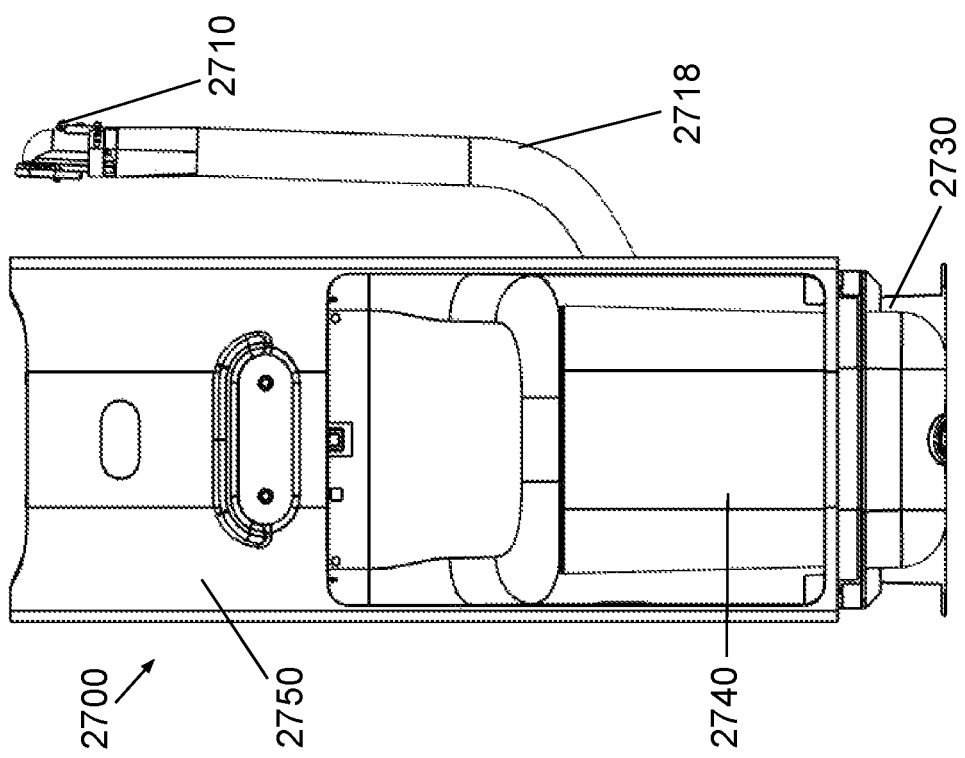
Figure 27F:
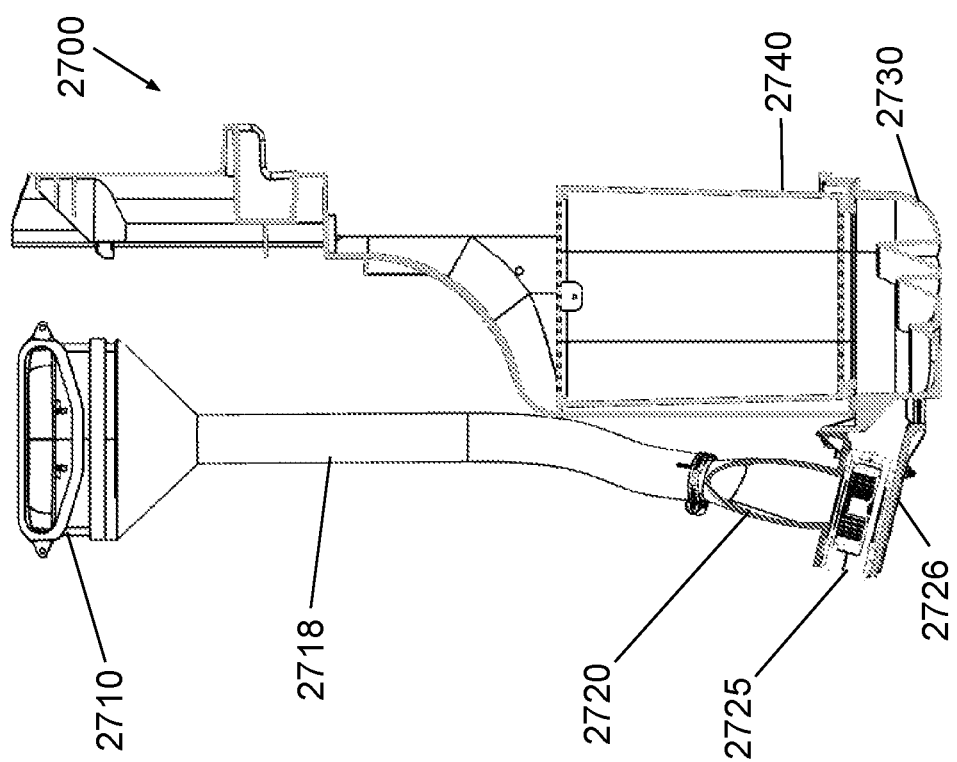
Figure 27E:
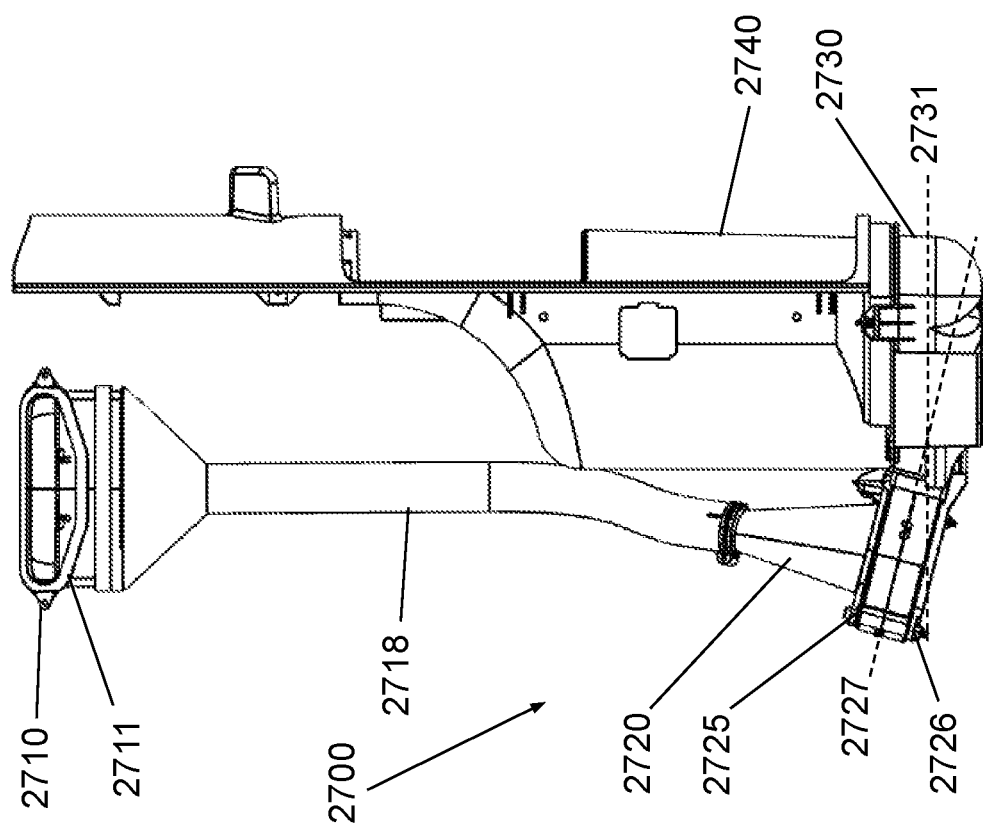
Figure 27G:
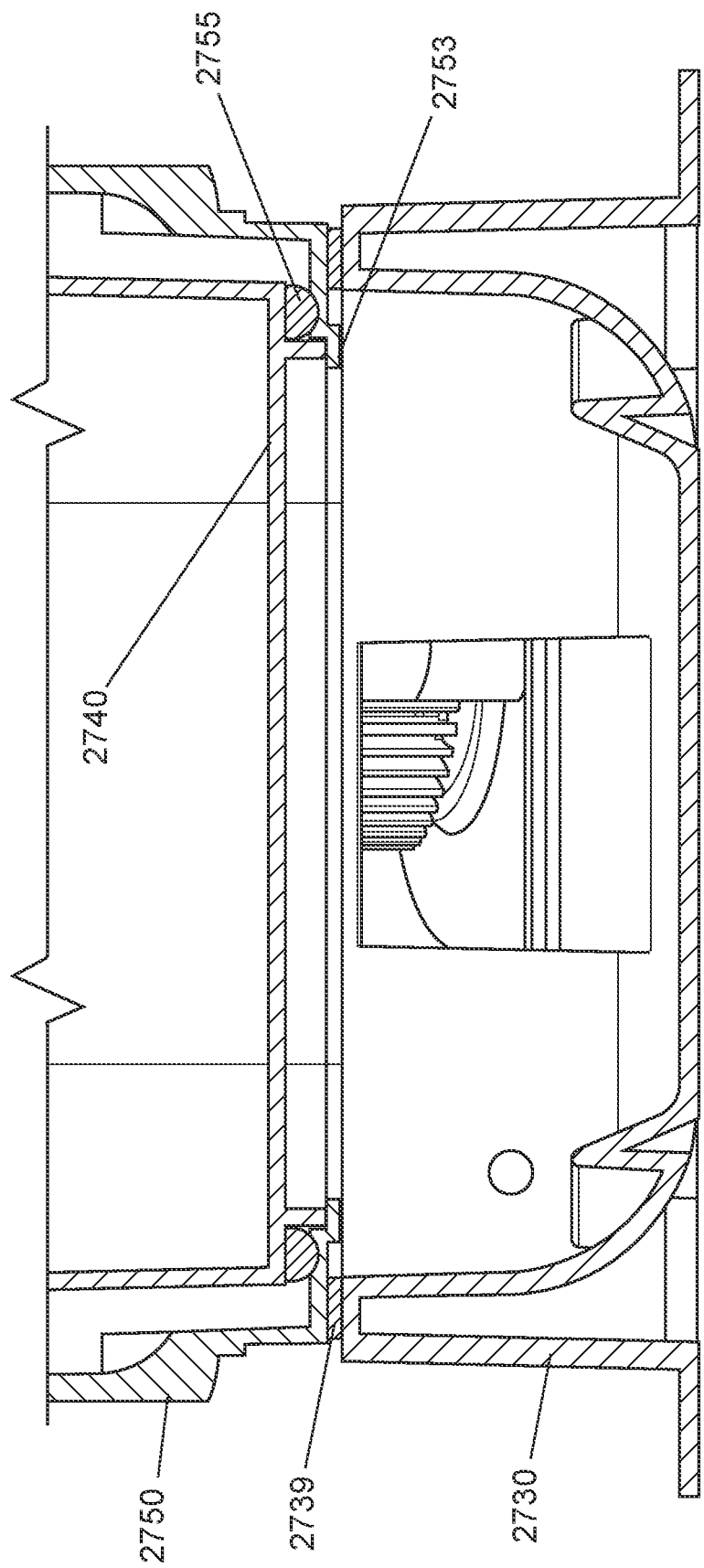

FIGS. 27A-27G show different views of air treatment system (ATS) 2700 without any other components of the OMPA according to various embodiments. In particular, FIG. 27A shows a perspective front view, FIG. 27B shows a perspective back view, FIG. 27C shows a front view, FIG. 27D shows a back view, FIG. 27E shows a side view, and FIG. 27F shows a cross-sectional view taken along line F-F of FIG. 27D, of ATS 2700 according to various embodiments. FIG. 27G shows a blown up cross-sectional view of a manifold, spine member, and media chamber according to an embodiment. Untreated air is pulled from the interior space of the bucket assembly (e.g., bucket assembly 1570) through an inlet port 1540 (of FIG. 15C) existing in bucket interface subassembly 1550 (of FIG. 15C) into exhaust coupler 2710, down through exhaust pipe 2718, into fan coupler 2720, and then into fan 2725, which directs the untreated air into manifold 2730, which redirects the untreated air up through media chamber 2740. The untreated air is treated by media chamber 2740 and the treated air is further directed upwards towards exhaust vents (not shown) and expelled from the OMPA. The airflow path through ATS 2700 starts near the top the bucket assembly and is directed downwards towards the bottom of the OMPA and is then redirected upwards to be expelled out of exhaust ports located at the rear the OMPA. The exhaust ports may be located above media chamber 2040. This up to down and then down to up airflow pattern accommodates the form factor of the OMPA, mitigates potential moisture intrusion into media chamber 2740, enhances airflow distribution through media chamber 2740, and enables user friendly access to remove media chamber 2740 from the OMPA and to install media chamber 2740 into the OMPA. Spine member 2750 can provide structural support for various components of ATS 2700 and the OMPA.

Exhaust coupler 2710 is designed to be coupled to the bucket interface assembly opposite of the inlet port (e.g., port 1540). Gasket 2711 may form an airtight seal between exhaust coupler 2710 and the bucket interface assembly. Untreated air can enter into exhaust coupler 2710 in a horizontal direction and is then redirected in a vertical direction down into exhaust pipe 2718, which is secured to exhaust coupler 2710. Exhaust coupler 2710 can include sensor port 2712, circuit board 2713, a gasket (not shown), and untreated air sensor (not shown). The sensor is secured to circuit board 2713 and is sealed by the gasket so that the sensor can monitor characteristics of the untreated air entering ATS 2700. The sensor can monitor temperature, relatively humidity, and VOCs.

Figure 28B:
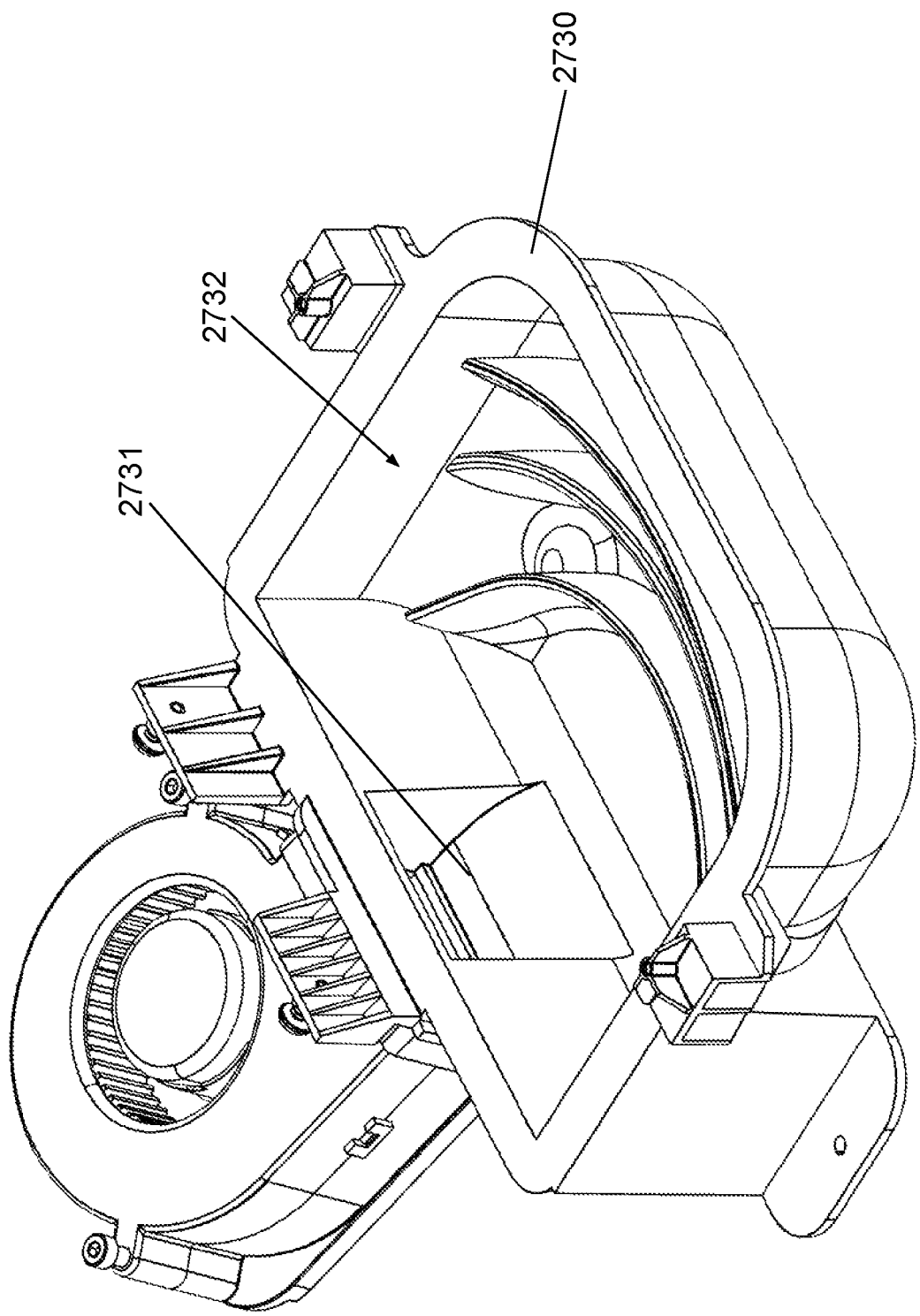

Exhaust pipe 2718 is a conduit that is coupled to fan coupler 2720. Exhaust coupler 2710, exhaust pipe 2718, and fan coupler may be collectively referred to herein as an air duct subassembly. Fan coupler 2720 is secured to fan 2725 and has a cone-like shape that is designed to smooth airflow of the untreated air before it enters the inlet side of fan 2025. A gasket (not shown) may be positioned at the interface of fan coupler 2720 and fan 2725. Fan 2725 can be a centrifugal fan that can be secured to fan support plate 2726. Fan coupler 2720 and fan support plate 2026 can be secured to manifold 2730. Fan 2725 may also be coupled to manifold 2730 via boot member 2728 (shown in FIG. 28A), which provides an airtight seal between fan 2723 and manifold 2730.

Fan 2725 and fan support plate 2726 can be canted at an angle relative to manifold 2730. The canted positioning of fan 2725 and support plate 2726 can serve two functions: providing clearance for the pedal (e.g., pedal 1512) and its associated components and providing a moisture migration path. If any moisture exists in the downward airflow path of ATS 2700, that moisture will migrate into manifold 2730, where it will eventually evaporate. Fan 2725 can be canted at an angle relative to a floor surface or a bottom surface of the OMPA so that water cannot collect in or around fan 2725. For example, referring to FIG. 27E in particular, center axis 2727 of fan 2725 is not parallel to center axis 2731 of manifold 2730. In some embodiments, manifold 2730 may receive moisture or water from one or more other locations within the OMPA. For example, a drain in the bucket interface assembly may be routed to manifold 2730. This way, any moisture that collects at the bottom of the bucket interface assembly can drain into manifold 2730.

Manifold 2730 is coupled to spine member 2750, includes inlet port 2731 (shown in FIGS. 28B, 29A, and 29B) for receiving untreated air from fan 2725, and includes baffle array 2732 for directing untreated air upwards into media chamber 2740. Baffle array 2732 can include any number of baffles (e.g., baffles 2733-2735) that are sized and shaped to promote even distribution of airflow through media chamber 2740. The arrangement and configuration of the baffles comprising the baffle array may vary. Even distribution of airflow through media chamber 2740 can ensure that the media (e.g., activated carbon) contained in media chamber 2740 is evenly worn, used, or deactivated. The media treats the air by adsorbing odor molecules and/or particles existing in the untreated air. As the media treats the air, it eventually saturates and is no longer able to treat the air, at which point media chamber 2740 should be replaced. If the airflow through media chamber 2740 is non-uniform, then portions of the media may expire unevenly.

Figure 29A:
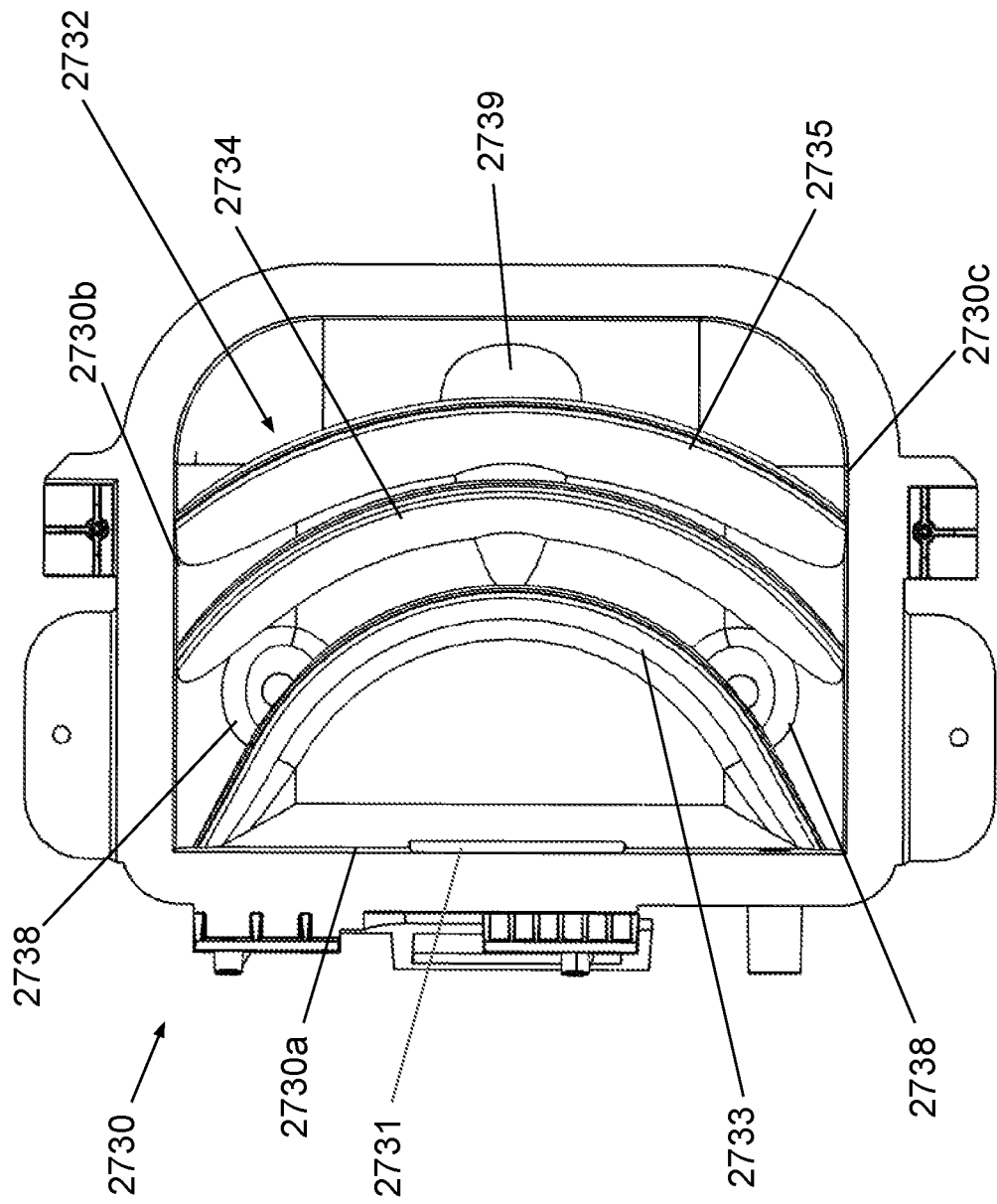
FIG. 29A shows an illustrative top view of a manifold according to an embodiment.
Figure 29B:
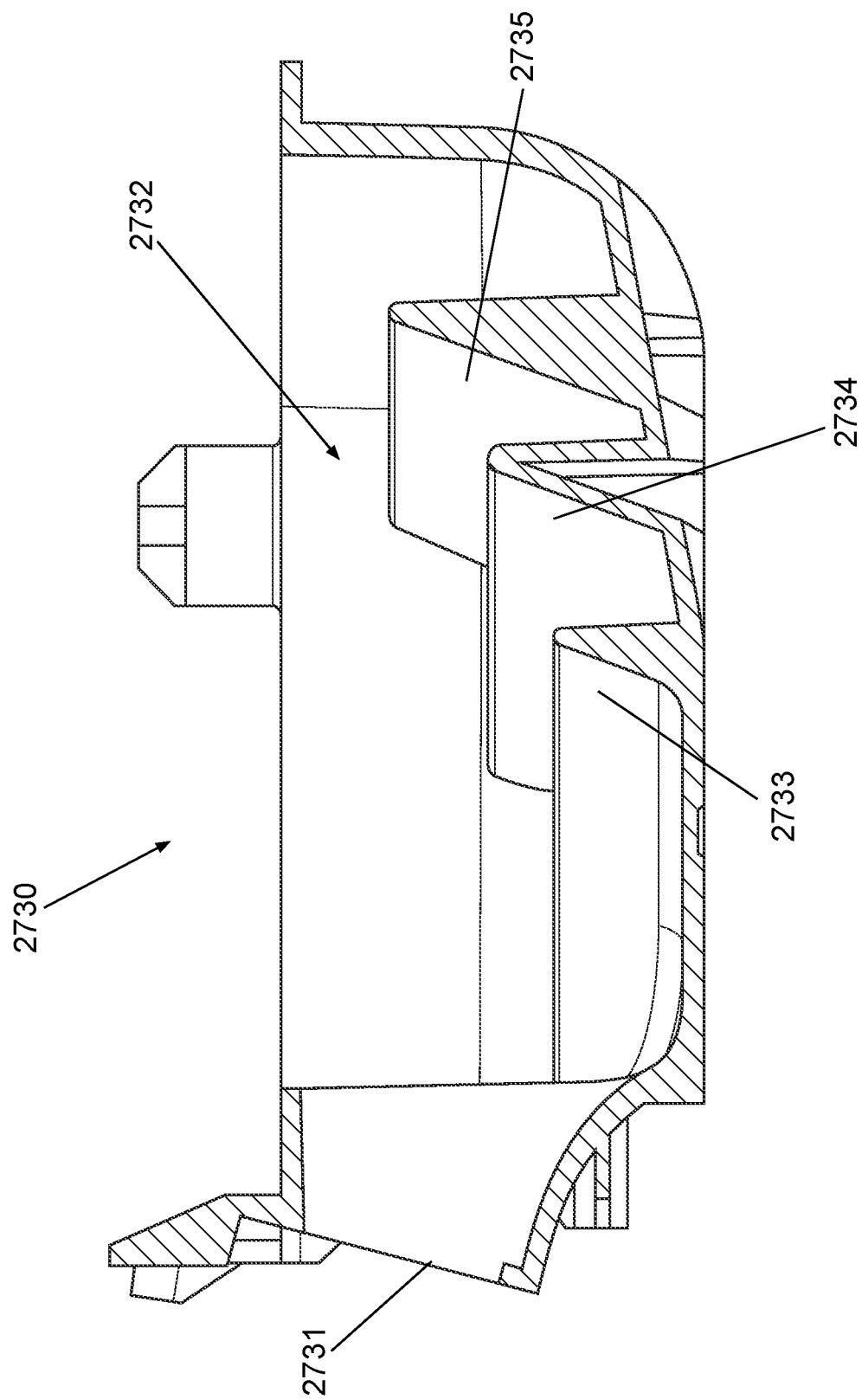
FIG. 29B shows an illustrative cross-sectional view of a manifold according to an embodiment.

Referring to FIGS. 29A and 29B, baffles 2733-2735 are illustrative of a baffle array that can exist within manifold 2730. Each of baffles 2733-2735 has a respective air directing curve profile. The air directing curve profile can include a generic curve shape, a pitch angle or curve, and a height. In some embodiments, the generic curve shape and height of each baffle increases the farther away a particular baffle is from inlet port 2731. The term "generic curve shape" is used to denote that each baffle can exhibit a curved shape that can be represented by a fixed radius or a variable radius. For example, baffles 2733-2735 have respective first, second, and third radii, where the first radius of baffle 2733 is less than the second radius of baffle 2734, which is less than the third radius of baffle 2735. In addition, baffles 2733-2735 have respective first, second, and third heights, where the first height of baffle 2733 is less than the second height of baffle 2734, which is less than the third height of baffle 2735. The height of each baffle may be measured from floor 2737 and the top portion of the baffle. In some embodiments, the height of baffles 2733-2735 may be uniformly staggered in height. The pitch angle or curve refers to the angle, curve, or combination thereof of the portion of the baffle (e.g., the vertical portion) responsible for directing airflow upwards towards media chamber 2740. The pitch angle or curve of each baffle may be the same or different. In addition, the pitch angle for each baffle may be selected to ensure smooth and evenly distributed airflow is achieved through media chamber 2740. One or more of baffles 2733-2735 may interface with an internal sidewall of manifold 2730. Such interfacing further ensures even distribution of airflow. For example, baffle 2733 interfaces with internal wall 2730a, and baffles 2734 and 2735 interface with internal walls 2730b and 2730c.

Manifold 2730 can include integrated air flow domes 2738 and 2739 to further assist in directing air flow towards to media chamber 2740. Air flow dome 2738 is positioned between baffles 2733 and 2734, near the sides of manifold 2750, and can resemble a circular dome shape. Air flow dome 2739 is positioned centrally within manifold 2740 adjacent to baffles 2733-2735 as shown. Air flow dome 2739 may resemble a tear drop shape.

Figure 30A:
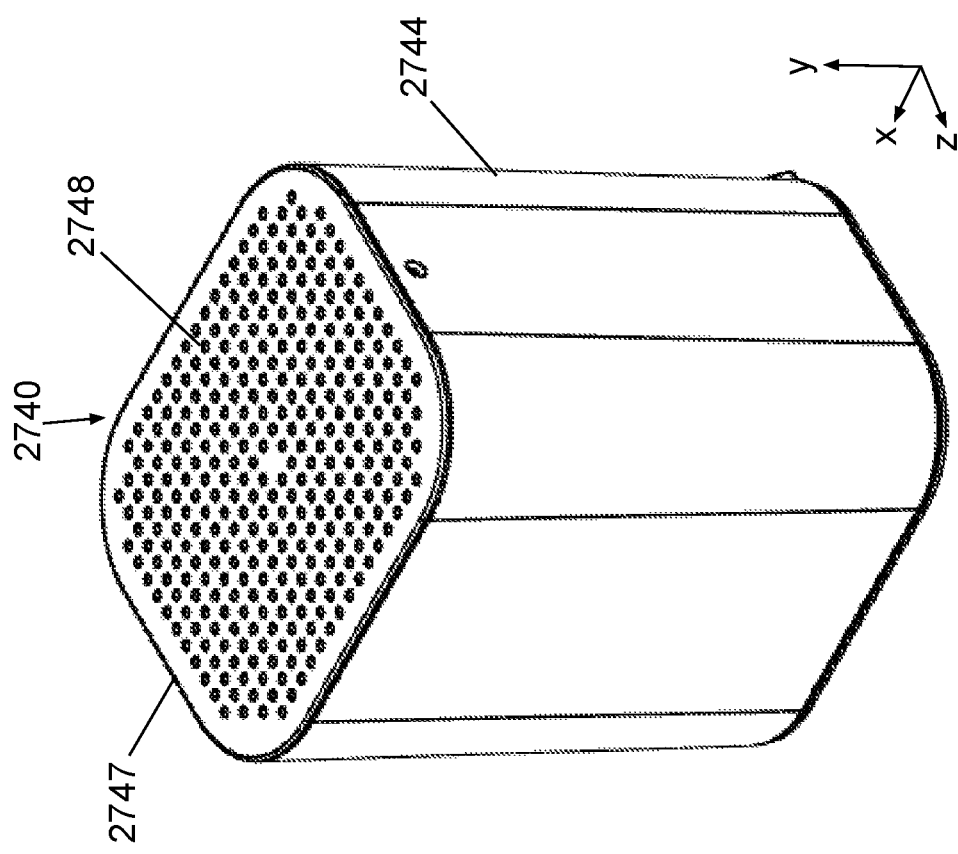
FIGS. 30A and 30B show respective perspective and cross-sectional views of a media chamber according to an embodiment.
Figure 30B:
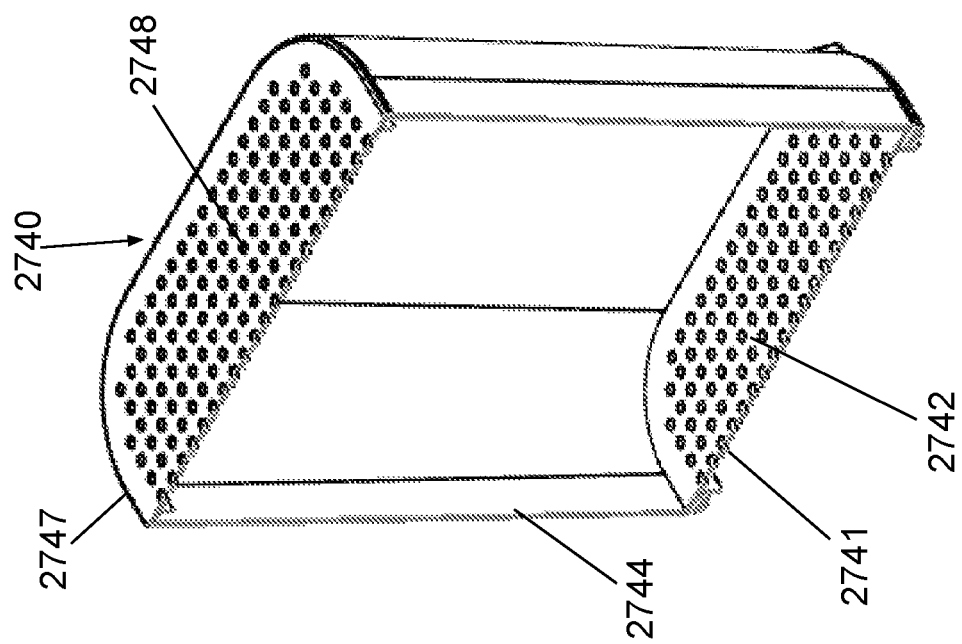

FIGS. 30A and 30B show respective perspective and cross-sectional views of media chamber 2740. Media chamber 2740 can exhibit a rectangular box shape has a Y-axis length that is greater than the X and Z axes lengths. Media chamber 2740 can include bottom cover 2741, vessel 2744, and top cover 2747. Holes 2742 exist in cover 2741 and holes 2748 exist in cover 2747. The sizing of holes 2742 and 2748 is selected to maximize air flow through media chamber 2740 while simultaneously retaining the activated carbon contained therein. In some embodiments, the activated carbon can be coconut derived activated carbon having a mean diameter of 3-5 mm. If the mean diameter of the activated carbon is 3-5 mm, then the diameter of holes 2742 and 2748 can be less than 3 mm.

Spine member 2750 sits on top of and is secured to manifold 2730. Gasket 2739 (shown in FIG. 27G) may exist at the interface between spine member 2750 and manifold 2730 to maintain an airtight seal. Referring now to FIG. 27G and FIGS. 31A-31C, which show respective perspective, front, and side views of spine member 2750. Spine member 2750 has an elongated shape with media chamber retaining region 2752 constructed to accommodate media chamber 2740. Retaining region 2752 can include recessed lip portion 2753 that surrounds hole 2754. A gasket 2755 may reside adjacent to lip portion 2753 and forms an airtight seal with media chamber 2740 when media chamber 2750 is inserted into retaining region 2752. Media chamber 2740 may reside on lip portion 2753, sit above hole 2754 (and manifold 2730), and compress gasket 2755. ATS 2700 maintains an airtight seal along the entire untreated airflow path, including the coupling of exhaust coupler 2710 to port 1540, the coupling of fan coupler 2720 to fan 2725, the coupling of fan 2725 to manifold 2730, the coupling of manifold 2730 to spine member 2750, and the coupling of media chamber 2740 to spine member 2750. The airtight seal is broken at cover 2447 of media chamber 2740.

A user may be able to access spine member 2750 so that he or she can replace a used media chamber 2740 with a fresh media chamber by removing a cover (e.g., cover 1590). This cover can include two exhaust ports (e.g., exhaust ports 1591 and 1592) for enabling treated air to exit the OMPA. The cover can interact with latch mechanism 2751, which may hold the cover in place. Latch mechanism 2751 may be a push button latch that releasably couples the cover.

Spine member 2750 can also be secured to the bucket interface assembly and provides structural support for the OMPA. Moreover, spine member 2750 can include integrated carry handle 2759 that enables a user to lift and move the OMPA. Handle 2759 is accessible from outside of OMPA without requiring the user to remove anything.

Retaining region 2752 provides space for media chamber 2740 to reside and is constructed with features designed to channel treated air to the exhaust ports. Notably, internal curved surface 2757 may facilitate flow of treated air out of the OMPA. Untreated air enters the bottom of media chamber 2740 and travels up through media chamber 2740, which treats the air, and the treated air exits out of the top of media chamber 2740. The treated air can continue traveling along spine member 2750 until it exits out of exhaust ports (exhaust ports 1591 and 1592 in FIG. 15D). The exhaust ports are positioned such that the treated air is exhausted primarily along the X-axis (i.e., laterally) with respect to the OMPA. This way, if the OMPA is placed adjacent to a wall, the lateral expulsion of treated air flows along a width of the OMPA and not into the wall.

A treated air sensor 2758 can be secured to spine member 2750 to monitor characteristics of treated air exiting media chamber 2740. Sensor 2758 may monitor air temperature, relative humidity, and volatile organic compounds. In some embodiments, sensor 2758 may be selected to monitor a specific set of volatile organic compounds and not all compounds commonly associated with odor. Sensor 2758 may be used to check the quality of the treated air to ensure that the egressing air satisfies air quality criteria. When the air quality does not satisfy the air quality criteria, the user may be notified (e.g., via smart phone alert or display on the lid assembly) that the media chamber should be replaced.

In some embodiments, an OMPA processor or controller may control the fan speed of fan 2725 based on a number of different factors, including data obtained from the untreated air sensor associated with exhaust coupler 2710, data obtained from the treated air sensor associated with spine member 2750, or a combination thereof.

FIG. 32 shows illustrative process 3200 for operating an air treatment system according to an embodiment. Process 3200 can be implemented in an OMPA, and in particular, implemented in an air treatment system according to embodiments discussed herein. Starting with step 3210, untreated air can be pulled via a fan downward through an airflow duct assembly from a bucket assembly operative to process organic matter. If desire, the untreated air can be monitored by a sensor associated with the airflow duct assembly. At step 3220, the untreated air can be pushed, via the fan, into a manifold (e.g., manifold 2730). At step 3230, the pushed untreated air is redirected, by the manifold, upward through a media chamber. The manifold can evenly distribute air flow of the pushed untreated air through the media chamber to maximize even wearing of the activated carbon contained in the media chamber. At step 3240, the media chamber converts the pushed untreated air into treated air. A treated air sensor can monitor the treated air to determine various characteristics of the treated air. At step 3250, the treated air can be exhausted out of at least one outlet port.

It should be understood that the steps shown in FIG. 32 are merely illustrative that additional steps may be added, steps may be omitted, and the order of the steps can be rearranged.

FIG. 33 shows illustrative process 3300 for operating an OMPA having a bucket assembly, a lid assembly, and an air treatment system according to an embodiment. Starting with step 3310, ambient air is pulled into the lid assembly via a first fan contained in the lid assembly and then through an opening into the bucket assembly. At step 3320, untreated air is pulled into the air treatment system via a second fan from the bucket assembly. At step 3330, the untreated air is pushed through the air treatment chamber, wherein the air treatment chamber converts the untreated air to treated air. At step 3340, the treated air is exhausted from the OMPA. At step 3350, process 3300 controls the operation of the bucket assembly, the first fan, and the second fan. At step 3360, process 3300 can control an ambient air intake volume with the first fan and a treated air exhaust volume with the second fan, wherein the treated air exhaust volume is greater than or equal to the ambient air intake volume. This ensures that the air treatment system is in control of the volume of air being moved through the OMPA.

It should be understood that the steps shown in FIG. 33 are merely illustrative that additional steps may be added, steps may be omitted, and the order of the steps can be rearranged.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes but is not limited to portable or fixed storage devices, optical storage devices, wireless channels, and/or various other storage mediums capable of storing that contain or carry instruction(s) and/or data.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

The following provides a listing of various claim sets focusing on OMPAs and the use thereof. The claims, including the incorporated disclosures, cover various embodiments or configurations, methods, algorithms, and structures related to the embodiments defined herein. Features may be mixed between the various claim sets. Thus, various concepts covered in these claims can be integrated into different embodiments. The statement sets below are organized into different concepts. Each statement can be combined with any other statement. References to "any previous statement" expressly extend beyond just the particular subset of statements but refers to any of the statements below.

Statement 1. An organic matter processing apparatus (OMPA) having X, Y, and Z axes, the OMPA comprising:
    a housing comprising an opening and a support structure; and a lid assembly coupled to the support structure and positioned over the opening when in a closed position, the lid assembly comprising:
  a lid portion operative to rotate about a pivot axis to transition between an open position and the closed position, the lid portion comprising:
    a lid support plate comprising at least one inlet port and an outlet port;
    a fan secured to the lid support plate; and
    a manifold coupled to the lid support plate and the fan, wherein the fan is operative to pull in ambient air through the at least one inlet port and supply forced air that is directed through the manifold out of the outlet port; and
  a lid actuator assembly coupled to the lid portion and to the support structure, the lid actuator assembly operative to open and close the lid portion by enabling the lid portion to rotate about the pivot axis.

Statement 2. The OMPA of any previous statement, wherein the lid actuator assembly further comprises:
  a lid hinge plate secured to the lid portion, the lid hinge plate comprising first and second hinge barrels;
  a first arm member secured to the lid hinge plate;
  a mounting plate secured to the support member, the mounting plate comprising first and second pivot barrels, wherein the pivot axis is defined by the first and second pivot barrels;
  a first rod member that interfaces with the first hinge barrel and the first pivot barrel;
  a second rod member that interfaces with the second hinge barrel and the second pivot barrel, wherein the first and second rod members enable the lid hinge plate to rotate about the pivot axis;
  a motor secured to the mounting plate;
  a spring loaded member coupled to the motor; and
  a second arm coupled to the spring loaded member and the first arm,
  wherein when the motor rotates in a first direction, the lid portion rotates to the open position via rotation of the spring loaded member and translation of the first and second arms, and wherein when the motor rotates in a second direction, the lid portion rotates to the closed position via rotation of the spring loaded member and translation of the first and second arms.

Statement 3. The OMPA of any previous statement, wherein the spring loaded member assists the motor in rapidly rotating the lid portion to the open position, and wherein the spring loaded member further assist a user in manually opening the lid portion to the open position.

Statement 4. The OMPA of any previous statement, wherein the lid actuator assembly further comprises:
  a cover secured between the first and second hinge barrels, the cover comprising a cable routing port;
  wherein the OMPA further comprises a cable comprising power and signal conductors, and wherein the cable is routed through the cable routing port into the lid portion.

Statement 5. The OMPA of any previous statement, further comprising:
  a latch assembly coupled to the lid portion and the first support structure, the latch assembly operative to lock and unlock the lid portion.

Statement 6. The OMPA of any previous statement, wherein the latch assembly further comprises:
  a latch secured to the lid portion;
  a solenoid secured to the support structure;
  a latch interface movably coupled to the support structure and connected to the solenoid, wherein the solenoid pulls the latch interface into contact with the latch when activated; and
  a spring coupled between the solenoid and the latch interface, wherein the spring pushes the latch interface out of contact with the latch when the solenoid is not activated, wherein when the lid portion is in the closed portion, the lid portion is locked when the solenoid is activated, and the lid portion is unlocked when the solenoid is not activated.

Statement 7. The OMPA of any previous statement, wherein the latch assembly further comprises:
  a switch mounted to the support structure and is mechanically actuated by the latch interface when the latch interface is in contact with the latch to lock the lid portion.

Statement 8. The OMPA of any previous statement, wherein the fan and manifold are arranged horizontally adjacent to each other in an X-Z plane such that the manifold is positioned at least in part over the outlet port and the fan is positioned distally away from a center axis of the outlet port in the X-Z plane, wherein the center axis perpendicular to the X-Z plane.

Statement 9. The OMPA of any previous statement, wherein the lid portion further comprises:
  a heater mounted to the lid support plate within confines of the manifold, wherein the forced air exiting the fan is directed through or adjacent to the heater.

Statement 10. The OMPA of any previous statement, wherein the manifold comprises a sensor port, the lid portion further comprising:
  a circuit board comprising a sensor positioned in the sensor port to monitor characteristics of air in the manifold.

Statement 11. The OMPA of any previous statement, wherein the lid portion further comprises:
  a button;
  a dead fronted display array; and
  a cosmetic member positioned over the dead fronted display array and secured to the lid support member, the cosmetic member comprising a button cutout for the button and a light transmissible property that allows light being emitted by the dead fronted display array to pass through cosmetic member.

Statement 12. The OMPA of any previous statement, wherein the lid portion comprises:
  a gasket secured to the lid support member and operative to seal against a lip portion of the support structure when the lid portion is in the closed position.

Statement 13. A method for operating a lid assembly of an organic matter processing apparatus (OMPA), the method, implemented by the lid assembly, comprising:
  in a closed lid configuration:
    operating a fan to pull in ambient air via at least one inlet port into the fan and to supply forced air into a manifold, the manifold coupled to the fan and to a lid support member comprising an outlet port such that a forced airflow path exists between the fan and the outlet port, wherein the outlet port is positioned above an organic matter processing chamber of the OMPA;
    heating the forced air with a heater contained within the manifold, wherein the heated forced air is expelled through the outlet port; and
    monitoring, with a sensor, the forced air within the manifold.

Statement 14. The OMPA of any previous statement, further comprising:
opening and closing the lid assembly with a lid actuation assembly that electromechanically opens and closes the lid assembly.

Statement 15. The OMPA of any previous statement, wherein the lid actuation assembly is operative to fully open the lid assembly in less than 0.5 seconds in response to a lid open command.
wherein the lid open command is executed in response to a pedal depression event.

Statement 16. The OMPA of any previous statement, wherein said opening and closing is performed by a user who manually opens and closes the lid assembly with assistance of a spring-loaded member, wherein the spring-loaded member is part of the lid actuation assembly.

Statement 17. The OMPA of any previous statement, further comprising:
ceasing operation of the heater while the fan continues to supply forced air to the outlet port.

Statement 18. The OMPA of any previous statement, further comprising:
controlling display states of a plurality of dead fronted display icons based on an operational state of the OMPA.

Statement 19. The OMPA of any previous statement, further comprising:
locking the lid assembly in a locked configuration; and
unlocking the lid assembly in an unlocked configuration.

Statement 20. The OMPA of any previous statement, further comprising:
using a latch sensor to detect whether the lid assembly is locked;
using at least one magnetic sensor to detect whether the lid assembly is closed; and
preventing the OMPA from executing an organic processing function when the latch sensor detects that the lid assembly is unlocked or when the at least one magnetic sensor detects that the lid assembly is open.

Statement 21. An organic matter processing apparatus (OMPA), comprising:
a housing comprising an opening, a support structure, and bucket assembly for processing organic matter; and
a lid assembly coupled to the support structure and positioned over the opening when in a closed position, the lid assembly comprising:
a lid support plate comprising at least one inlet port and an outlet port;
a fan secured to the lid support plate; and
a manifold coupled to the lid support plate and the fan, wherein the fan is operative to pull in ambient air through the at least one inlet port and supply forced air that is directed through the manifold and the outlet port into the bucket assembly; and
a cover member placed above the fan and manifold and secured to the lid support plate, wherein the lid support plate, fan, manifold, and cover member collectively rotate about a pivot axis when the lid assembly is opened and closed.

Statement 22. The OMPA of any previous statement, wherein the lid assembly further comprises a dead fronted display array secured between the cover member and the lid support member, where the cover member comprises a light transmission property that enables light being emitted by the dead fronted display to pass through the cover member.

Statement 23. The OMPA of any previous statement, wherein the manifold covers the outlet port and extends laterally along a plane that is perpendicular to a center axis of the outlet port for a fixed distance, and wherein the fan is coupled to the manifold at a distal end of the fixed distance.

Statement 24. The OMPA of any previous statement, wherein the lid assembly further comprises a heater secured within the manifold and adjacent to the distal end of the fixed distance.

Statement 25. The OMPA of any previous statement, wherein the lid assembly further comprises a lid actuator assembly operative to automatically open and close the lid assembly.

Statement 26. The OMPA of any previous statement, wherein the lid assembly further comprises a latch assembly operative to lock and unlock the lid assembly.

Statement 27. An organic matter processing apparatus (OMPA), comprising:
a bucket assembly for processing organic matter;
a bucket interface assembly constructed to receive the bucket assembly, the bucket interface assembly comprising a port; and
an air treatment system coupled to receive untreated air via the port, the air treatment system comprising:
an airflow duct assembly coupled to the port;
a fan coupled to the airflow duct assembly and operative to draw in untreated air from the bucket assembly via the port and the airflow duct assembly;
a manifold coupled to the fan and constructed to redirect untreated air through a media chamber positioned above the manifold, wherein the media chamber converts untreated air to treated air; and
a spine member coupled to the manifold, the spine member comprising:
a media chamber retaining region constructed to interface with the media chamber when the media chamber is inserted into and placed within the spine member; and
an exhaust region fluidically coupled to receive treated air from the media chamber and fluidically coupled to at least one outlet port to exhaust the received treated air out of the OMPA.

Statement 28. The OMPA of any previous statement, wherein the airflow duct assembly comprises:
an exhaust coupler secured to the port;
an exhaust pipe secured to the exhaust coupler; and
a fan coupler secured to the exhaust pipe and to the fan;

Statement 29. The OMPA of any previous statement, wherein the exhaust coupler comprises:
a sensor port;
a circuit board;
a gasket coupled to the circuit board and to a periphery of the sensor port; and
a sensor secured to the circuit board and surrounded by the gasket, the sensor operative to monitor characteristics of the untreated air entering the air treatment system.

Statement 30. The OMPA of any previous statement, wherein the air treatment system is operative to:
pull untreated air downward through the airflow duct assembly via the fan;
push the untreated air, via the fan, into the manifold, wherein the manifold redirects the pushed untreated air upward through the media chamber to convert the pushed untreated air into the treated air; and
exhaust the treated air out of the at least one outlet port.

Statement 31. The OMPA of any previous statement, wherein the manifold comprises an inlet port and a baffle array constructed to redirect untreated air through the media chamber.

Statement 32. The OMPA of any previous statement, wherein the baffle array comprises a plurality of baffles, wherein each baffle of the plurality of baffles comprises a curved shape and a height, and wherein the curved shape and the height of each baffle are selected to evenly distribute air flow of the redirected untreated air through the media chamber.

Statement 33. The OMPA of any previous statement, wherein the manifold further comprises at least one air dome constructed to redirect untreated air through the media chamber.

Statement 34. The OMPA of any previous statement, wherein the fan is canted relative to the manifold.

Statement 35. The OMPA of any previous statement, wherein the manifold is a repository for any moisture existing in the airflow duct assembly, the fan, and the bucket interface assembly.

Statement 36. The OMPA of any previous statement, wherein the media chamber comprises activated carbon.

Statement 37. The OMPA of any previous statement, wherein the media chamber is user removable from and user installable into the OMPA.

Statement 38. A method for operating an air treatment system of an organic matter processing apparatus (OMPA), the method, implemented by the air treatment system, comprising:
    pulling, via a fan, untreated air downward through an airflow duct assembly from a bucket assembly operative to process organic matter;
    pushing the untreated air, via the fan, into a manifold;
    redirecting, with the manifold, the pushed untreated air upward through a media chamber;
    converting, with the media chamber, the pushed untreated air into treated air; and
    exhausting the treated air out of at least one outlet port.

Statement 39. The OMPA of any previous statement, further comprising sensing a plurality of characteristics of untreated air being pulled into the airflow duct assembly with a first sensor.

Statement 40. The OMPA of any previous statement 40, wherein the plurality of characteristics comprises temperature, relative humidity, and volatile organic compounds.

Statement 41. The OMPA of any previous statement, further comprising adjusting a speed of the fan based on the sensing.

Statement 42. The OMPA of any previous statement, further comprising alerting a user that the media chamber is in a condition to be replaced.

Statement 43. The OMPA of any previous statement, further comprising sensing a plurality of characteristics of treated air exiting the media chamber with a second sensor.

Statement 44. The OMPA of any previous statement, wherein the manifold comprises a baffle array constructed to evenly distribute air flow of the pushed untreated air through the media chamber.

Statement 45. The OMPA of any previous statement, further comprising evenly wearing activated carbon contained within the media chamber.

Statement 46. An organic matter processing apparatus (OMPA), comprising:
    a bucket assembly for processing organic matter;
    an air treatment system coupled to receive untreated air from the bucket assembly, the air treatment system comprising:
        an airflow duct assembly comprising an exhaust coupler secured adjacent to the bucket assembly;
        a fan coupled to the airflow duct assembly and operative to pull untreated air down from the bucket assembly and to push the untreated air into a manifold; and
        wherein the manifold is coupled to the fan and is constructed to redirect the pushed untreated air upwards through a manifold exit port and into an air treatment chamber positioned above the manifold exit port, wherein the air treatment chamber converts untreated air to treated air; and
    at least one exhaust port positioned above the air treatment chamber that provides egress for the treated air out of the OMPA.

Statement 46. The OMPA of any previous statement, wherein the air treatment chamber comprises a media chamber comprising activated carbon.

Statement 47. The OMPA of any previous statement, wherein the manifold comprises:
    an inlet port;
    a baffle array; and
    at least one air dome, wherein the baffle array and the at least one air dome are constructed to evenly distribute air flow of the redirected untreated air through the air treatment chamber.

Statement 48. The OMPA of any previous statement, wherein the air treatment system further comprises a first sensor for monitoring characteristics of the untreated air.

Statement 49. The OMPA of any previous statement, wherein the air treatment system further comprises a second sensor for monitoring characteristics of the treated air.

Statement 50. An organic matter processing apparatus (OMPA) having X, Y, and Z axes, the OMPA comprising:
    a housing comprising an opening, a support structure, and a bucket assembly for processing organic matter;
    a lid assembly coupled to the support structure and positioned over the opening when in a closed position and operative to electromechanically rotate about a pivot axis to transition between an open position and the closed position, the lid assembly comprising a first fan operative to pull ambient air into the lid assembly and push the ambient air through the opening into the bucket assembly;
    an air treatment system coupled to receive untreated air from the bucket assembly, the air treatment system comprising an air treatment chamber and a second fan, wherein the second fan is operative to push the untreated air through the air treatment chamber that converts the untreated air to treated air, and wherein the treated air is exhausted from the OMPA; and
    a controller operative to control the first fan and the second fan.

Statement 51. The OMPA of any previous statement, wherein in a two-fan mode of operation, the controller controls an ambient air intake volume with the first fan and a treated air exhaust volume with the second fan, wherein the treated air exhaust volume is greater than or equal to the ambient air intake volume.

Statement 52. The OMPA of any previous statement, wherein the bucket assembly is actively processing organic matter during the two-fan mode of operation.

Statement 53. The OMPA of any previous statement, wherein the lid assembly further comprises a heater operative to heat the ambient air being pushed through the opening into the bucket assembly, wherein during the two-fan mode, the controller turns the heater ON.

Statement 54. The OMPA of any previous statement, wherein in a single-fan mode of operation, the controller turns the first fan off and controls a treated air exhaust volume with the second fan.

Statement 55. The OMPA of any previous statement, wherein the lid assembly comprises a first sensor operative to monitor ambient air being pushed into the bucket assembly;
  wherein the air treatment system comprises:
    a second sensor operative to monitor untreated air being received from the bucket assembly; and
    a third sensor operative to monitor treated air being exhausted out of the OMPA; and
  wherein the controller manages operation of the bucket assembly, the first fan, and the second fan based on data collected by the first sensor, the second sensor, and the third sensor.

Statement 56. The OMPA of any previous statement, wherein the lid assembly comprises:
  a lid support plate comprising at least one inlet port and an outlet port;
  the first fan secured to the lid support plate; and
  a manifold coupled to the lid support plate and the first fan, wherein the fan is operative to pull in ambient air through the at least one inlet port and supply forced air that is directed through the manifold and the outlet port into the bucket assembly; and
  a cover member placed above the fan and manifold and secured to the lid support plate, wherein the lid support plate, first fan, manifold, and cover member collectively rotate about a pivot axis when the lid assembly is opened and closed.

Statement 57. The OMPA of any previous statement, wherein the air treatment system comprises:
  an airflow duct assembly comprising an exhaust coupler secured adjacent to the bucket assembly;
  the second fan coupled to the airflow duct assembly and operative to pull untreated air down from the bucket assembly and to push the untreated air into a manifold; and
  wherein the manifold is coupled to the second fan and is constructed to redirect the pushed untreated air upwards through a manifold exit port and into an air treatment chamber positioned above the manifold exit port, wherein the air treatment chamber converts the untreated air to the treated air; and
  at least one exhaust port positioned adjacent to the air treatment chamber to provide egress for the treated air out of the OMPA.

Statement 58. The OMPA of any previous statement, wherein the manifold comprises:
  an inlet port;
  a baffle array; and
  at least one air dome, wherein the baffle array and the at least one air dome are constructed to evenly distribute air flow of the redirected untreated air through the air treatment chamber.

Statement 59. The OMPA of any previous statement, wherein the air treatment chamber comprises a media chamber comprising activated carbon.

Statement 60. A method for operating an organic matter processing apparatus (OMPA) comprising a bucket assembly, a lid assembly, and an air treatment system, the method comprising:
  pulling ambient air into the lid assembly via a first fan contained in the lid assembly and pushing the ambient air through an opening into the bucket assembly;
  pulling, via a second fan, untreated air into the air treatment system from the bucket assembly;
  pushing the untreated air through the air treatment chamber, wherein the air treatment chamber converts the untreated air to treated air;
  exhausting the treated air from the OMPA; and
  controlling operation of the bucket assembly, the first fan, and the second fan.

Statement 61. The OMPA of any previous statement, further controlling an ambient air intake volume with the first fan and a treated air exhaust volume with the second fan, wherein the treated air exhaust volume is greater than or equal to the ambient air intake volume.

Statement 62. The OMPA of any previous statement, further comprising actively processing organic matter with the bucket assembly while the first fan and the second fan are both ON.

Statement 63. The OMPA of any previous statement, further comprising heating the ambient air being pushed through the opening into the bucket assembly.

Statement 64. The OMPA of any previous statement, further comprising ceasing operation of the first fan when the bucket assembly is not processing organic matter.

Statement 65. The OMPA of any previous statement, further comprising:
  monitoring, with a first sensor, ambient air being pushed into the bucket assembly;
  monitoring, with a second sensor, untreated air being pulled in from the bucket assembly;
  monitoring, with a third sensor, treated air being exhausted out of the OMPA; and
  controlling operation of the bucket assembly, the first fan, and the second fan based on data collected by the first sensor, the second sensor, and the third sensor.

Statement 66. The OMPA of any previous statement, further comprising:
  pushing the untreated air, via the second fan, into a manifold; and
  redirecting, with the manifold, the pushed untreated air upward through the air treatment chamber.

Statement 67. The OMPA of any previous statement, further comprising opening and closing the lid assembly with a lid actuation assembly that electromechanically opens and closes the lid assembly.

Statement 68. The OMPA of any previous statement, further comprising:
  locking the lid assembly in a locked configuration; and
  unlocking the lid assembly in an unlocked configuration.

Statement 69. The OMPA of any previous statement, further comprising displaying status information on the lid assembly.

What is claimed is:

1. An organic matter processing apparatus (OMPA) having X, Y, and Z axes, the OMPA comprising:
  a housing comprising an opening and a support structure; and
  a lid assembly coupled to the support structure and positioned over the opening when in a closed position, the lid assembly comprising:
    a lid portion operative to rotate about a pivot axis to transition between an open position and the closed position, the lid portion comprising:
      a lid support plate comprising at least one inlet port and an outlet port;

a fan secured to the lid support plate; and
a manifold coupled to the lid support plate and the fan, wherein the fan is operative to pull in ambient air through the at least one inlet port and supply forced air that is directed through the manifold out of the outlet port; and
a lid actuator assembly coupled to the lid portion and to the support structure, the lid actuator assembly operative to open and close the lid portion by enabling the lid portion to rotate about the pivot axis.

2. The OMPA of claim 1, wherein the lid actuator assembly further comprises:
a lid hinge plate secured to the lid portion, the lid hinge plate comprising first and second hinge barrels;
a first arm member secured to the lid hinge plate;
a mounting plate secured to the support member, the mounting plate comprising first and second pivot barrels, wherein the pivot axis is defined by the first and second pivot barrels;
a first rod member that interfaces with the first hinge barrel and the first pivot barrel;
a second rod member that interfaces with the second hinge barrel and the second pivot barrel, wherein the first and second rod members enable the lid hinge plate to rotate about the pivot axis;
a motor secured to the mounting plate;
a spring loaded member coupled to the motor; and
a second arm coupled to the spring loaded member and the first arm,
wherein when the motor rotates in a first direction, the lid portion rotates to the open position via rotation of the spring loaded member and translation of the first and second arms, and wherein when the motor rotates in a second direction, the lid portion rotates to the closed position via rotation of the spring loaded member and translation of the first and second arms.

3. The OMPA of claim 2, wherein the spring loaded member assists the motor in rapidly rotating the lid portion to the open position, and wherein the spring loaded member further assist a user in manually opening the lid portion to the open position.

4. The OMPA of claim 2, wherein the lid actuator assembly further comprises:
a cover secured between the first and second hinge barrels, the cover comprising a cable routing port;
wherein the OMPA further comprises a cable comprising power and signal conductors, and wherein the cable is routed through the cable routing port into the lid portion.

5. The OMPA of claim 1, further comprising:
a latch assembly coupled to the lid portion and the first support structure, the latch assembly operative to lock and unlock the lid portion.

6. The OMPA of claim 5, wherein the latch assembly further comprises:
a latch secured to the lid portion;
a solenoid secured to the support structure;
a latch interface movably coupled to the support structure and connected to the solenoid, wherein the solenoid pulls the latch interface into contact with the latch when activated; and
a spring coupled between the solenoid and the latch interface, wherein the spring pushes the latch interface out of contact with the latch when the solenoid is not activated, wherein when the lid portion is in the closed potion, the lid portion is locked when the solenoid is activated, and the lid portion is unlocked when the solenoid is not activated.

7. The OMPA of claim 6, wherein the latch assembly further comprises:
a switch mounted to the support structure and is mechanically actuated by the latch interface when the latch interface is in contact with the latch to lock the lid portion.

8. The OMPA of claim 1, wherein the fan and manifold are arranged horizontally adjacent to each other in an X-Z plane such that the manifold is positioned at least in part over the outlet port and the fan is positioned distally away from a center axis of the outlet port in the X-Z plane, wherein the center axis perpendicular to the X-Z plane.

9. The OMPA of claim 8, wherein the lid portion further comprises:
a heater mounted to the lid support plate within confines of the manifold, wherein the forced air exiting the fan is directed through or adjacent to the heater.

10. The OMPA of claim 1, wherein the manifold comprises a sensor port, the lid portion further comprising:
a circuit board comprising a sensor positioned in the sensor port to monitor characteristics of air in the manifold.

11. The OMPA of claim 1, wherein the lid portion further comprises:
a button;
a dead fronted display array; and
a cosmetic member positioned over the dead fronted display array and secured to the lid support member, the cosmetic member comprising a button cutout for the button and a light transmissible property that allows light being emitted by the dead fronted display array to pass through cosmetic member.

12. The OMPA of claim 1, wherein the lid portion comprises:
a gasket secured to the lid support member and operative to seal against a lip portion of the support structure when the lid portion is in the closed position.

13. A method for operating a lid assembly of an organic matter processing apparatus (OMPA), the method, implemented by the lid assembly, comprising:
in a closed lid configuration:
operating a fan to pull in ambient air via at least one inlet port into the fan and to supply forced air into a manifold, the manifold coupled to the fan and to a lid support member comprising an outlet port such that a forced airflow path exists between the fan and the outlet port, wherein the outlet port is positioned above an organic matter processing chamber of the OMPA;
heating the forced air with a heater contained within the manifold, wherein the heated forced air is expelled through the outlet port; and
monitoring, with a sensor, the forced air within the manifold.

14. The method of claim 13, further comprising:
opening and closing the lid assembly with a lid actuation assembly that electromechanically opens and closes the lid assembly.

15. The method of claim 14, wherein the lid actuation assembly is operative to fully open the lid assembly in less than 0.5 seconds in response to a lid open command;
wherein the lid open command is executed in response to a pedal depression event.

16. The method of claim 14, wherein said opening and closing is performed by a user who manually opens and closes the lid assembly with assistance of a spring-loaded member, wherein the spring-loaded member is part of the lid actuation assembly.

17. The method of claim 13, further comprising:
ceasing operation of the heater while the fan continues to supply forced air to the outlet port.

18. The method of claim 13, further comprising:
controlling display states of a plurality of dead fronted display icons based on an operational state of the OMPA.

19. The method of claim 13, further comprising:
locking the lid assembly in a locked configuration; and
unlocking the lid assembly in an unlocked configuration.

20. The method of claim 13, further comprising:
using a latch sensor to detect whether the lid assembly is locked;
using at least one magnetic sensor to detect whether the lid assembly is closed; and
preventing the OMPA from executing an organic processing function when the latch sensor detects that the lid assembly is unlocked or when the at least one magnetic sensor detects that the lid assembly is open.

21. An organic matter processing apparatus (OMPA), comprising:
a housing comprising an opening, a support structure, and bucket assembly for processing organic matter; and
a lid assembly coupled to the support structure and positioned over the opening when in a closed position, the lid assembly comprising:
a lid support plate comprising at least one inlet port and an outlet port;
a fan secured to the lid support plate; and
a manifold coupled to the lid support plate and the fan, wherein the fan is operative to pull in ambient air through the at least one inlet port and supply forced air that is directed through the manifold and the outlet port into the bucket assembly; and
a cover member placed above the fan and manifold and secured to the lid support plate, wherein the lid support plate, fan, manifold, and cover member collectively rotate about a pivot axis when the lid assembly is opened and closed.

22. The OMPA of claim 21, wherein the lid assembly further comprises a dead fronted display array secured between the cover member and the lid support member, where the cover member comprises a light transmission property that enables light being emitted by the dead fronted display to pass through the cover member.

23. The OMPA of claim 21, wherein the manifold covers the outlet port and extends laterally along a plane that is perpendicular to a center axis of the outlet port for a fixed distance, and wherein the fan is coupled to the manifold at a distal end of the fixed distance.

24. The OMPA of claim 22, wherein the lid assembly further comprises a heater secured within the manifold and adjacent to the distal end of the fixed distance.

25. The OMPA of claim 21, wherein the lid assembly further comprises a lid actuator assembly operative to automatically open and close the lid assembly.

26. The OMPA of claim 21, wherein the lid assembly further comprises a latch assembly operative to lock and unlock the lid assembly.

* * * * *